(12) United States Patent
Haseba et al.

(10) Patent No.: US 7,704,409 B2
(45) Date of Patent: *Apr. 27, 2010

(54) LIQUID CRYSTAL COMPOUND HAVING CHLORONAPHTHALENE MOIETY, LIQUID CRYSTAL COMPOSITION, AND OPTICAL DEVICE

(75) Inventors: Yasuhiro Haseba, Chiba (JP); Masayuki Saito, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/195,998

(22) Filed: Aug. 21, 2008

(65) Prior Publication Data

US 2009/0065739 A1    Mar. 12, 2009

(30) Foreign Application Priority Data

Aug. 22, 2007   (JP) ............................... 2007-216445

(51) Int. Cl.
*C09K 19/00* (2006.01)
*C09K 19/06* (2006.01)
*C09K 19/52* (2006.01)
*G03F 1/13* (2006.01)
*G03F 1/1333* (2006.01)

(52) U.S. Cl. ............................. 252/299.6; 252/299.01; 252/299.64; 252/299.62; 252/299.63; 252/299.66; 544/242; 430/20; 428/1.1; 349/1; 349/56; 546/184; 568/634

(58) Field of Classification Search ............ 252/299.01, 252/299.6, 299.61–63, 299.66, 0.6; 544/242; 430/20; 428/1.1; 349/1, 56; 546/184; 568/634; 570/128

See application file for complete search history.

(56) References Cited

U.S. PATENT DOCUMENTS 7,198,827 B1   4/2007   Takeuchi et al. ............. 428/1.1

(Continued)

FOREIGN PATENT DOCUMENTS

EP      0 952 135 A1   10/1999

(Continued)

OTHER PUBLICATIONS

Tisato Kajiyama et al., "Building of Polymer/Liquid Crystal Composite Films and Electrooptical Effects," J. of Chem. Soc. of Japan, No. 10, 1019 (1992).

(Continued)

*Primary Examiner*—Geraldina Visconti
(74) *Attorney, Agent, or Firm*—Hogan & Hartson LLP

(57) ABSTRACT

A compound represented by formula (1):

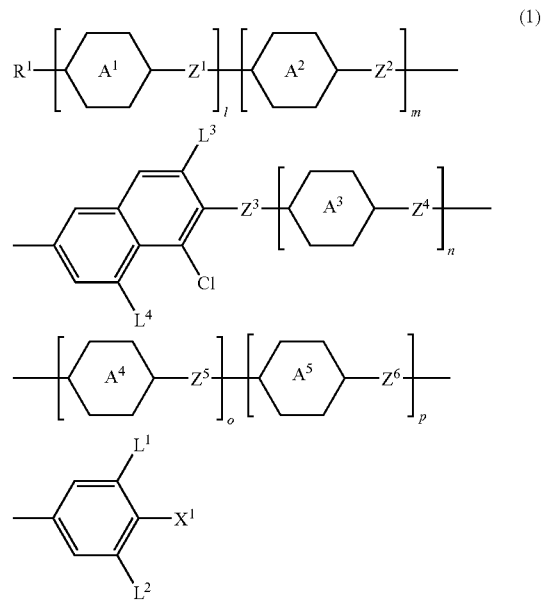

wherein $R^1$ is hydrogen or alkyl having 1 to 20 carbons, in which in the alkyl, arbitrary —$CH_2$— may be replaced by —O—, —S—, —COO—, —CH═CH— or —C≡C—, and arbitrary hydrogen may be replaced by halogen or alkyl having 1 to 3 carbons; ring $A^1$, ring $A^2$, ring $A^3$, ring $A^4$ and ring $A^5$ are each independently a benzene ring, a piperidine ring, a tetrahydropyrane ring or a dioxane ring, in which in the rings, arbitrary hydrogen may be replaced by halogen, alkyl having 1 to 3 carbons, alkoxy having 1 to 3 carbons or halogenated alkyl having 1 to 3 carbons, and —CH═ may be replaced by —N═; $Z^1$, $Z^2$, $Z^4$, $Z^5$ and $Z^6$ are each independently a single bond, —COO— or —$CF_2O$—; $Z^3$ is a single bond or —$CF_2O$—, and in the case where $Z^3$ is a single bond, ring $A^3$ is a ring represented by formula (RG-5), or $L^1$ and $L^2$ are both fluorine, or at least one of $Z^1$, $Z^2$, $Z^4$, $Z^5$ and $Z^6$ is —$CF_2O$—; $L^1$, $L^2$, $L^3$ and $L^4$ are each independently hydrogen or halogen; $X^1$ is hydrogen, halogen, —C≡N, —N═C═S, —C≡C—C≡N, —$SF_5$ or alkyl having 1 to 10 carbons, in which in the alkyl, arbitrary —$CH_2$— may be replaced by —O—, —S—, —CH═CH— or —C≡C—, and arbitrary hydrogen may be replaced by halogen; and l, m, n, o and p are each independently 0 or 1, provided that l+m+n+o+p≦4:

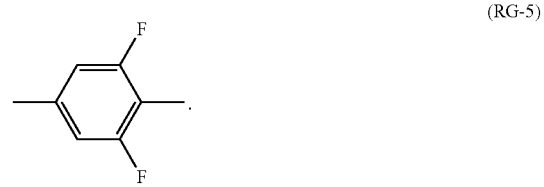

21 Claims, No Drawings

U.S. PATENT DOCUMENTS

| | | | |
|---|---|---|---|
| 2008/0280071 A1* | 11/2008 | Kikuchi et al. | 428/1.1 |
| 2009/0051855 A1* | 2/2009 | Haseba | 349/89 |
| 2009/0059157 A1* | 3/2009 | Haseba et al. | 349/182 |

FOREIGN PATENT DOCUMENTS

| | | |
|---|---|---|
| JP | 2000-63305 | 2/2000 |
| JP | 2000-119653 | 4/2000 |
| JP | 2001-11454 | 1/2001 |
| JP | 2001-11460 | 1/2001 |
| JP | 2001-26779 | 1/2001 |
| JP | 2005-232214 | 9/2005 |
| JP | 2005-232215 | 9/2005 |
| JP | 2005-250223 | 9/2005 |
| JP | 2005-257274 | 9/2005 |
| WO | WO 00-17287 | 3/2000 |

OTHER PUBLICATIONS

James Fergason, "Polymer Encapsulated Nematic Liquid Crystals for Display and Light Control Applications," SID Symposium Digest Tech Papers, 16, 68 (1985).

Hidekatsu Shigihara, "Electronic Paper Using Cholesteric Liquid Crystal," J. of Japanese Liq. Cryst. Soc., vol. 11, No. 2, 137 (2007).

R.A.M. Hikmet et al., "Cholesteric Networks Containing Free Molecules," Mol. Cryst. Liq. Cryst., vol. 200, pp. 197-204 (1991).

I. Dierking et al., "Polymer Network Structure and Electro-Optic Performance of Polymer Stabilized Cholesteric Textures, I. The Influence of Curing Temperature" Liquid Crystals, vol. 24, No. 3, pp. 387-395 (1998).

I. Dierking et al., "Polymer Network Structure and Electro-Optic Performance of Polymer Stabilized Cholesteric Textures, II. The Effect of UV Curing Conditions," Liquid Crystals, vol. 24, No. 3, pp. 397-406 (1998).

* cited by examiner

LIQUID CRYSTAL COMPOUND HAVING CHLORONAPHTHALENE MOIETY, LIQUID CRYSTAL COMPOSITION, AND OPTICAL DEVICE

CROSS REFERENCE TO RELATED APPLICATION

This application claims priority under 35 U.S.C. §119 to Japanese Application No. JP 2007-216445, filed Aug. 22, 2007, which application is expressly incorporated herein by reference in its entirety.

BACKGROUND OF THE INVENTION

1. Field of the Invention

The present invention relates to a novel liquid crystal compound and a liquid crystal composition that are useful as a material for an optical device. More specifically, it relates to a novel liquid crystal compound that has a wide liquid temperature range of a liquid crystal phase, a large dielectric anisotropy, a large refractive index anisotropy and good compatibility with other liquid crystal compounds, is capable of being used in a wide temperature range and of being operated at a low voltage when the compound is used in an optical device, and is capable of providing steep electrooptical characteristics, a liquid crystal composition containing the compound, and an optical device containing the composition. The term "optical device" referred herein includes various devices exerting such functions as optical modulation and optical switching by using an electrooptical effect, and examples thereof include a display device (liquid crystal display device) and an optical modulation device that is used in an optical communication system, an optical information processing system and various sensor systems.

2. Related Art

A display device using a liquid crystal compound has been widely used in displays of a clock, a desktop calculator, a word processor and so forth. The display device is operated by using the refractive index anisotropy, the dielectric anisotropy and so forth of the liquid crystal compound.

Examples of the operation mode of liquid crystal in a liquid crystal display device includes a phase change (PC) mode, a twisted nematic (TN) mode, a super twisted nematic (STN) mode, a bistable twisted nematic (BTN) mode, an electrically controlled birefringence (ECB) mode, an optically compensated bend (OCB) mode, an in-plane switching (IPS) mode, a vertical alignment (VA) mode and so forth, which use at least one polarizing plate for displaying. Examples of the mode using no polarizing plate include a polymer-liquid crystal composite film, a polymer-dispersed liquid crystal (PDLC) (disclosed in J. of Chem. Soc. of Japan, No. 10, 1019 (1992) and SID Symposium Digest Tech Papers, 16, 68 (1985)), a guest-host mode, a polymer stabilized cholesteric liquid crystal (PSChLC) (disclosed in J. of Japanese Liq. Cryst. Soc., vol. 11, No. 2, 137 (2007), Mol. Cryst. Liq. Cryst., 200, 197 (1991), Liq. Cryst., 24, 387 (1998) and Liq. Cryst., 24, 397 (1998)), in which an electric field is applied to a liquid crystal composite material to switch between a transparent state and a scattered state or between a transparent state and a colored state.

The devices are classified based on the driving mode into a passive matrix (PM) mode and an active matrix (AM) mode. The passive matrix (PM) mode is classified into a static mode, a multiplex mode and so forth, and the active matrix (AM) mode is classified into a thin film transistor (TFT) mode, a metal insulator metal (MIM) mode and so forth.

The liquid crystal display device contains a liquid crystal composition having suitable characteristics. For enhancing the characteristics of the liquid crystal display device, a liquid crystal composition that has suitable characteristics is preferably used. General characteristics that are necessary for a liquid crystal compound as a component of the liquid crystal composition are as follows.

(1) The compound is chemically stable and physically stable.
(2) The compound has a high clear point (phase transition temperature from a liquid crystal phase to an isotropic phase).
(3) The compound has a low minimum temperature of a liquid crystal phase (such as a nematic phase, a cholesteric phase, a smectic phase and a liquid crystal phase that is optically isotropic, e.g., a blue phase).
(4) The compound is excellent in compatibility with other liquid crystal compounds.
(5) The compound has a suitable dielectric anisotropy.
(6) The compound has a suitable refractive index anisotropy.

In the case where a composition containing a liquid crystal compound that is chemically and physically stable as in (1) is used in a display device, a voltage holding ratio can be increased.

A composition containing a liquid crystal compound that has a high clear point as in (2) or a low minimum temperature of a liquid crystal phase as in (3) enhances a temperature range of a nematic phase or an optically isotropic liquid crystal phase, and thus the display device can be used in a wide temperature range.

A liquid crystal compound is generally used as a composition by mixing with other various liquid crystal compounds for obtaining properties that cannot be exhibited with a sole compound. Accordingly, a liquid crystal compound used in a display device preferably has good compatibility with other liquid crystal compounds as in (4).

A liquid crystal display device that is further enhanced in display performance, for example, in contrast, display capacity, response time and so forth is demanded in recent years. Furthermore, a liquid crystal composition that has a low driving voltage is demanded as the liquid crystal material used.

It has been well known that a threshold voltage (Vth) in a nematic liquid crystal is shown by expression (a) (H. J. Deuling, et al., Mol. Cryst. Liq. Cryst., 27, 81 (1975)):

$$Vth = \pi(K/\varepsilon_0 \Delta\varepsilon)^{1/2} \tag{a}$$

In expression (a), K represents an elastic constant, and $\varepsilon_0$ represents the dielectric constant of vacuum. As being understood from the expression, there may be two ways for decreasing Vth, i.e., the value of $\Delta\varepsilon$ (dielectric anisotropy) is increased, or K is decreased. It is the current situation that, in general, a liquid crystal material having large $\Delta\varepsilon$ is used for fulfilling the demand. Under the circumstances, there have been earnest developments of a liquid crystal compound having a suitable dielectric anisotropy as in (5), particularly a liquid crystal compound having a large dielectric anisotropy.

For attaining favorable display with nematic liquid crystal, it is preferred that the thickness of the cell constituting the liquid crystal display device and the value of Δn (refractive index anisotropy) of the liquid crystal material used are constant (E. Jakeman, et al., Phys. Lett., 39A, 69 (1972)). The response speed of the liquid crystal display device is inversely proportional to the square of the thickness of the cell used. Accordingly, for producing a liquid crystal display device having a high response speed capable of being applied to display of motion images, it is necessary to use a liquid crystal composition having a large refractive index anisotropy. Consequently, a liquid crystal compound having a suitable refractive index anisotropy as in (6), particularly a liquid crystal compound having a large refractive index anisotropy, is demanded.

As a liquid crystal compound having a halogen-replaced naphthalene ring, the following compounds having a fluoronaphthalene ring have been known (disclosed in JP 2000-63305 A/2000)

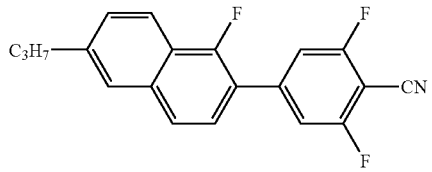

Compounds having a chloronaphthalene ring are disclosed as formulas in WO 2000-17287 A, JP 2000-119653 A/2000, JP 2001-11460 A/2001, JP 2001-11454 A/2001 and JP 2001-26779 A/2001.

In the liquid crystal used in the mode that does not require a polarizing plate, it is preferred to use a liquid crystal compound having a large dielectric anisotropy for driving a device at a low voltage, and the use of a liquid crystal having a large refractive index anisotropy can increase the scattering intensity and enhance the wavelength band of the selective reflection wavelength.

A polymer-dispersed liquid crystal using a liquid crystal composition containing a liquid crystal compound having a fluoronaphthalene ring has been known (disclosed in JP 2005-232214 A/2005, JP 2005-232215 A/2005, JP 2005-250223 A/2005 and JP 2005-257274 A/2005).

SUMMARY OF THE INVENTION

The invention concerns a compound represented by formula (1):

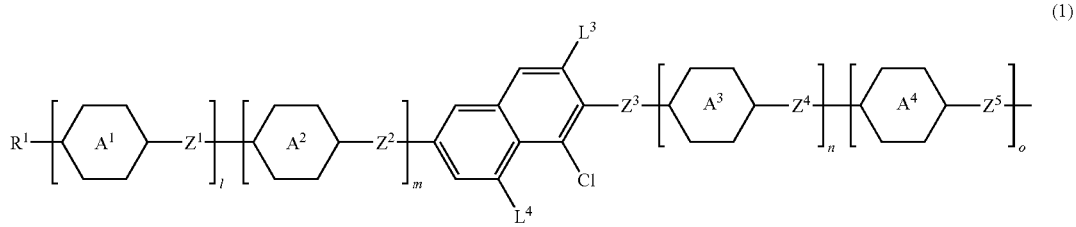

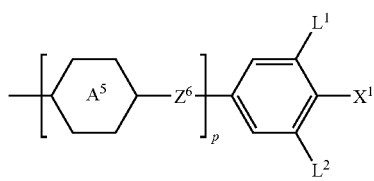

wherein $R^1$ is hydrogen or alkyl having 1 to 20 carbons, in which in the alkyl, arbitrary —$CH_2$— may be replaced by —O—, —S—, —COO—, —CH=CH— or —C≡C—, and arbitrary hydrogen may be replaced by halogen or alkyl having 1 to 3 carbons; ring $A^1$, ring $A^2$, ring $A^3$, ring $A^4$ and ring $A^5$ are each independently a benzene ring, a piperidine ring, a tetrahydropyrane ring or a dioxane ring, in which in the rings, arbitrary hydrogen may be replaced by halogen, alkyl having 1 to 3 carbons, alkoxy having 1 to 3 carbons or halogenated alkyl having 1 to 3 carbons, and —CH= may be replaced by —N=; $Z^1$, $Z^2$, $Z^4$, $Z^5$ and $Z^6$ are each independently a single bond, —COO— or —$CF_2O$—; $Z^3$ is a single bond or —$CF_2O$—, and in the case where $Z^3$ is a single bond, ring $A^3$ is a ring represented by formula (RG-5), or $L^1$ and $L^2$ are both fluorine, or at least one of $Z^1$, $Z^2$, $Z^4$, $Z^5$ and $Z^6$ is —$CF_2O$—; $L^1$, $L^2$, $L^3$ and $L^4$ are each independently hydrogen or halogen; $X^1$ is hydrogen, halogen, —C≡N, —N=C=S, —C≡C—C≡N, —$SF_5$ or alkyl having 1 to 10 carbons, in which in the alkyl, arbitrary —$CH_2$— may be replaced by —O—, —S—, —CH=CH— or —C≡C—, and arbitrary hydrogen may be replaced by halogen; and l, m, n, o and p are each independently 0 or 1, provided that l+m+n+o+p≦4:

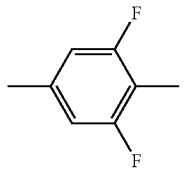

(RG-5)

The invention also concerns a liquid crystal composition, a mixture and a composite material that contain the compound.

The invention further concerns an optical device and a liquid crystal display device that include the liquid crystal composition and so forth.

DETAILED DESCRIPTION OF THE INVENTION

The terms used herein are defined as follows. A liquid crystal compound is a generic term for a compound having a liquid crystal phase such as a nematic phase, a smectic phase and so forth, and also for a compound having no liquid crystal phase but being useful as a component of a liquid crystal composition. A liquid crystal compound, a liquid crystal composition and a liquid crystal display device may occasionally be expressed simply as a compound, a composition and a device, respectively. A liquid crystal display device is a generic term for a liquid crystal display panel and a liquid crystal display module. A maximum temperature of a nematic phase is a transition temperature from a nematic phase to an isotropic phase, and may be occasionally be expressed simply as a clear point or a maximum temperature. A minimum temperature of a nematic phase may be occasionally expressed simply as a minimum temperature. A compound represented by formula (1) may be abbreviated as a compound (1). The abbreviation rule may be applied to other compounds, such as a compound represented by formula (2) and so forth. In formulas (1) to (19), symbols, such as B, D, E and so forth, positioned in hexagons correspond to ring B, ring D, ring E and so forth, respectively. The amounts of the compound expressed in terms of percentage are weight percentages (% by weight) based on the total amount of the composition. Plural rings, groups or atoms are represented by the same symbol, such as ring $A^1$, $Y^1$, B or the like, in one formula or plural formulas, and the plural rings, groups or atoms each may be the same as or different from each other.

The term "arbitrary" means that not only the position but also the number are arbitrary, but the case where the number is zero is not included. The expression "arbitrary A may be replaced by B, C or D" includes the case where arbitrary A is replaced by B, the case where arbitrary A is replaced by C, and the case where arbitrary A is replaced by D, and also includes the case where plural A are replaced by at least two of B, C and D. For example, alkyl, in which arbitrary —$CH_2$— may be replaced by —O— or —CH=CH—, includes alkyl, alkenyl, alkoxy, alkoxyalkyl, alkoxyakenyl, alkenyloxyalkyl and so forth. In the invention, it is not preferred that two adjacent —$CH_2$— are replaced by —O— to form —O—O—, and it is also not preferred that —$CH_2$— at the end of alkyl is replaced by —O— to form a hydroxyl group as an end group of the alkyl chain.

One of the advantages of the invention is to provide a liquid crystal compound that satisfies many characteristics among general properties required for a liquid crystal compound, stability to heat, light and so forth, a wide temperature range of a liquid crystal phase, good compatibility with other liquid crystal compounds, a large refractive index anisotropy and a large dielectric anisotropy, and particularly to provide a liquid crystal compound that has a large refractive index anisotropy and a large dielectric anisotropy. Another one of the advantages of the invention is to provide a liquid crystal composition that contains the compound and has a wide temperature range of a liquid crystal phase, a large refractive index anisotropy and a large dielectric anisotropy. Still another one of the advantages of the invention is to provide a optical device that contains the composition, is capable of being used in a wide temperature range, and has a short response time, a large contrast and a low driving voltage.

The compound of the invention has general properties required for a liquid crystal compound, stability to heat, light and so forth, a wide temperature range of a liquid crystal phase, good compatibility with other liquid crystal compounds, a large refractive index anisotropy and a large dielectric anisotropy. The liquid crystal composition of the invention contains at least one of the compounds and has a high maximum temperature of a nematic phase, a low minimum temperature of a nematic phase, a large refractive index anisotropy, a large dielectric anisotropy and a low threshold voltage in an optical device driven in a nematic phase and a chiral nematic phase.

The polymer-liquid crystal composite film, the polymer-dispersed liquid crystal (PDLC), the guest-host mode liquid crystal, and the polymer stabilized cholesteric liquid crystal (PSChLC) of the invention show a low driving voltage, a large scattering intensity and an enhanced wavelength band of the selective reflection wavelength.

The invention has the following features:
1. A compound represented by formula (1):

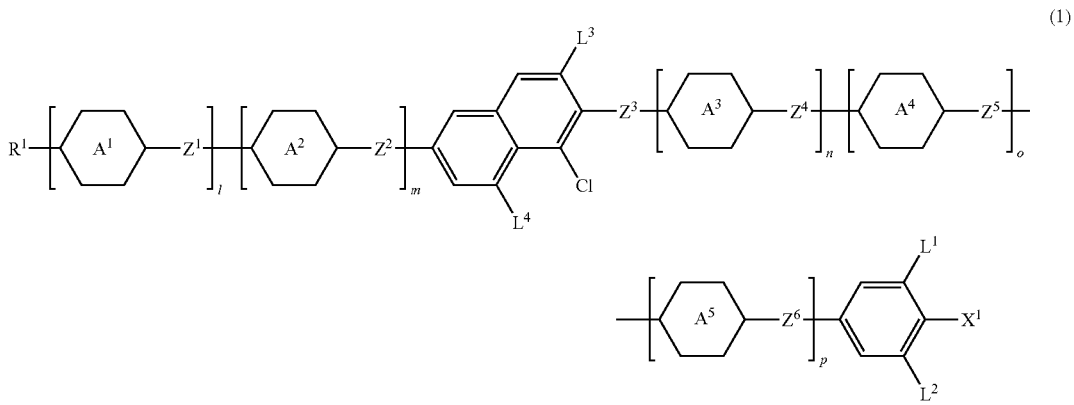

wherein $R^1$ is hydrogen or alkyl having 1 to 20 carbons, in which in the alkyl, arbitrary —$CH_2$— may be replaced by —O—, —S—, —COO—, —CH=CH— or —C≡C—, and arbitrary hydrogen may be replaced by halogen or alkyl having 1 to 3 carbons; ring $A^1$, ring $A^2$, ring $A^3$, ring $A^4$ and ring $A^5$ are each independently a benzene ring, a piperidine ring, a tetrahydropyrane ring or a dioxane ring, in which in the rings, arbitrary hydrogen may be replaced by halogen, alkyl having 1 to 3 carbons, alkoxy having 1 to 3 carbons or halogenated alkyl having 1 to 3 carbons, and —CH= may be replaced by —N=; $Z^1$, $Z^2$, $Z^4$, $Z^5$ and $Z^6$ are each independently a single bond, —COO— or —$CF_2O$—; $Z^3$ is a single bond or —$CF_2O$—, and in the case where $Z^3$ is a single bond, ring $A^3$ is a ring represented by formula (RG-5), or $L^1$ and $L^2$ are both fluorine, or at least one of $Z^1$, $Z^2$, $Z^4$, $Z^5$ and $Z^6$ is —$CF_2O$—; $L^1$, $L^2$, $L^3$ and $L^4$ are each independently hydrogen or halogen; $X^1$ is hydrogen, halogen, —C≡N, —N=C=S, —C≡C—C≡N, —$SF_5$ or alkyl having 1 to 10 carbons, in which in the alkyl, arbitrary —$CH_2$— may be replaced by —O—, —S—, —CH=CH— or —C≡C—, and arbitrary hydrogen may be replaced by halogen; and l, m, n, o and p are each independently 0 or 1, provided that l+m+n+o+p≦4:

(RG-5)

2. The compound according to item 1, wherein in formula (1), $R^1$ is alkyl having 1 to 20 carbons, alkenyl having 2 to 21 carbons, difluoroalkenyl having 2 to 21 carbons, alkynyl having 2 to 21 carbons, alkoxy having 1 to 19 carbons, alkenyloxy having 2 to 20 carbons, alkylthio having 1 to 19 carbons or alkenylthio having 2 to 19 carbons; $X^1$ is hydrogen, halogen, —C≡N, —N=C=S, —$SF_5$, —$CH_2F$, —$CHF_2$, —$CF_3$, —$(CH_2)_2$—F, —$CF_2CH_2F$, —$CF_2CHF_2$, —$CH_2CF_3$, —$CF_2CF_3$, —$(CH_2)_3$—F, —$(CF_2)_3$—F, —$CF_2CHFCF_3$, —$CHFCF_2CF_3$, —$(CH_2)_4$—F, —$(CF_2)_4$—F, —$(CH_2)_5$—F, —$(CF_2)_5$—F, —$OCH_2F$, —$OCHF_2$, —$OCF_3$, —O—$(CH_2)_2$—F, —$OCF_2CH_2F$, —$OCF_2CHF_2$, —$OCH_2CF_3$, —O—$(CH_2)_3$—F, —O—$(CF_2)_3$—F, —$OCF_2CHFCF_3$, —$OCHFCF_2CF_3$, —$O(CH_2)_4$—F, —O—$(CF_2)_4$—F, —O—$(CH_2)_5$—F, —O—$(CF_2)_5$—F, —CH=CHF, —CH=$CF_2$, —CF=CHF, —CH=$CHCH_2$F, —CH=$CHCF_3$, —$(CH_2)_2$—CH=$CF_2$, —$CH_2$CH=$CHCF_3$ or —CH=$CHCF_2CF_3$.

3. The compound according to item 1 or 2, wherein in formula (1), one of $Z^1$, $Z^2$, $Z^3$, $Z^4$, $Z^5$ and $Z^6$ is —$CF_2O$—.

4. The compound according to item 3, wherein in formula (1), $Z^3$ is a single bond; and $Z^4$ is —$CF_2O$—.

5. The compound according to item 1 or 2, wherein in formula (1), $Z^1$, $Z^2$, $Z^3$, $Z^5$ and $Z^6$ are each a single bond; and $Z^4$ is —COO—.

6. The compound according to item 1 or 2, wherein in formula (1), $Z^1$, $Z^2$, $Z^3$, $Z^4$, $Z^5$ and $Z^6$ are each a single bond.

7. The compound according to one of items 1 to 6, wherein $R^1$ is one of groups represented by formulas (AC-1) to (AC-19); and $R^{1a}$ is hydrogen or alkyl having 1 to 20 carbons:

(AC-1)

(AC-2)

(AC-3)

(AC-4)

(AC-5)

(AC-6)

(AC-7)

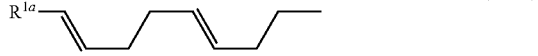
(AC-8)

(AC-9)

(AC-10)

-continued (AC-11) $R^{1a}$—O—

(AC-12) $R^{1a}$—\=/—O—

(AC-13) $R^{1a}$—\=/—\—O—

(AC-14) $R^{1a}$—S—

(AC-15) $R^{1a}$—\=/—S—

(AC-16) $R^{1a}$—\=/—\—S—

(AC-17) F-C(=CF)-CH₃ structure (AC-18) F₂C=CH-CH₂-CH₃ structure (AC-19) F₂C=CH-(CH₂)₄-CH₃ structure (RG-1) tetrahydropyran ring (RG-2) 1,3-dioxane ring (RG-3) 1,4-phenylene (RG-4) fluoro-substituted phenylene (RG-5) difluoro-substituted phenylene (RG-6) chloro-substituted phenylene (RG-7) fluoro-dichloro-substituted phenylene (RG-8) pyridine ring (RG-9) pyrimidine ring (RG-10) piperidine ring 8. The compound according to one of items 1 to 6, wherein $R^1$ is one of groups represented by formulas (AC-1), (AC-4), (AC-7), (AC-8), (AC-11) and (AC-14); and $R^{1a}$ is alkyl having 1 to 20 carbons:

(AC-1) $R^{1a}$—

(AC-4) $R^{1a}$—\=/—

(AC-7) $R^{1a}$—\=/—\=/—

(AC-8) $R^{1a}$—≡—

(AC-11) $R^{1a}$—O—

(AC-14) $R^{1a}$—S—

9. The compound according to one of items 1 to 6, wherein $R^1$ is one of groups represented by formula (AC-8); and $R^{1a}$ is hydrogen or alkyl having 1 to 20 carbons:

(AC-8) $R^{1a}$—≡—

10. The compound according to one of items 1 to 6, wherein ring $A^1$, ring $A^2$, ring $A^3$, ring $A^4$ and ring $A^5$ are each independently a ring represented by one of formulas (RG-1) to (RG-10):

11. The compound according to item 1, wherein the compound is represented by one of formulas (1-1) to (1-9):

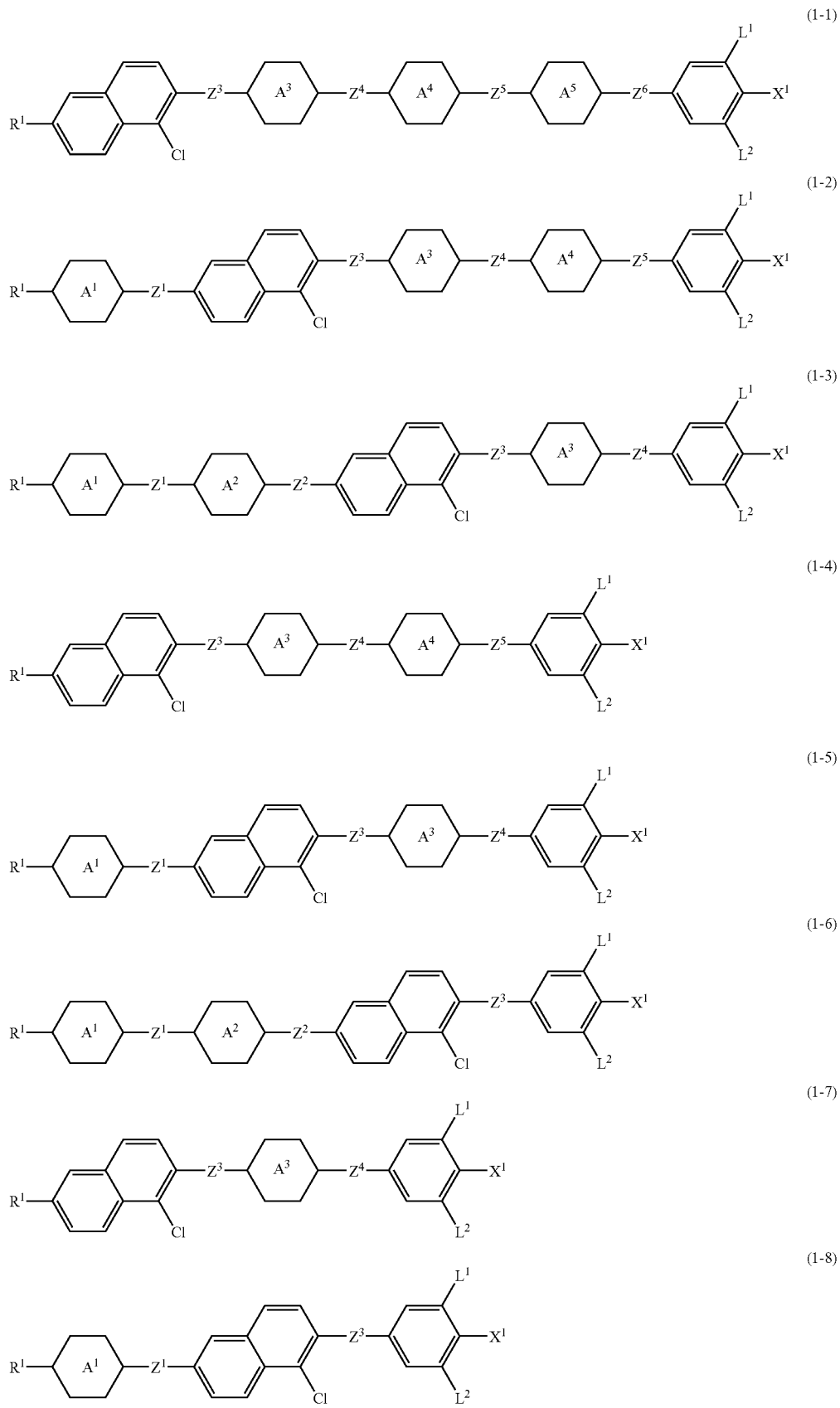

-continued

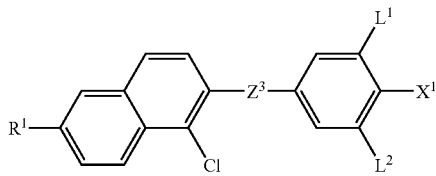
(1-9)

wherein $R^1$ is a group represented by one of formulas (AC-1) to (AC-19) in item 7; $R^{1a}$ is hydrogen or alkyl having 1 to 20 carbons; ring $A^1$, ring $A^2$, ring $A^3$, ring $A^4$ and ring $A^5$ are each independently a ring represented by one of formulas (RG-1) to (RG-10) in item 10; $L^1$ and $L^2$ are each independently hydrogen, fluorine or chlorine; $X^1$ is fluorine, chlorine, —C≡N, —$CF_3$, —$CHF_2$, —$CH_2F$, —$OCF_3$, —$OCHF_2$, —$OCH_2F$ or —C≡C—$CF_3$; $Z^1$, $Z^2$, $Z^4$, $Z^5$ and $Z^6$ are each independently a single bond, —COO— or —$CF_2O$—; and $Z^3$ is a single bond or —$CF_2O$—, and in the case where $Z^3$ is a single bond, ring $A^3$ is a ring represented by formula (RG-5), or $L^1$ and $L^2$ are both fluorine, or at least one of $Z^1$, $Z^2$, $Z^4$, $Z^5$ and $Z^6$ is —$CF_2O$—.

12. The compound according to item 11, wherein in formulas (1-1) to (1-8), at least one of ring $A^1$, ring $A^2$, ring $A^3$, ring $A^4$ and ring $A^5$ is a ring represented by formula (RG-5).

13. The compound according to item 11, wherein in formulas (1-7) and (1-8), at least one of ring $A^1$ and ring $A^3$ is a ring represented by formula (RG-9).

14. The compound according to item 11, wherein in formulas (1-5) and (1-8), ring $A^1$ is a ring represented by formula (RG-2).

15. The compound according to item 11, wherein in formulas (1-5) and (1-8), ring $A^1$ is a ring represented by formula (RG-10).

16. The compound according to item 11, wherein in formula (1-7), $R^1$ is a group represented by formula (AC-1); $Z^3$ and $Z^4$ are each a single bond; and ring $A^3$ is a ring represented by formula (RG-5).

17. The compound according to item 11, wherein in formula (1-8), $R^1$ is a group represented by formula (AC-1); $Z^1$ and $Z^3$ are each a single bond; and $L^1$ and $L^2$ are each fluorine.

18. The compound according to item 11, wherein in formula (1-7), $R^1$ is a group represented by formula (AC-1); $Z^3$ is a single bond; $Z^4$ is —COO—; and ring $A^3$ is a ring represented by formula (RG-5).

19. The compound according to item 11, wherein in formulas (1-4) and (1-7), $R^1$ is a group represented by formula (AC-8); $Z^3$ is a single bond; $Z^4$ is —$CF_2O$—; and ring $A^3$ is a ring represented by formula (RG-5).

20. A liquid crystal composition comprising at least one compound selected from the compound according to one of items 1 to 19.

21. The liquid crystal composition according to item 20, wherein the liquid crystal composition further comprises at least one compound selected from the group of compounds represented by formulas (2), (3) and (4):

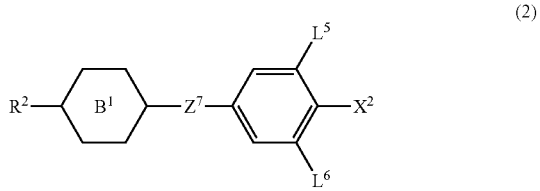
(2)

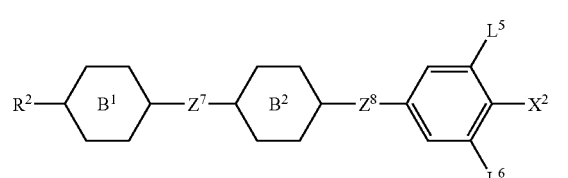
(3)

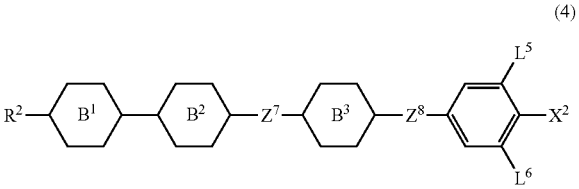
(4)

wherein $R^2$ is alkyl having 1 to 10 carbons or alkenyl having 2 to 10 carbons, in which in the alkyl and the alkenyl, arbitrary hydrogen may be replaced by fluorine, and arbitrary —$CH_2$— may be replaced by —O—; $X^2$ is fluorine, chlorine, —$OCF_3$, —$OCHF_2$, —$CF_3$, —$CHF_2$, —$CH_2F$, —$OCF_2CHF_2$ or —$OCF_2CHFCF_3$; ring $B^1$, ring $B^2$ and ring $B^3$ are each independently 1,4-cyclohexylene, 1,3-dioxan-2,5-diyl, pyrimidin-2,5-diyl, tetrahydropyran-2,5-diyl, 1,4-phenylene or 1,4-phenylene, in which arbitrary hydrogen is replaced by fluorine; $Z^7$ and $Z^8$ are each independently —$(CH_2)_2$—, —$(CH_2)_4$—, —COO—, —$CF_2O$—, —$OCF_2$—, —CH=CH—, —C≡C—, —$CH_2O$— or a single bond; and $L^5$ and $L^6$ are each independently hydrogen or fluorine.

22. The liquid crystal composition according to item 21, wherein the at least one compound selected from the group of compounds represented by formulas (2), (3) and (4) is at least one compound selected from the group of compounds represented by formulas (2-1), (2-2), (3-1), (3-3), (3-22), (3-24), (3-69), (3-80), (3-96), (3-97), (3-100), (4-5), (4-9), (4-37), (4-40) and (4-46):

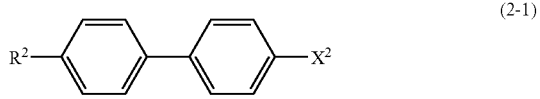
(2-1)

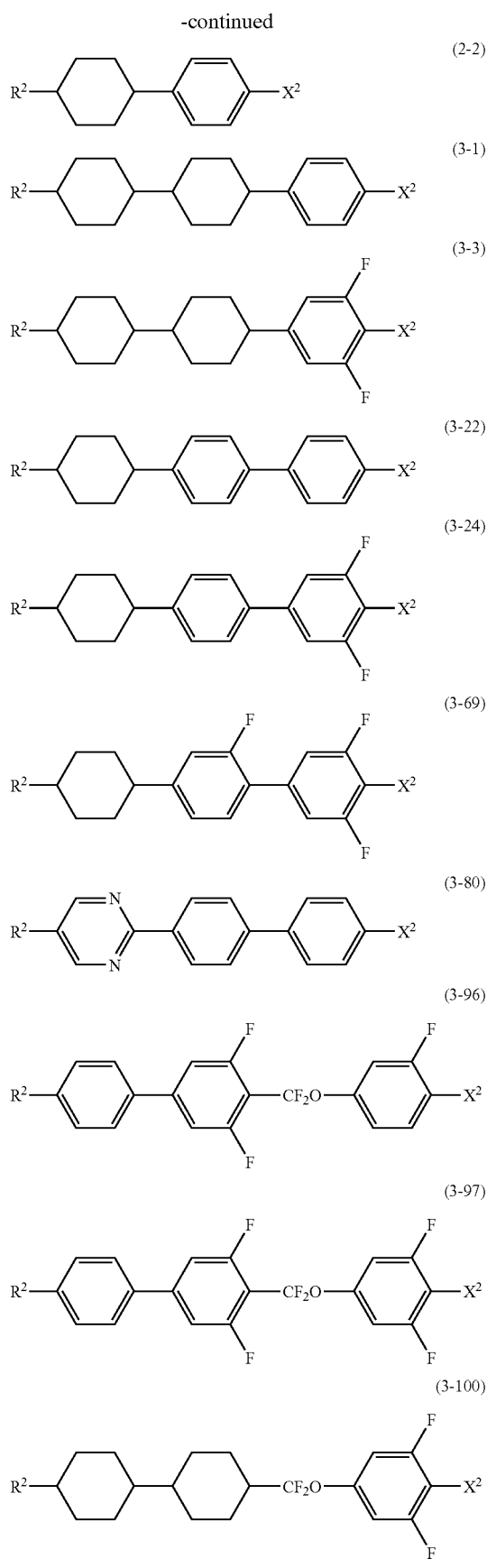

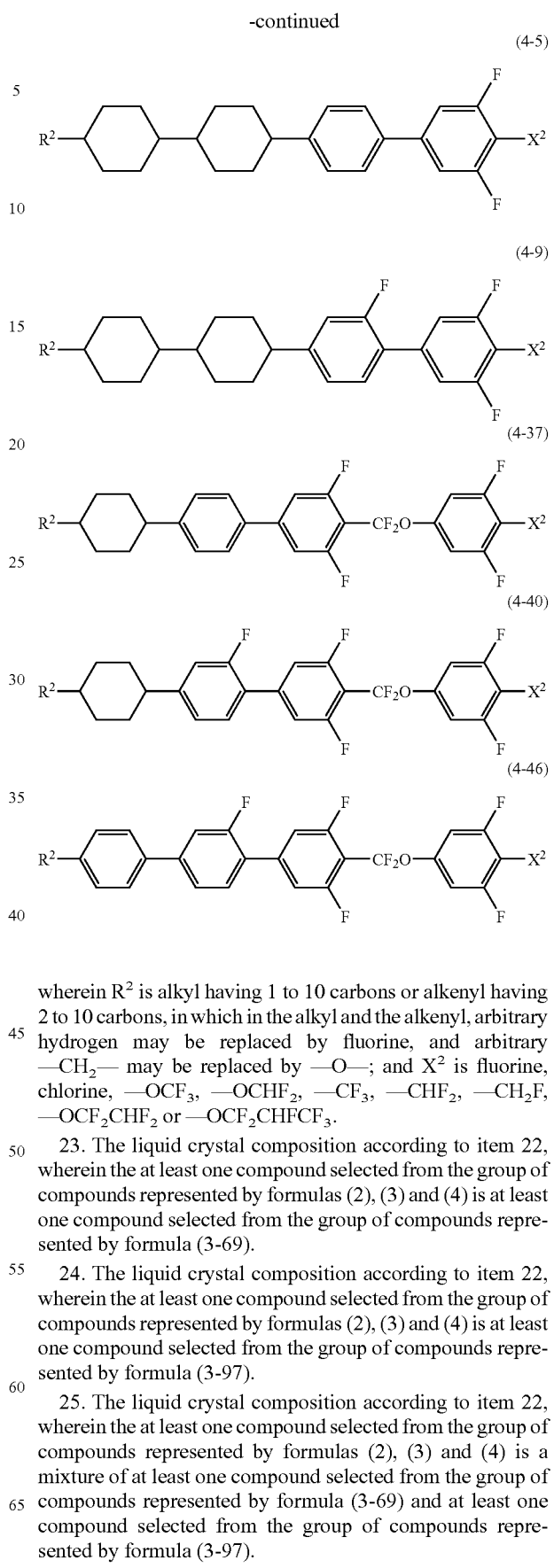

wherein $R^2$ is alkyl having 1 to 10 carbons or alkenyl having 2 to 10 carbons, in which in the alkyl and the alkenyl, arbitrary hydrogen may be replaced by fluorine, and arbitrary —$CH_2$— may be replaced by —O—; and $X^2$ is fluorine, chlorine, —$OCF_3$, —$OCHF_2$, —$CF_3$, —$CHF_2$, —$CH_2F$, —$OCF_2CHF_2$ or —$OCF_2CHFCF_3$.

23. The liquid crystal composition according to item 22, wherein the at least one compound selected from the group of compounds represented by formulas (2), (3) and (4) is at least one compound selected from the group of compounds represented by formula (3-69).

24. The liquid crystal composition according to item 22, wherein the at least one compound selected from the group of compounds represented by formulas (2), (3) and (4) is at least one compound selected from the group of compounds represented by formula (3-97).

25. The liquid crystal composition according to item 22, wherein the at least one compound selected from the group of compounds represented by formulas (2), (3) and (4) is a mixture of at least one compound selected from the group of compounds represented by formula (3-69) and at least one compound selected from the group of compounds represented by formula (3-97).

26. The liquid crystal composition according to item 22, wherein the at least one compound selected from the group of compounds represented by formulas (2), (3) and (4) is at least one compound selected from the group of compounds represented by formula (4-46).

27. The liquid crystal composition according to item 22, wherein the at least one compound selected from the group of compounds represented by formulas (2), (3) and (4) is a mixture of at least one compound selected from the group of compounds represented by formula (3-97) and at least one compound selected from the group of compounds represented by formula (4-46).

—$CH_2$— may be replaced by —O—; $X^3$ is —C≡N or —C≡C—C≡N; ring $C^1$, ring $C^2$ and ring $C^3$ are each independently 1,4-cyclohexylene, 1,4-phenylene, 1,4-phenylene, in which arbitrary hydrogen is replaced by fluorine, 1,3-dioxan-2,5-diyl, tetrahydropyran-2,5-diyl or pyrimidin-2,5-diyl; $Z^9$ is —$(CH_2)_2$—, —COO—, —$CF_2O$—, —$OCF_2$—, —C≡C—, —$CH_2O$— or a single bond; $L^7$ and $L^8$ are each independently hydrogen or fluorine; r is 0; 1 or 2; s is 0 or 1; and r+s is 0, 1 or 2.

29. The liquid crystal composition according to item 20, wherein the liquid crystal composition further comprises at least one compound selected from the group of compounds represented by formulas (6), (7), (8), (9) and (10):

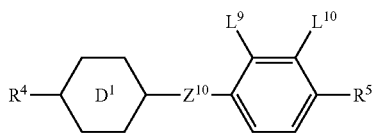

(6)

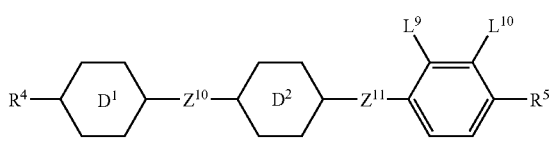

(7)

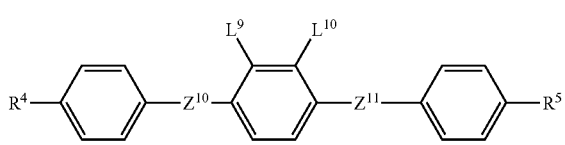

(8)

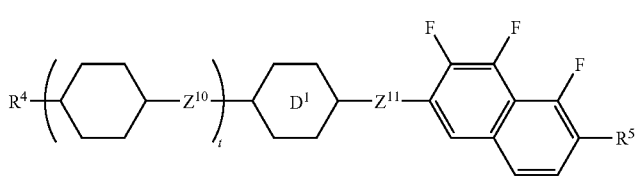

(9)

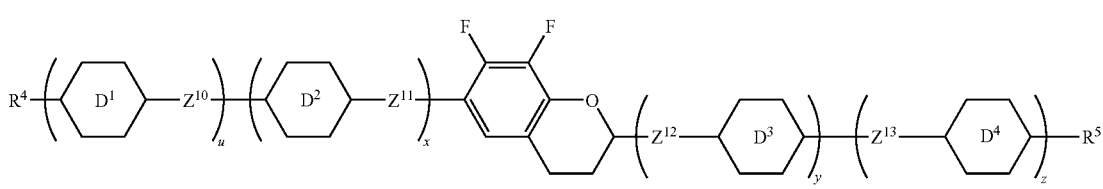

(10)

28. The liquid crystal composition according to item 20, wherein the liquid crystal composition further comprises at least one compound selected from the group of compounds represented by formula (5):

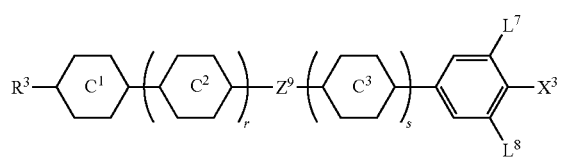

(5)

wherein $R^3$ is alkyl having 1 to 10 carbons or alkenyl having 2 to 10 carbons, in which in the alkyl and the alkenyl, arbitrary hydrogen may be replaced by fluorine, and arbitrary wherein $R^4$ and $R^5$ are each independently alkyl having 1 to 10 carbons or alkenyl having 2 to 10 carbons, in which in the alkyl and the alkenyl, arbitrary hydrogen may be replaced by fluorine, and arbitrary —$CH_2$— may be replaced by —O—; ring $D^1$, ring $D^2$, ring $D^3$ and ring $D^4$ are each independently 1,4-cyclohexylene, 1,4-cyclohexenylene, 1,4-phenylene, 1,4-phenylene, in which arbitrary hydrogen is replaced by fluorine, tetrahydropyran-2,5-diyl or decahydronaphthalene-2,6-diyl; $Z^{10}$, $Z^{11}$, $Z^{12}$ and $Z^{13}$ are each independently —$(CH_2)_2$—, —COO—, —$CH_2O$—, —$OCF_2$—, —$OCF_2(CH_2)_2$— or a single bond; $L^9$ and $L^{10}$ are each independently fluorine or chlorine; t, u, x, y and z are each independently 0 or 1; and u+x+y+z is 1 or 2.

30. The liquid crystal composition according to item 20, wherein the liquid crystal composition further comprises at least one compound selected from the group of compounds represented by formulas (11), (12) and (13):

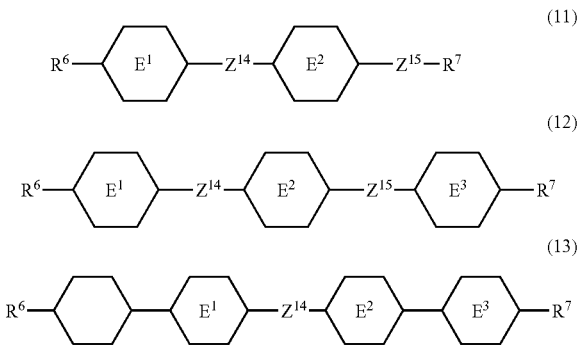

wherein $R^6$ and $R^7$ are each independently alkyl having 1 to 10 carbons or alkenyl having 2 to 10 carbons, in which in the alkyl and the alkenyl, arbitrary hydrogen may be replaced by fluorine, and arbitrary —$CH_2$— may be replaced by —O—; ring $E^1$, ring $E^2$ and ring $E^3$ are each independently 1,4-cyclohexylene, pyrimidin-2,5-diyl, 1,4-phenylene, 2-fluoro-1,4-phenylene, 3-fluoro-1,4-phenylene or 2,5-difluoro-1,4-phenylene; and $Z^{14}$ and $Z^{15}$ are each independently —C≡C—, —COO—, —($CH_2$)$_2$—, —CH=CH— or a single bond.

31. The liquid crystal composition according to item 20, wherein the at least one compound selected from the group of compounds represented by formulas (11), (12) and (13) is at least one compound selected from the group of compounds represented by formulas (11-1), (11-5), (11-8), (12-1), (12-4), (12-6), (13-1), (13-2) and (13-5):

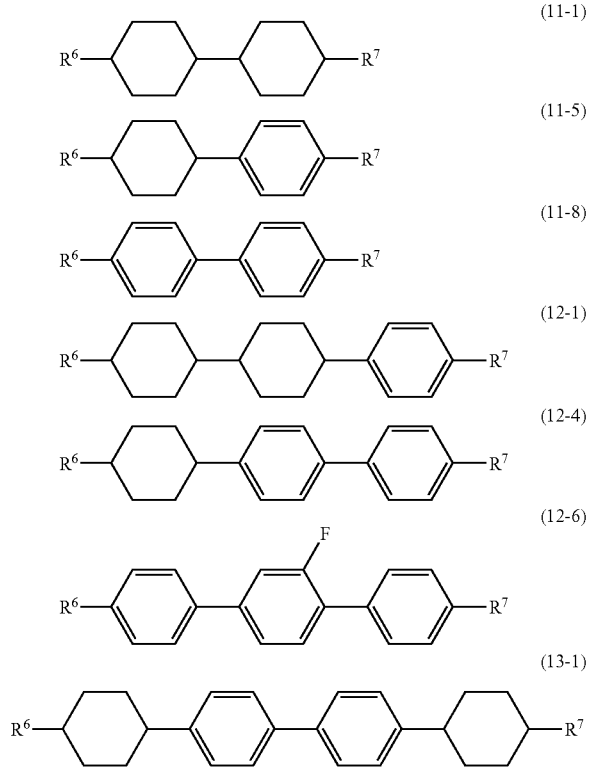

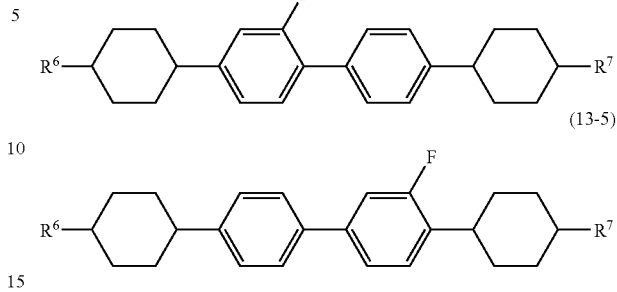

wherein $R^6$ and $R^7$ are each independently alkyl having 1 to 10 carbons or alkenyl having 2 to 10 carbons, in which in the alkyl and the alkenyl, arbitrary hydrogen may be replaced by fluorine, and arbitrary —$CH_2$— may be replaced by —O—.

32. The liquid crystal composition according to item 30, wherein the at least one compound selected from the group of compounds represented by formulas (11), (12) and (13) is at least one compound selected from the group of compounds represented by formula (11-1).

33. The liquid crystal composition according to item 30, wherein the at least one compound selected from the group of compounds represented by formulas (11), (12) and (13) is at least one compound selected from the group of compounds represented by formula (12-1).

34. The liquid crystal composition according to item 30, wherein the at least one compound selected from the group of compounds represented by formulas (11), (12) and (13) is at least one compound selected from the group of compounds represented by formula (12-6).

35. The liquid crystal composition according to item 30, wherein the at least one compound selected from the group of compounds represented by formulas (11), (12) and (13) is a mixture of at least one compound selected from the group of compounds represented by formula (12-1) and at least one compound selected from the group of compounds represented by formula (12-6).

36. The liquid crystal composition according to item 30, wherein the at least one compound selected from the group of compounds represented by formulas (11), (12) and (13) is a mixture of at least one compound selected from the group of compounds represented by formula (11-1), at least one compound selected from the group of compounds represented by formula (12-1) and at least one compound selected from the group of compounds represented by formula (12-6).

37. The liquid crystal composition according to item 30, wherein the at least one compound selected from the group of compounds represented by formulas (11), (12) and (13) is at least one compound selected from the group of compounds represented by formula (13-5).

38. The liquid crystal composition according to item 30, wherein the at least one compound selected from the group of compounds represented by formulas (11), (12) and (13) is a mixture of at least one compound selected from the group of compounds represented by formula (12-6) and at least one compound selected from the group of compounds represented by formula (13-5).

39. The liquid crystal composition according to item 21, wherein the liquid crystal composition further comprises at least one compound selected from the group of compounds represented by formula (5) in item 28.

40. The liquid crystal composition according to item 21, wherein the liquid crystal composition further comprises at least one compound selected from the group of compounds represented by formulas (11), (12) and (13) in item 30.

41. The liquid crystal composition according to item 28, wherein the liquid crystal composition further comprises at least one compound selected from the group of compounds represented by formulas (11), (12) and (13) in item 30.

42. The liquid crystal composition according to item 29, wherein the liquid crystal composition further comprises at least one compound selected from the group of compounds represented by formulas (11), (12) and (13) in item 30.

43. The liquid crystal composition according to item 20, wherein the liquid crystal composition further comprises at least one compound selected from the group of compounds represented by formulas (15), (16), (17) and (18):

44. The liquid crystal composition according to item 20, wherein the liquid crystal composition further comprises at least one compound selected from the group of compounds represented by formula (19):

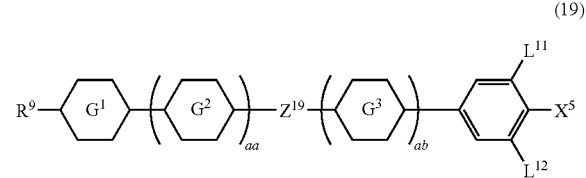

(19)

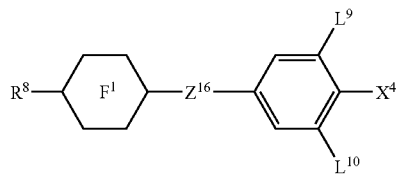

(15)

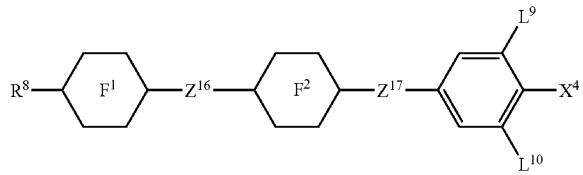

(16)

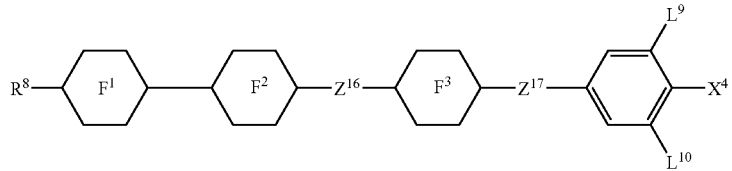

(17)

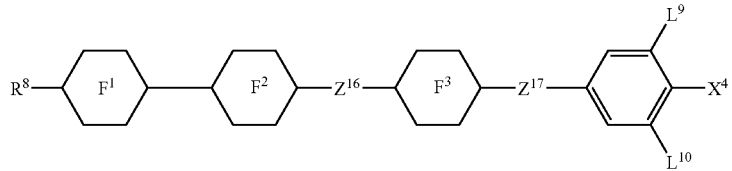

(18)

wherein $R^8$ is alkyl having 1 to 10 carbons, alkenyl having 2 to 10 carbons or alkynyl having 2 to 10 carbons, in which in the alkyl, the alkenyl and the alkynyl, arbitrary hydrogen may be replaced by fluorine, and arbitrary —$CH_2$— may be replaced by —O—; $X^4$ is fluorine, chlorine, —$SF_5$, —$OCF_3$, —$OCHF_2$, —$CF_3$, —$CHF_2$, —$CH_2F$, —$OCF_2CHF_2$ or —$OCF_2CHFCF_3$; ring $F^1$, ring $F^2$, ring $F^3$ and ring $F^4$ are each independently 1,4-cyclohexylene, 1,3-dioxan-2,5-diyl, pyrimidin-2,5-diyl, tetrahydropyran-2,5-diyl, 1,4-phenylene, naphthalen-2,6-diyl, 1,4-phenylene, in which arbitrary hydrogen is replaced by fluorine or chlorine, or naphthalen-2,6-diyl, in which arbitrary hydrogen is replaced by fluorine; $Z^{16}$, $Z^{17}$ and $Z^{18}$ are each independently —$(CH_2)_2$—, —$(CH_2)_4$—, —COO—, —$CF_2O$—, —$OCF_2$—, —CH=CH—, —C≡C—, —$CH_2O$— or a single bond; and $L^9$ and $L^{10}$ are each independently hydrogen or fluorine.

wherein $R^9$ is alkyl having 1 to 10 carbons, alkenyl having 2 to 10 carbons or alkynyl having 2 to 10 carbons, in which in the alkyl, the alkenyl and the alkynyl, arbitrary hydrogen may be replaced by fluorine, and arbitrary —$CH_2$— may be replaced by —O—; $X^5$ is —C≡N, —N=C=S or —C≡C—C≡N; ring $G^1$, ring $G^2$ and ring $G^3$ are each independently 1,4-cyclohexylene, 1,4-phenylene, 1,4-phenylene, in which arbitrary hydrogen is replaced by fluorine or chlorine, naphthalen-2,6-diyl, or naphthalen-2,6-diyl, in which arbitrary hydrogen is replaced by fluorine, 1,3-dioxan-2,5-diyl, tetrahydropyran-2,5-diyl or pyrimidin-2,5-diyl; $Z^{19}$ is —$(CH_2)_2$—, —COO—, —$CF_2O$—, —$OCF_2$—, —C≡C—, —$CH_2O$— or a single bond; $L^{11}$ and $L^{12}$ are each independently hydrogen or fluorine; aa is 1 or 2; ab is 0 or 1; and aa+ab is 0, 1 or 2.

45. The liquid crystal composition according to one of items 20 to 44, wherein the liquid crystal composition further comprises at least one chiral agent, and does not exhibit an optically isotropic liquid crystal phase.

46. The liquid crystal composition according to item 45, wherein a ratio of the chiral agent is from approximately 0.001% to approximately 20% by weight based on the total amount of the liquid crystal composition.

47. The liquid crystal composition according to item 45 or 46, wherein the chiral agent is at least one compound selected from the group of compounds represented by formulas (K1) to (K5) and (Op-1) to (Op-13):

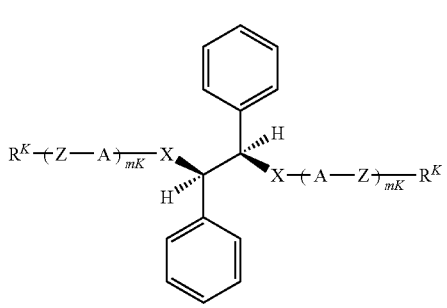
(K1)

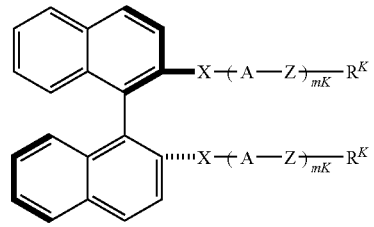
(K2)

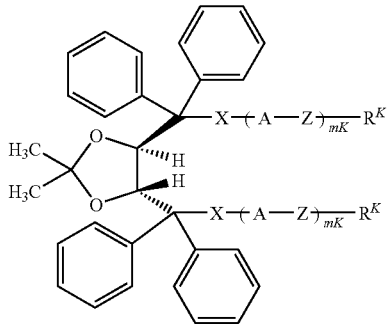
(K3)

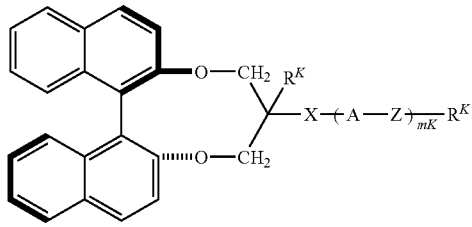
(K4)

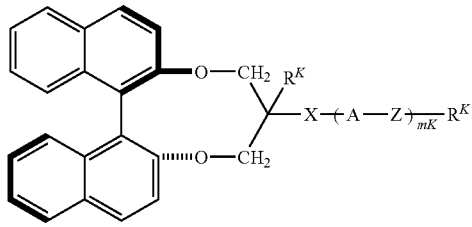
(K5)

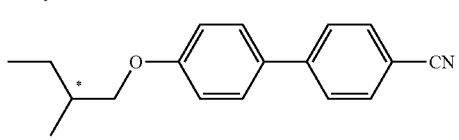
(Op-1)

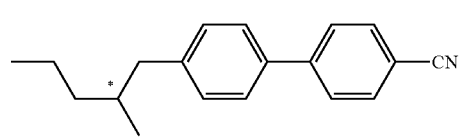
(Op-2)

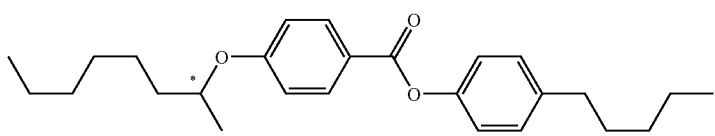
(Op-3)

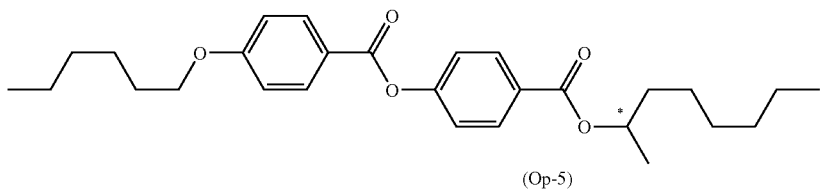
(Op-4)

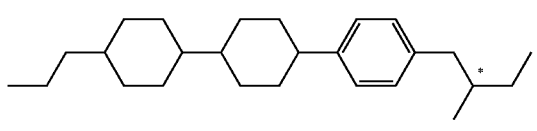
(Op-5)

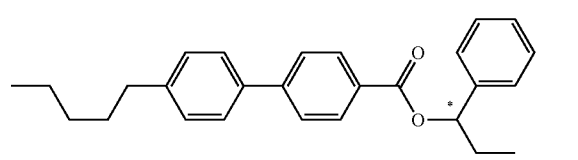
(Op-6)

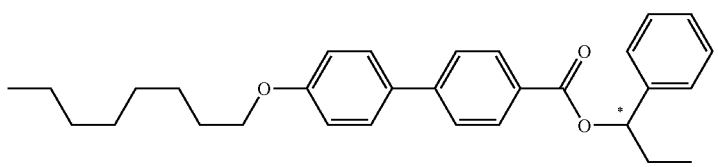
(Op-7)

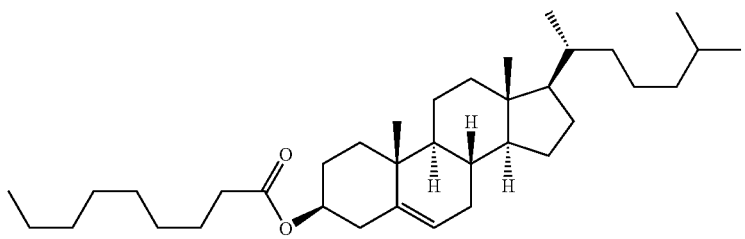
(Op-8)

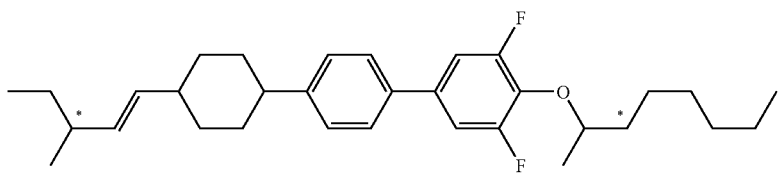
(Op-9)

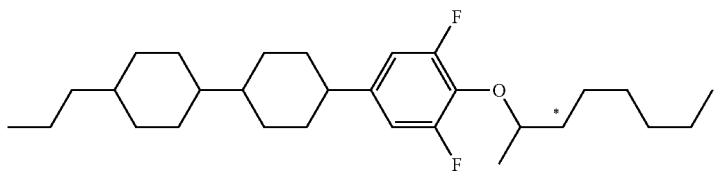
(Op-10)

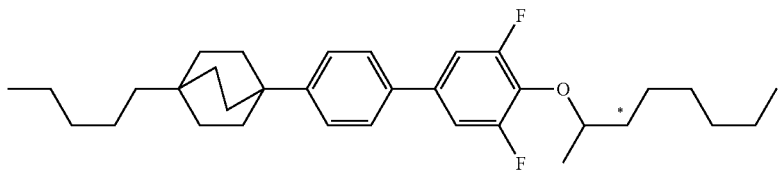
(Op-11)

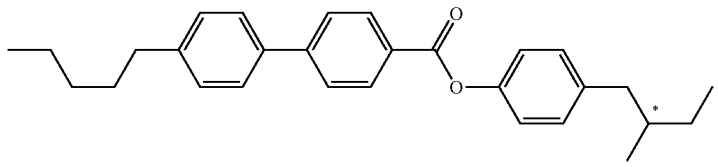
(Op-12)

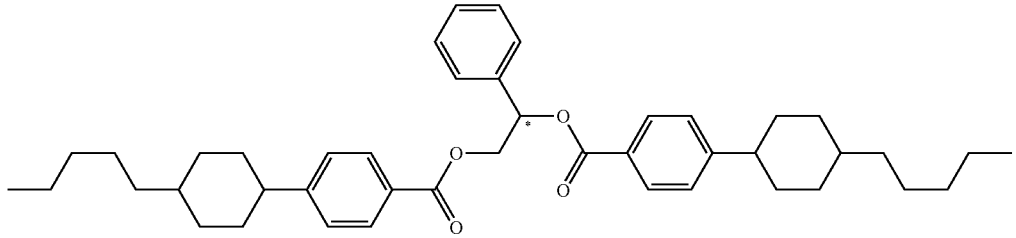
(Op-13)

wherein $R^K$ is independently hydrogen, halogen, —C≡N, —N=C=O, —N=C=S or alkyl having 1 to 20 carbons, in which in the alkyl, arbitrary —CH$_2$— may be replaced by —O—, —S—, —COO—, —OCO—, —CH=CH—, —CF=CF— or —C≡C—, and arbitrary hydrogen may be replaced by halogen;

A is independently an aromatic or nonaromatic 3-membered to 8-membered ring or a condensed ring having 9 or more carbons, in which in the rings, arbitrary hydrogen may be replaced by halogen, alkyl having 1 to 3 carbon or halogenated alkyl, in which in the rings, arbitrary —CH$_2$— may be replaced by —O—, —S— or —NH—, and arbitrary —CH= may be replaced by —N=;

Z is independently a single bond or alkylene having 1 to 8 carbons, in which in the alkylene, arbitrary —CH$_2$— may be replaced by —O—, —S—, —COO—, —OCO—, —CSO—, —OCS—, —N=N—, —CH=N—, —N=CH—, —CH=CH—, —CF=CF— or —C≡C—, and arbitrary hydrogen may be replaced by halogen;
X is a single bond, —COO—, —OCO—, —CH$_2$O—, —OCH$_2$—, —CF$_2$O—, —OCF$_2$— or —CH$_2$CH$_2$—; and mK is an integer of from 1 to 4.
48. The liquid crystal composition according to one of items 45 to 47, wherein the chiral agent is at least one compound selected from the group of compounds represented by formulas (K2-1) to (K2-8) and (K5-1) to (K5-3):
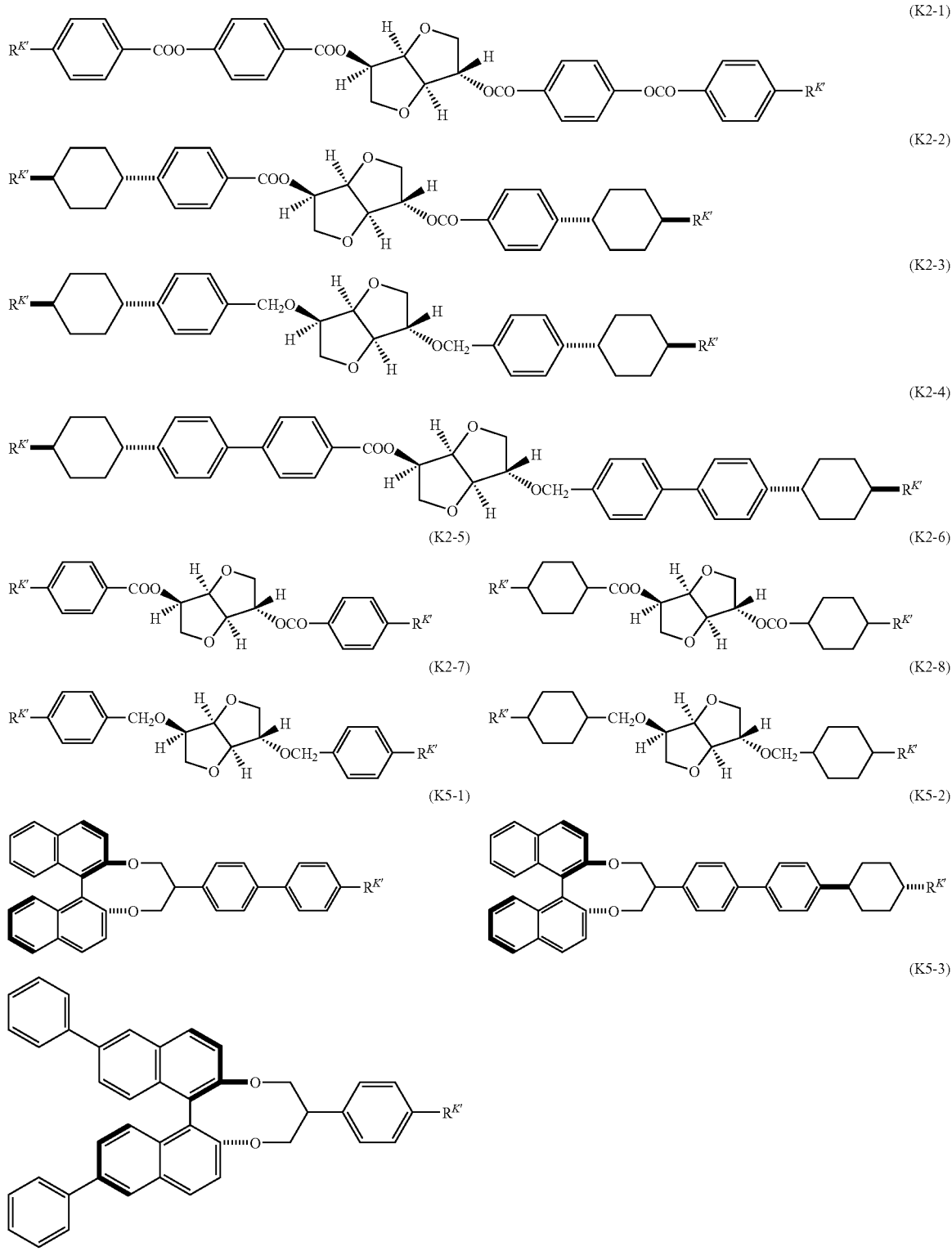

wherein $R^{K'}$ is independently alkyl having 3 to 10 carbons, in which in the alkyl, —CH$_2$— adjacent to the ring may be replaced by —O—, and arbitrary —CH$_2$— may be replaced by —CH=CH—.

49. A mixture comprising the liquid crystal composition according to one of items 20 to 48 and a polymerizable monomer.

50. The mixture according to item 49, wherein the polymerizable monomer is a photopolymerizable monomer or a thermally polymerizable monomer.

51. A polymer-liquid crystal composite material that does not exhibit an optically isotropic liquid crystal phase, the composite material being obtained by polymerizing the mixture according to item 49 or 50.

52. The polymer-liquid crystal composite material according to item 51, wherein the composite material uses the liquid crystal composition according to one of items 20 to 44, and exhibits two states including a scattering (transmission) state and a transmission (scattering) state through application and removal of an electric field.

53. The polymer-liquid crystal composite material according to item 51, wherein the composite material uses the liquid crystal composition according to one of items 45 to 48, and is obtained by polymerizing in a state where a planar structure of a cholesteric phase is exhibited.

54. The polymer-liquid crystal composite material according to one of items 51 to 53, wherein a ratio of the liquid crystal composition is in a range of from approximately 60% to approximately 99% by weight, and a ratio of the polymer is from approximately 1% to approximately 40% by weight.

55. The liquid crystal composition according to one of items 20 to 44, wherein the liquid crystal composition further comprises at least one antioxidant and/or at least one ultraviolet ray absorbent.

56. An optical device comprising the liquid crystal composition or the polymer-liquid crystal composite material according to one of items 20 to 48 or the polymer-liquid crystal composite material according to items 51 to 55.

57. A liquid crystal display device comprising the liquid crystal composition according to one of items 20 to 48.

58. The liquid crystal display device according to item 57, wherein an operation mode of the liquid crystal display device is a TN mode, an OCB mode or an IPS mode, and a driving mode of the liquid crystal display device is an active matrix mode.

1-1 Compound of the Invention

The invention concerns, as a first aspect, a compound represented by formula (1):

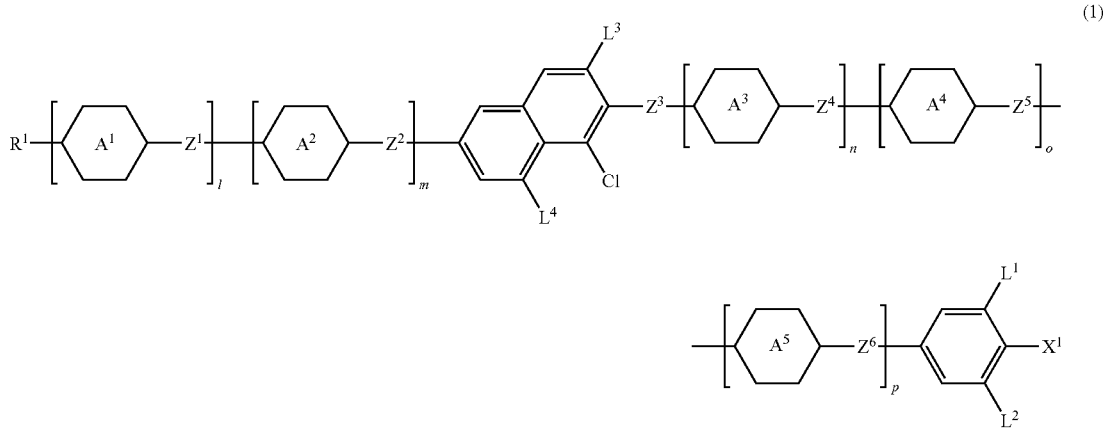

In formula (1), $R^1$ is hydrogen or alkyl having 1 to 20 carbons, in which in the alkyl, arbitrary —CH$_2$— may be replaced by —O—, —S—, —COO—, —CH=CH— or —C≡C—, and arbitrary hydrogen may be replaced by halogen or alkyl having 1 to 3 carbons.

For example, examples of CH$_3$(CH$_2$)$_3$—, in which arbitrary —CH$_2$— is replaced by —O—, —S—, —CH=CH— or —C≡C—, include CH$_3$(CH$_2$)$_2$O—, CH$_3$—O—(CH$_2$)$_2$—, CH$_3$—O—CH$_2$—O—, CH$_3$(CH$_2$)$_2$—S—, CH$_3$—S—(CH$_2$)$_2$—, CH$_3$—S—CH$_2$—S—, CH$_2$=CH—(CH$_2$)$_3$—, CH$_3$—CH=CH—(CH$_2$)$_2$—, CH$_3$—CH=CH—CH$_2$—O— and CH$_3$CH$_2$C≡C—. Examples of CH$_3$(CH$_2$)$_3$— or CH$_3$(CH$_2$)$_3$—, in which arbitrary —CH$_2$— is replaced by —O—, —C≡C— or —CH=CH—, in which arbitrary hydrogen is replaced by halogen, include ClCH$_2$(CH$_2$)$_3$—, CF$_2$=CH—(CH$_2$)$_3$—, CH$_2$F(CH$_2$)$_2$—O— and CH$_2$FCH$_2$C≡C—.

$R^1$ is preferably a linear group rather than a branched group. Even in the case where $R^1$ is a branched group, it is preferred when the compound is optically active. The preferred steric configuration of —CH=CH— in the alkenyl depends on the position of the double bond. In the alkenyl having a double bond at the odd number position, such as —CH=CHCH$_3$, —CH=CHC$_2$H$_5$, —CH=CHC$_3$H$_7$, —CH=CHC$_4$H$_9$, —C$_2$H$_4$CH=CHCH$_3$ and —C$_2$H$_4$CH=CHC$_2$H$_5$, a trans configuration is preferred. In the alkyl having a double bond at the even number position, such as —CH$_2$CH=CHCH$_3$, —CH$_2$CH=CHC$_2$H$_5$ and —CH$_2$CH=CHC$_3$H$_7$, a cis configuration is preferred. An alkenyl compound having a preferred steric configuration has a high maximum temperature or a wide temperature range of a liquid crystal phase. The compound is disclosed in detail in Mol. Cryst. Liq. Cryst., 131 109 (1985) and Mol. Cryst. Liq. Cryst., 131, 327 (1985).

The alkyl may be linear or branched, and specific examples of the alkyl include —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —C$_{11}$H$_{23}$, —C$_{12}$H$_{25}$, —C$_{13}$H$_{27}$, —C$_{14}$H$_{29}$ and —C$_{15}$H$_{31}$.

The alkoxy may be linear or branched, and specific examples of the alkoxy include —OCH$_3$, —OC$_2$H$_5$, —OC$_3$H$_7$, —OC$_4$H$_9$, —OC$_5$H$_{11}$, —OC$_6$H$_{13}$, —OC$_7$H$_{15}$, —OC$_8$H$_{17}$, —OC$_9$H$_{19}$, —OC$_{10}$H$_{21}$, —OC$_{11}$H$_{23}$, —OC$_{12}$H$_{25}$, —OC$_{13}$H$_{27}$ and —OC$_{14}$H$_{29}$.

The alkoxyalkyl may be linear or branched, and specific examples of the alkoxyalkyl include —CH$_2$OCH$_3$, —CH$_2$OC$_2$H$_5$, —CH$_2$OC$_3$H$_7$, —(CH$_2$)$_2$OCH$_3$, —(CH$_2$)$_2$OC$_2$H$_5$, —(CH$_2$)$_2$OC$_3$H$_7$, —(CH$_2$)$_3$OCH$_3$, —(CH$_2$)$_4$OCH$_3$ and —(CH$_2$)$_5$OCH$_3$.

The alkenyl may be linear or branched, and specific examples of the alkenyl include —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$—CH=CH$_2$, —CH=CHC$_3$H$_7$, —CH$_2$CH=CHC$_2$H$_5$, —(CH$_2$)$_2$—CH=CHCH$_3$ and —(CH$_2$)$_3$—CH=CH$_2$.

The alkenyloxy may be linear or branched, and specific examples of the alkenyloxy include —OCH$_2$CH=CH$_2$, —OCH$_2$CH=CHCH$_3$ and —OCH$_2$CH=CHC$_2$H$_5$.

The alkynyl may be linear or branched, and specific examples of the alkynyl include —C≡CH, —C≡CCH$_3$, —CH$_2$C≡CH, —C≡CC$_2$H$_5$, —CH$_2$C≡CCH$_3$, —(CH$_2$)$_2$—C≡CH, —C≡CC$_3$H$_7$, —CH$_2$C≡CC$_2$H$_5$, —(CH$_2$)$_2$—C≡CCH$_3$ and —C≡C(CH$_2$)$_5$, and —C≡CCH$_3$, —C≡CC$_2$H$_5$, —C≡CC$_3$H$_7$ and —C≡C(CH$_2$)$_5$, in which the triple bond is at the position closest to the ring, are preferred.

R$^1$ is preferably groups represented by formulas (AC-1) to (AC-19), in which R$^{1a}$ has the same meaning as mentioned above.

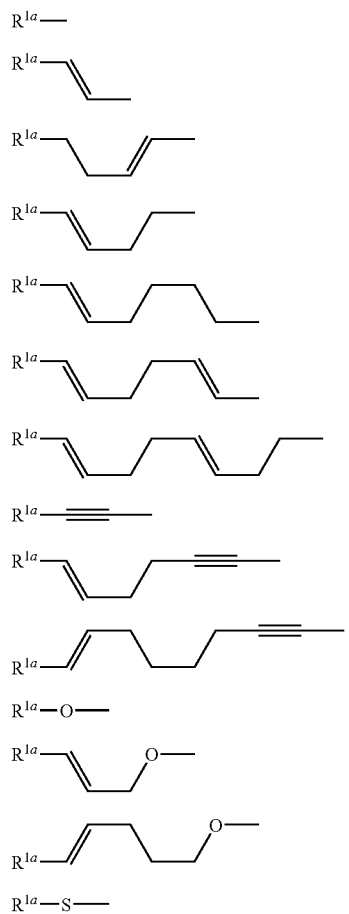

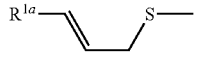
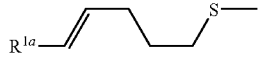
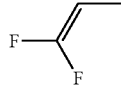
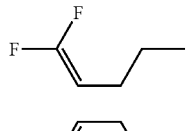
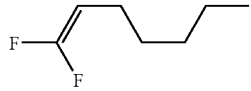

R$^1$ is more preferably groups represented by formulas (AC-1), (AC-4), (AC-7), (AC-8), (AC-11) and (AC-14), in which R$^{1a}$ has the same meaning as mentioned above.

| | |
|---|---|
| R$^{1a}$— | (AC-1) |
| R$^{1a}$——— | (AC-4) |
| R$^{1a}$——— | (AC-7) |
| R$^{1a}$—≡—— | (AC-8) |
| R$^{1a}$—O— | (AC-11) |
| R$^{1a}$—S— | (AC-14) |

Among the compounds, a compound having a group represented by formula (AC-1), (AC-4) or (AC-7) has a low viscosity, and a compound having a group represented by formula (AC-8) has a large refractive index anisotropy. In the case where l+m+n+o+p=0, in particular, a compound having a group represented by formula (AC-8) is preferred from the standpoint of clear point and refractive index anisotropy.

In formula (1), ring A$^1$, ring A$^2$, ring A$^3$, ring A$^4$ and ring A$^5$ are each independently a benzene ring, a piperidine ring, a tetrahydropyrane ring or a dioxane ring, in which in the rings, arbitrary hydrogen may be replaced by halogen, alkyl having 1 to 3 carbons, alkoxy having 1 to 3 carbons or halogenated alkyl having 1 to 3 carbons, and —CH= may be replaced by —N=. Preferred examples of ring A$^1$, ring A$^2$, ring A$^3$, ring A$^4$ and ring A$^5$ include rings represented by formulas (RG-1) to (RG-10).

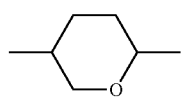
(RG-1)

-continued

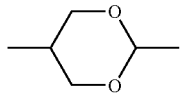 (RG-2)

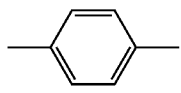 (RG-3)

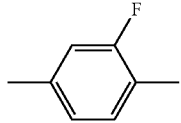 (RG-4)

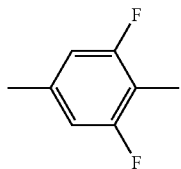 (RG-5)

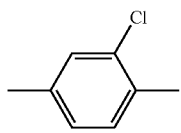 (RG-6)

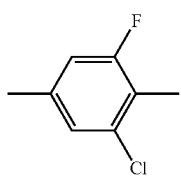 (RG-7)

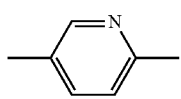 (RG-8)

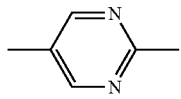 (RG-9)

 (RG-10)

More preferred examples of ring $A^1$, ring $A^2$, ring $A^3$, ring $A^4$ and ring $A^5$ include rings represented by formulas (RG-2), (RG-3), (RG-4), (RG-5), (RG-7), (RG-9) and (RG-10).

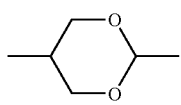 (RG-2)

 (RG-3)

-continued

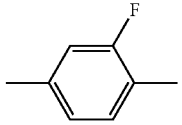 (RG-4)

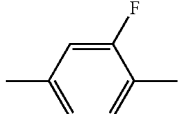 (RG-5)

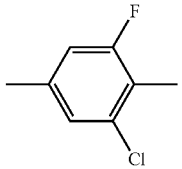 (RG-7)

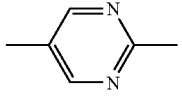 (RG-9)

 (RG-10)

Ring $A^3$ is preferably a ring represented by formula (RG-5) from the standpoint of balance between compatibility and dielectric anisotropy.

In the case where ring $A^1$ is one selected from rings represented by formulas (RG-2), (RG-3), (RG-4), (RG-5), (RG-7), (RG-9) and (RG-10), excellent characteristics can be obtained. Rings $A^3$ to $A^5$ are preferably each independently one selected from rings represented by formulas (RG-3) to (RG-9) from the standpoint of balance among clear point, compatibility, refractive index anisotropy and dielectric anisotropy.

Among the compounds, a compound having a ring represented by formula (RG-5), (RG-7) or (RG-9) particularly has a large refractive index anisotropy and a large dielectric anisotropy, and a compound having a ring represented by formula (RG-2) or (RG-10) has a large dielectric anisotropy and good compatibility.

In formula (1), $Z^1$, $Z^2$, $Z^4$, $Z^5$ and $Z^6$ are each independently a single bond, —COO— or —CF$_2$O—, and $Z^3$ is a single bond or —CF$_2$O—.

In the case where a large dielectric constant and good compatibility are demanded, one of $Z^1$, $Z^2$, $Z^3$, $Z^4$, $Z^5$ and $Z^6$ is preferably —CF$_2$O—. In the case where $Z^1$, $Z^2$, $Z^3$, $Z^4$, $Z^5$ and $Z^6$ are all single bonds, a large refractive index anisotropy is exhibited.

In formula (1), $L^1$, $L^2$, $L^3$ and $L^4$ are each independently hydrogen or halogen, and $L^1$, $L^2$, $L^3$ and $L^4$ are preferably each independently hydrogen or fluorine.

In formula (1), $X^1$ is hydrogen, halogen, —C≡N, —N=C=S, —C≡C—C≡N, —SF$_5$ or alkyl having 1 to 10 carbons, in which in the alkyl, arbitrary —CH$_2$— may be replaced by —O—, —S—, —CH=CH— or —C≡C—, and arbitrary hydrogen may be replaced by halogen.

Specific examples of the alkyl, in which arbitrary hydrogen is replaced by halogen, include —CH$_2$F, —CHF$_2$, —CF$_3$, —(CH$_2$)$_2$—F, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$, —CHFCF$_2$CF$_3$, —(CH$_2$)$_4$—F, —(CF$_2$)$_4$—F, —(CH$_2$)$_5$—F and —(CF$_2$)$_5$—F.

Specific examples of the alkoxy, in which arbitrary hydrogen is replaced by halogen, include —OCH$_2$F, —OCHF$_2$, —OCF$_3$, —O—(CH$_2$)$_2$—F, —OCF$_2$CH$_2$F, —OCF$_2$CHF$_2$, —OCH$_2$CF$_3$, —O—(CH$_2$)$_3$—F, —O—(CF$_2$)$_3$—F, —OCF$_2$CHFCF$_3$, —OCHFCF$_2$CF$_3$, —O(CH$_2$)$_4$—F, —O—(CF$_2$)$_4$—F, —O—(CH$_2$)$_5$—F and —O—(CF$_2$)$_5$—F.

Specific examples of the alkenyl, in which arbitrary hydrogen is replaced by halogen, include —CH=CHF, —CH=CF$_2$, —CF=CHF, —CH=CHCH$_2$F, —CH=CHCF$_3$, —(CH$_2$)$_2$—CH=CF$_2$, —CH$_2$CH=CHCF$_3$ and —CH=CHCF$_2$CF$_3$.

Specific examples of X$^1$ include hydrogen, fluorine, chlorine, —C≡N, —N=C=S, —SF$_5$, —CH$_3$, —C$_2$H$_5$, —C$_3$H$_7$, —C$_4$H$_9$, —C$_5$H$_{11}$, —C$_6$H$_{13}$, —C$_7$H$_{15}$, —C$_8$H$_{17}$, —C$_9$H$_{19}$, —C$_{10}$H$_{21}$, —CH$_2$F, —CHF$_2$, —CF$_3$, —(CH$_2$)$_2$—F, —CF$_2$CH$_2$F, —CF$_2$CHF$_2$, —CH$_2$CF$_3$, —CF$_2$CF$_3$, —(CH$_2$)$_3$—F, —(CF$_2$)$_3$—F, —CF$_2$CHFCF$_3$, —CHFCF$_2$CF$_3$, —(CH$_2$)$_4$—F, —(CF$_2$)$_4$—F, —(CH$_2$)$_5$—F, —(CF$_2$)$_5$—F, —OCH$_3$, —OC$_2$H$_5$, —OC$_3$H$_7$, —OC$_4$H$_9$, —OC$_5$H$_{11}$, —OCH$_2$F, —OCHF$_2$, —OCF$_3$, —O—(CH$_2$)$_2$—F, —OCF$_2$CH$_2$F, —OCF$_2$CHF$_2$, —OCH$_2$CF$_3$, —O—(CH$_2$)$_3$—F, —O—(CF$_2$)$_3$—F, —OCF$_2$CHFCF$_3$, —OCHFCF$_2$CF$_3$, —O(CH$_2$)$_4$—F, —O—(CF$_2$)$_4$—F, —O—(CH$_2$)$_5$—F, —O—(CF$_2$)$_5$—F, —CH=CH$_2$, —CH=CHCH$_3$, —CH$_2$CH=CH$_2$, —CH=CHC$_2$H$_5$, —CH$_2$CH=CHCH$_3$, —(CH$_2$)$_2$—CH=CH$_2$, —CH=CHC$_3$H$_7$, —CH$_2$CH=CHC$_2$H$_5$, —(CH$_2$)$_2$—CH=CHCH$_3$, —(CH$_2$)$_3$—CH=CH$_2$, —CH=CHF, —CH=CF$_2$, —CF=CHF, —CH=CHCH$_2$F, —CH=CHCF$_3$, —(CH$_2$)$_2$—CH=CF$_2$, —CH$_2$CH=CHCF$_3$ and —CH=CHCF$_2$CF$_3$.

Preferred examples of X$^1$ include fluorine, chlorine, —C≡N, —CF$_3$, —CHF$_2$, —CH$_2$F, —OCF$_3$, —OCHF$_2$ and —OCH$_2$F. More preferred examples of X$^1$ include fluorine, chlorine, —CF$_3$ and OCF$_3$.

In formula (1), l, m, n, o and p are each independently 0 or 1, provided that l+m+n+o+p≦4, preferably l+m+n+o+p≦3, and more preferably l+m+n+o+p≦2.

Preferred examples of the compound represented by formula (1) include compounds represented by formulas (1-1) to (1-9).

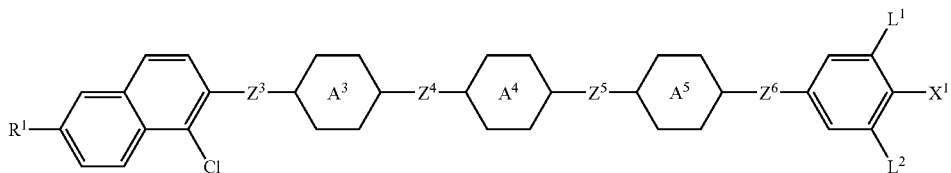

(1-1)

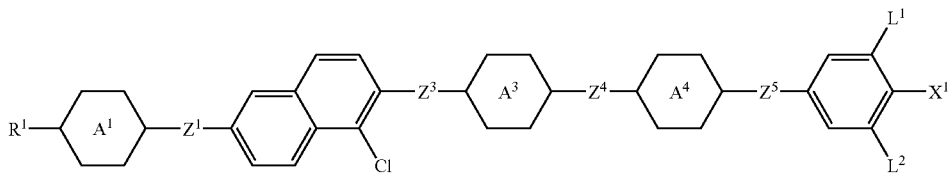

(1-2)

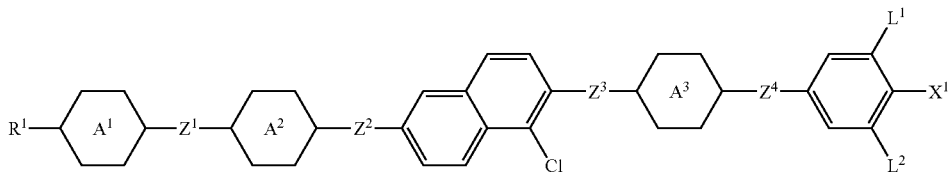

(1-3)

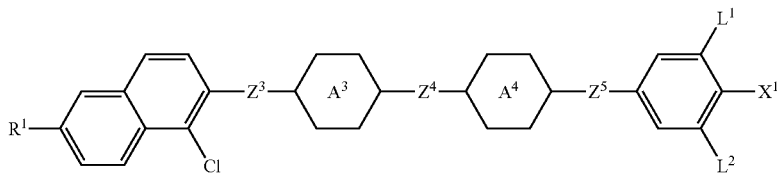

(1-4)

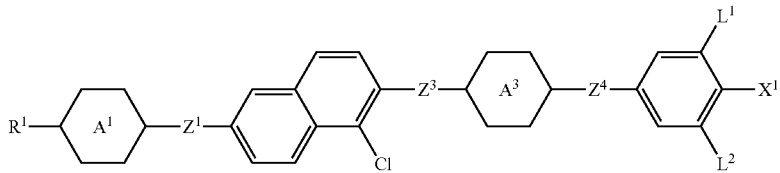

(1-5)

-continued

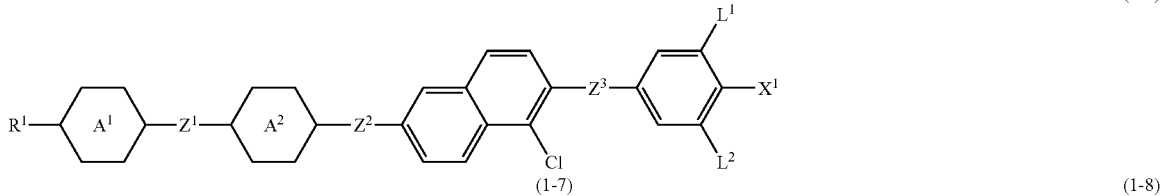
(1-6)

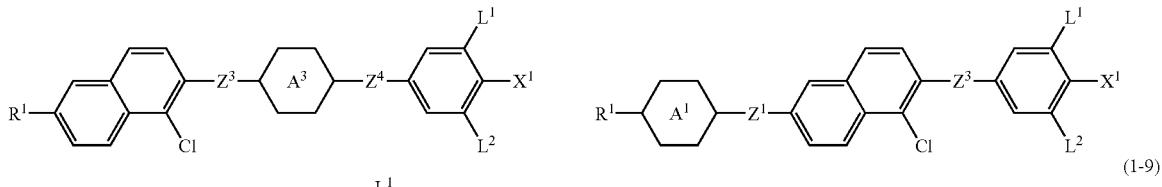
(1-7) (1-8)

(1-9)

In these formulas, $R^1$ is a group represented by one of formulas (AC-1) to (AC-19); $R^{1a}$ has the same meaning as above; ring $A^1$, ring $A^2$, ring $A^3$, ring $A^4$ and ring $A^5$ are each independently a ring represented by one of formulas (RG-1) to (RG-10); $Z^1$, $Z^2$, $Z^4$, $Z^5$ and $Z^6$ are each independently a single bond, —COO— or —CF$_2$O—; $Z^3$ is a single bond or —CF$_2$O—, and in the case where $Z^3$ is a single bond, ring $A^3$ is a ring represented by formula (RG-5), or $L^1$ and $L^2$ are both fluorine, or at least one of $Z^1$, $Z^2$, $Z^4$, $Z^5$ and $Z^6$ is —CF$_2$O—; $L^1$ and $L^2$ are each independently hydrogen, fluorine or chlorine; and $X^1$ is fluorine, chlorine, —C≡N, —CF$_3$, —CHF$_2$, —CH$_2$F, —OCF$_3$, —OCHF$_2$, —OCH$_2$F or —CH=CH—CF$_3$.

The compound represented by formula (1) is preferably a compound represented by formulas (1-4) to (1-9), and more preferably a compound represented by formulas (1-7) to (1-9), from the standpoint of compatibility. Among these compounds, a compound represented by formula (1-7) is more preferred from the standpoint of balance between clear point and dielectric anisotropy.

1-2 Properties of Compound of the Invention

The compound (1) of the invention will be described in more detail. The compound (1) is a liquid crystal compound having a chloronaphthalene ring. The compound is significantly stable physically and chemically under conditions where a device is generally used, and is excellent in compatibility with other liquid crystal compounds. A composition containing the compound is stable under conditions where a device is generally used. Accordingly, the temperature range of a nematic phase of the composition can be enhanced, and the composition can be applied to a display device that is capable of being used in a wide temperature range. Since the compound has a large dielectric anisotropy and a large refractive index anisotropy, and thus the compound is useful as a component for decreasing a threshold voltage of a composition driven in a nematic phase, is useful as a component for decreasing a driving voltage of a composition driven in an optically isotropic liquid crystal phase, and is useful as a component for decreasing a driving voltage of a composition driven under condition that is not an optically isotropic liquid crystal phase.

The compound (1) can be arbitrarily controlled in characteristics, such as clear point, refractive index anisotropy, dielectric anisotropy and so forth, by selecting properly the combination of l, m, n, o and p, the species of rings $A^1$ to $A^5$, the left end group $R^1$, the species and the positions of the groups on the benzene ring on the right end ($L^1$, $L^2$ and $X^1$), and the bonding groups $Z^1$ to $Z^6$. The effects of the combination of l, m, n, o and p, and species of rings $A^1$ to $A^5$, $R^1$ as the left end group, $X^1$ as the right end group, $Z^1$ to $Z^6$ as the bonding groups, and $L^1$ and $L^2$ on the characteristics of the compound (1) will be described.

In general, the clearing point is increased when l+m+n+o+p is larger, the melting point is decreased when l+m+n+o+p is smaller.

The refractive index anisotropy is increased when a larger number of aromatic groups are contained in rings $A^1$ to $A^6$. 1,4-Phenylene, a piperidine ring, a pyrimidine ring, a pyridine ring, a tetrahydrofuran ring and 1,3-dioxan-2,5-diyl, in which arbitrary hydrogen is replaced by halogen, are effective for exhibiting a large dielectric anisotropy, and a piperidine ring and a tetrahydropyran ring contribute to exhibition of good compatibility.

In the case where $R^1$ is a linear chain, the temperature range of a liquid crystal phase is wide, and the viscosity is small. In the case where $R^1$ is a branched chain, the compatibility with other liquid crystal compounds is good. The compound where $R^1$ is an optically active group is useful as a chiral dopant. The addition of the compound prevents a reverse twisted domain from being generated in a TN type display device. The compound where $R^1$ is not an optically active group is useful as a component of the composition. In the case where $R^1$ is alkenyl, the preferred steric configuration depends on the position of the double bond. The alkenyl compound having a preferred steric configuration has a high maximum temperature or a wide temperature range of a liquid crystal phase.

In the case where the bonding groups $Z^1$, $Z^2$, $Z^4$, $Z^5$ and $Z^6$ are each —COO— or —CF$_2$O—, the dielectric anisotropy is increased. In the case where $Z^1$, $Z^2$, $Z^3$, $Z^4$, $Z^5$ and $Z^6$ are each a single bond or —CF$_2$O—, the compound is relatively stable chemically and is relatively hard to suffer deterioration.

In the case where the right end group $X^1$ is fluorine, chlorine, $-C\equiv N$, $-N=C=S$, $-SF_5$, $-CF_3$, $-CHF_2$, $-CH_2F$, $-OCF_3$, $-OCHF_2$ or $-OCH_2F$, the dielectric anisotropy is large. In the case where $X^1$ is $-C\equiv N$, $-N=C=S$ or alkenyl, the refractive index anisotropy is large. In the case where $X^1$ is fluorine, $-OCF_3$ or alkyl, the compound is chemically stable.

In the case where $L^1$ and $L^2$ are both fluorine, and $X^1$ is fluorine, chlorine, $-C\equiv N$, $-N=C=S$, $-SF_5$, $-CF_3$, $-CHF_2$, $-CH_2F$, $-OCF_3$, $-OCHF_2$ or $-OCH_2F$, the dielectric anisotropy is large. In the case where $L^1$ is fluorine, and $X^1$ is $-CF_3$ or $-OCF_3$, in the case where $L^1$ and $L^2$ are both fluorine, and $X^1$ is $-CF_3$ or $-OCF_3$, or in the case where $L^1$, $L^2$ and $X^1$ are all fluorine, the dielectric anisotropy is large, the temperature range of a liquid crystal phase is wide, and the compound is chemically stable to be hard to suffer deterioration.

A compound having target characteristics can be obtained by properly selecting the species of the ring structures, the end groups, the bonding groups and so forth.

1-3 Specific Examples of Compound (1)

Preferred examples of the compound (1) include the compounds represented by formulas (1-1) to (1-9) shown in the item (11). More preferred examples of the compound (1) include compounds represented by formulas (1-4A) to (1-4E), (1-5A) to (1-5G), (1-6A) to (1-6G), (1-7A) to (1-7D), (1-8A) to (1-8E) and (1-9A).

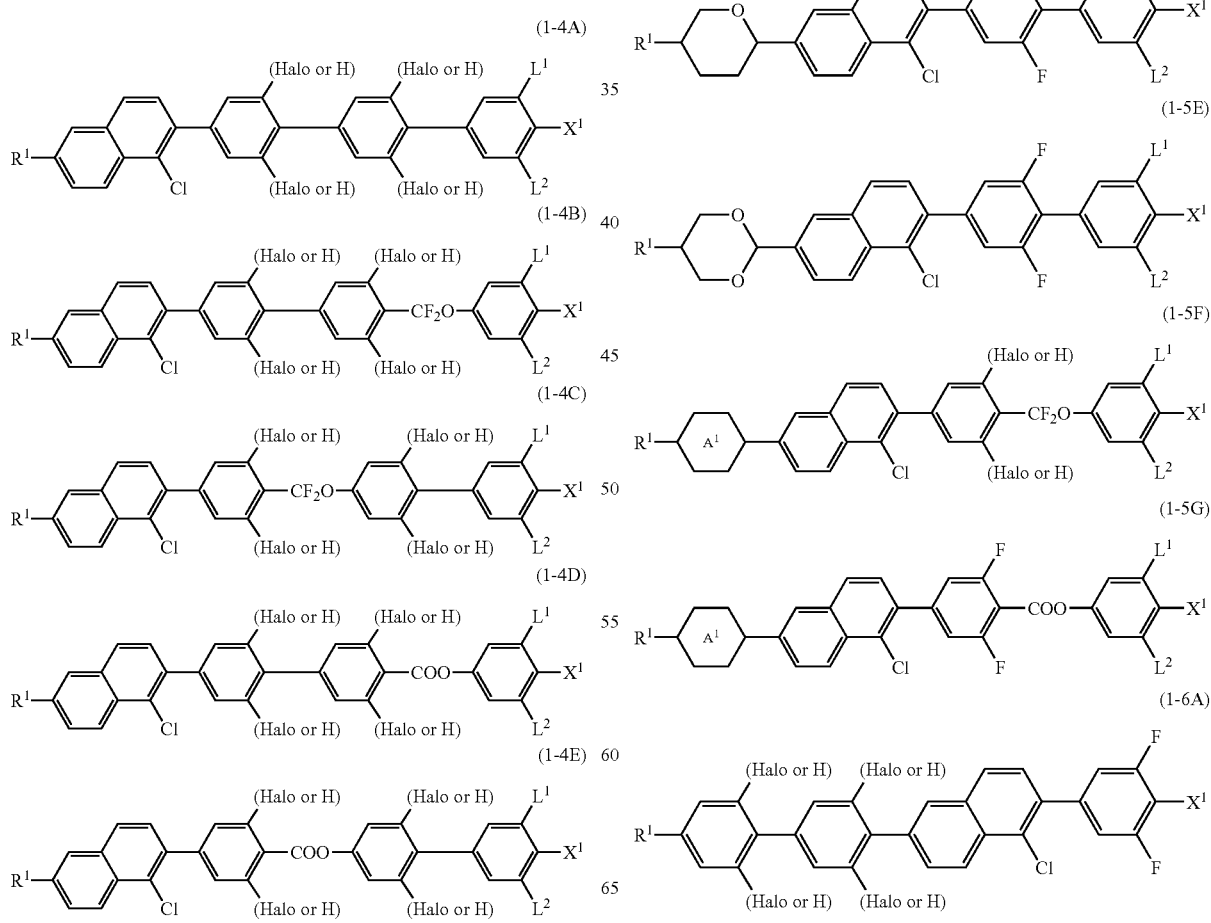

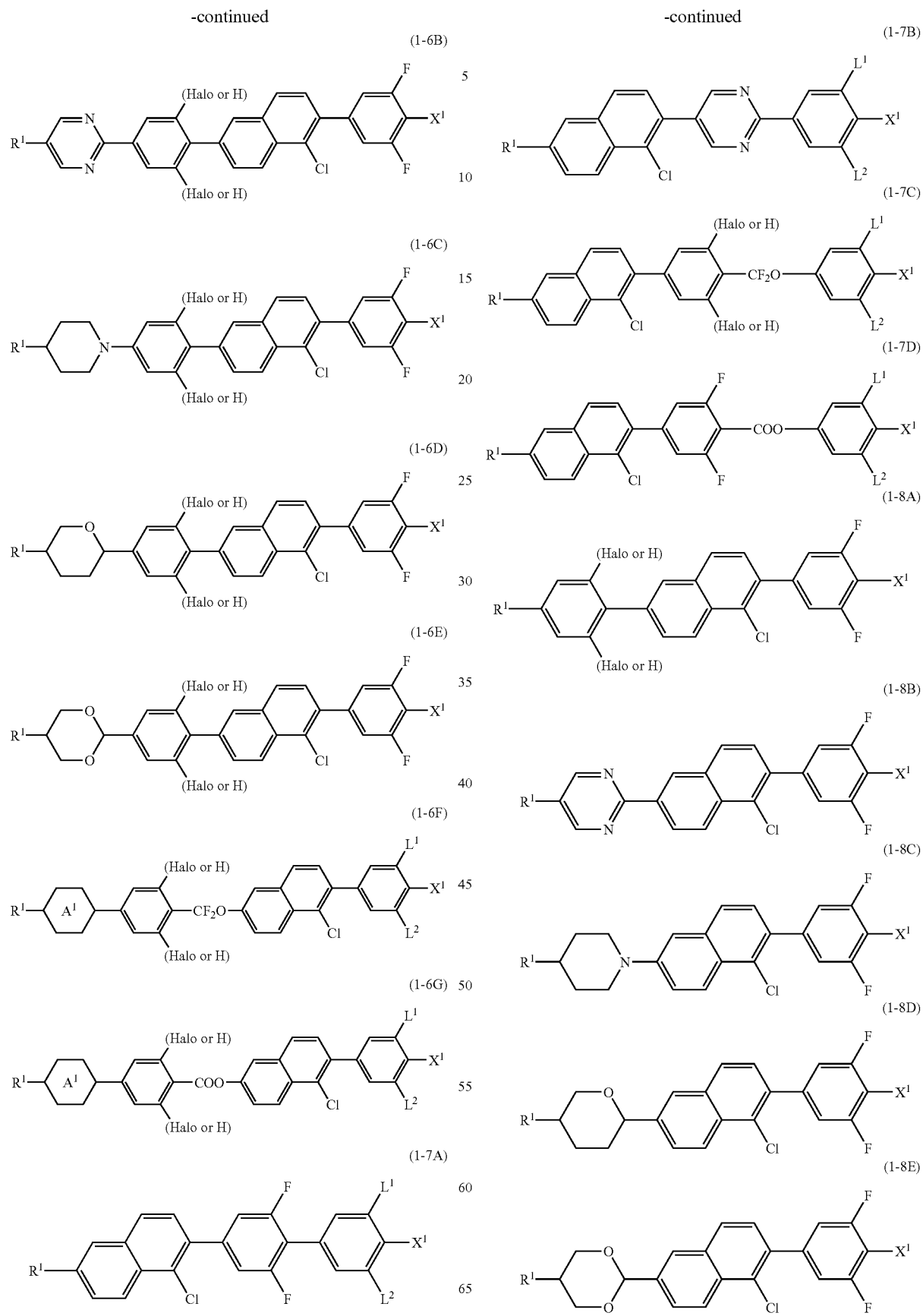

-continued

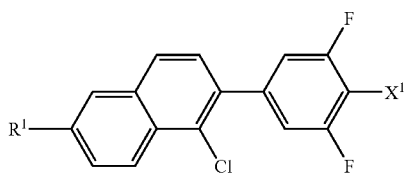
(1-9A)

In these formulas, $R^1$ is one selected from groups represented by formulas (AC-1), (AC-4), (AC-7), (AC-8), (AC-11) and (AC-14); ring $A^1$ is one selected from rings represented by formulas (RG-2), (RG-3), (RG-4), (RG-5), (RG-7), (RG-9) and (RG-10); $L^1$ and $L^2$ are each independently hydrogen or fluorine; $X^1$ is fluorine, chlorine, —C≡N, —CF$_3$, —CHF$_2$, —CH$_2$F, —OCF$_3$, —OCHF$_2$ or —OCH$_2$F.

1-4 Synthesis of Compound (1)

The synthesis method of the compound (1) will be described. The compound (1) can be synthesized by combining properly known methods in organic synthetic chemistry. The methods for introducing target end groups, rings and bonding groups to a starting material are disclosed in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.), and so forth.

1-4-1 Method for forming Chloronaphthalene Ring

A 1-chloronaphthalene ring can be formed, for example, by the method disclosed in Synlett., No. 18, 2837 (2005).

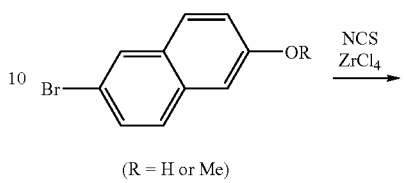

(R = H or Me)

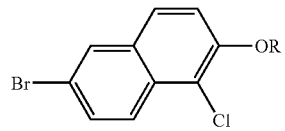

1-4-2 Method for forming Bonding Groups $Z^1$ to $Z^6$

One example of a method for forming bonding groups $Z^1$ to $Z^6$ in the compound (1) is shown by the following scheme. In the scheme, MSG$^1$ or MSG$^2$ is a monovalent organic group having at least one ring. Plural MSG$^1$ (or MSG$^2$) used in the scheme may be the same as or different from each other. The compounds (1A) to (1C) correspond to the compound (1).

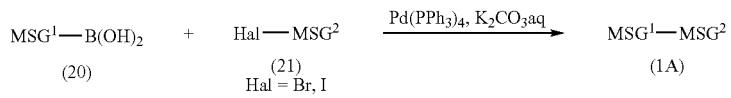

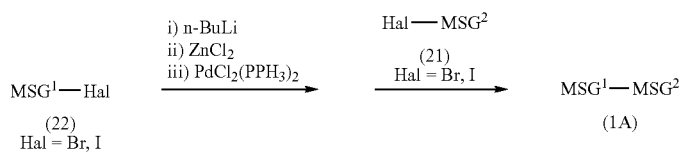

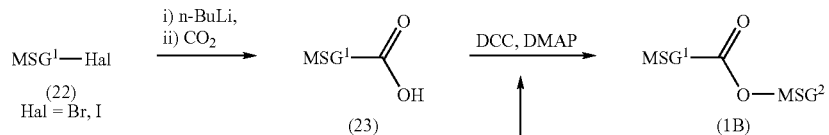

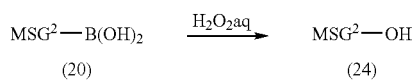

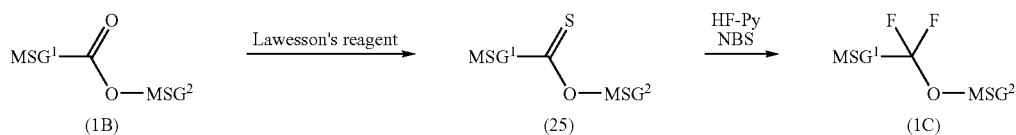

Methods for forming various bonds for the bonding groups $Z^1$ to $Z^6$ in the compound (1) will be described in the following items (I) to (III).

(I) Formation of Single Bond

Aryl borate (20) and a compound (21) synthesized by a known method are reacted with each other in the presence of a carbonate salt aqueous solution and a catalyst, such as tetrakis(triphenylphosphine) palladium, to synthesize a compound (1A). The compound (1A) can be also synthesized by reacting a compound (22) synthesized by a known method with n-butyl lithium and then with zinc chloride, and then reacting with the compound (21) in the presence of a catalyst, such as dichlorobis(triphenylphosphine) palladium.

(II) Formation of —COO—

A compound (22) is reacted with n-butyl lithium and then with carbon dioxide to provide a carboxylic acid (23). The compound (23) and a phenol (24) synthesized by a known method are dehydrated in the presence of DCC (1,3-dichlorohexylcarbodiimide) and DMAP (4-dimethylaminopyridine) to synthesize a compound (1B) having —COO—.

(III) Formation of —CF$_2$O—

The compound (1B) is treated with a sulfurizing agent, such as Lawesson's reagent, to provide a compound (25). The compound (25) is fluorinated with a hydrogen fluoride pyridine complex and NBS (N-bromosuccinimide) to synthesize a compound (1C) having —CF$_2$O— (see M. Kuroboshi, et al., Chem. Lett., 1992 827). The compound (1C) can be also synthesized by fluorinating the compound (25) with (diethylamino)sulfurtrifluoride (DAST) (see W. H. Bunnelle, et al., J. Org. Chem., 55, 768 (1990)). The bonding group can also be formed by the method disclosed in Peer. Kirsch, et al., Angew. Chem. Int. Ed., 40, 1480 (2001).

1-4-3 Method for Forming Ring $A^1$, Ring $A^2$, Ring $A^3$, Ring $A^4$, Ring $A^5$ and Ring $A^6$ Starting materials are commercially available, or synthesis methods therefore have been well known in the art for the rings, such as piperidin-1,4-diyl, 1,3-dioxan-2,5-diyl, 1,4-phenylene, 2-fluoro-1,4-phenylene, 2,3-difluoro-1,4-phenylene, 2,5-difluoro-1,4-phenylene, 2,6-difluoro-1,4-phenylene, 2,3,5,6-tetrafluoro-1,4-phenylene, pyrimidin-2,5-diyl, pyridin-2,5-diyl and so forth.

1-4-3-1 Method for Synthesizing Compound (1)

The compound represented by formula (1) can be synthesized by plural methods from commercially available reagents with reference to the examples of the invention, the literatures, the books and so forth.

2 Composition of the Invention

The invention concerns, as a second aspect, a composition containing the compound represented by formula (1), which may be a liquid crystal composition that is preferably applied to a device driven in a nematic phase, a chiral nematic mode. The liquid crystal composition of the invention necessarily contains the compound represented by formula (1) of the invention as a component A. The composition may be a composition containing only the component A or a composition containing the component A and another component, the component name of which is not specified herein. The liquid crystal composition of the invention with various characteristics can be provided by adding a component selected from the following components B, C, D and E to the component A.

Preferred examples of the component to be added to the component A include the component B containing at least one compound selected from the group of compounds represented by formulas (2), (3) and (4), the component C containing at least one compound selected from the group of compounds represented by formula (5), and the component D containing at least one compound selected from the group of compounds represented by formulas (6), (7), (8), (9) and (10).

The component E containing at least one compound selected from the group of compounds represented by formula (11), (12) and (13) may be added for controlling the threshold voltage, the temperature range of a liquid crystal phase, the refractive index anisotropy, the dielectric anisotropy, the viscosity and so forth.

The components of the liquid crystal composition used in the invention may be analogues thereof containing isotopes of the elements constituting the components since there is no large physical difference among them.

In the component B, preferred examples of the compound represented by formula (2) include compounds represented by formulas (2-1) to (2-16), preferred examples of the compound represented by formula (3) include compounds represented by formulas (3-1) to (3-112), and preferred examples of the compound represented by formula (4) include compounds represented by formulas (4-1) to (4-52).

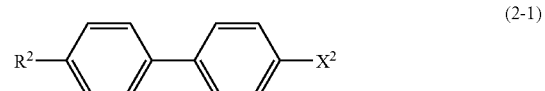

(2-1)

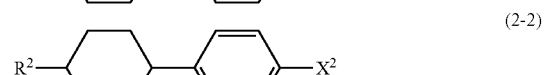

(2-2)

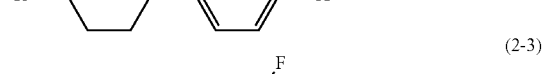

(2-3)

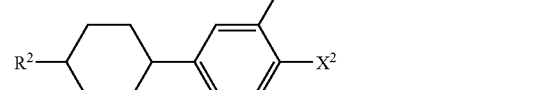

(2-4)

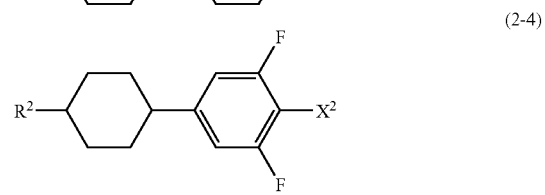

(2-5)

(2-6)

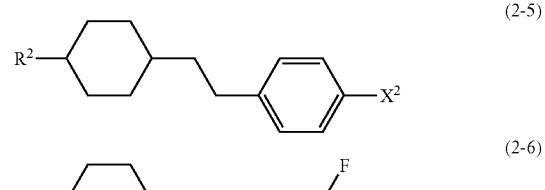

(2-7)

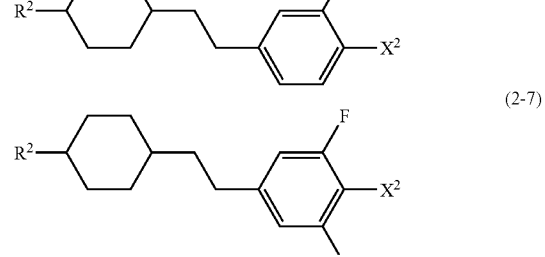

(2-8)

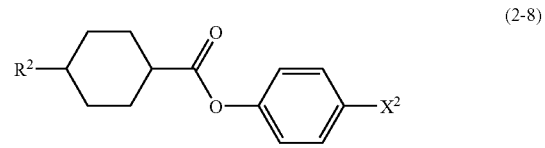

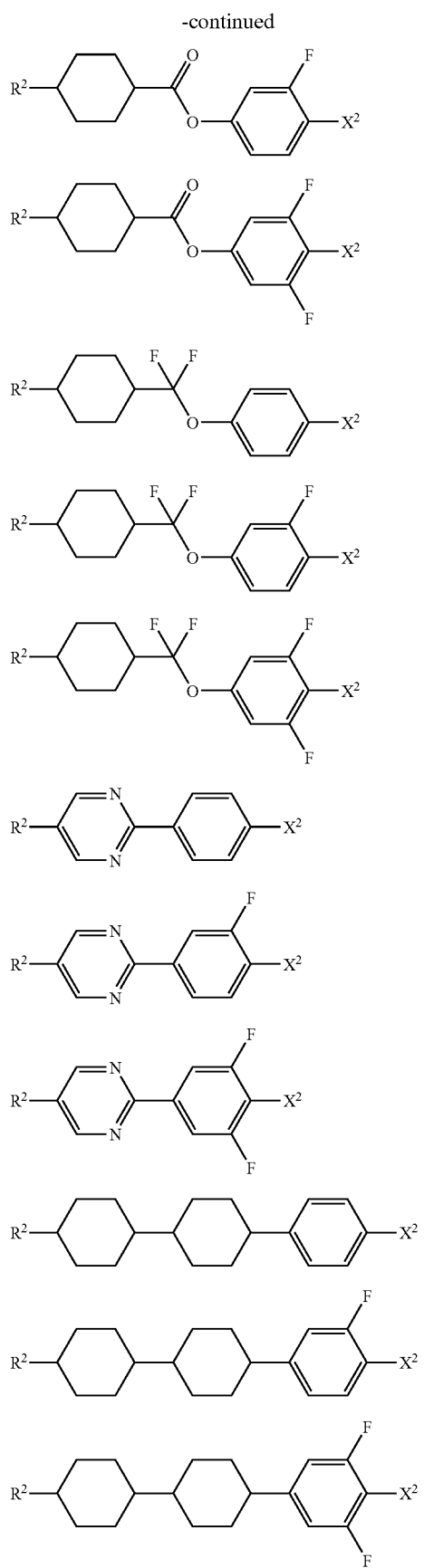
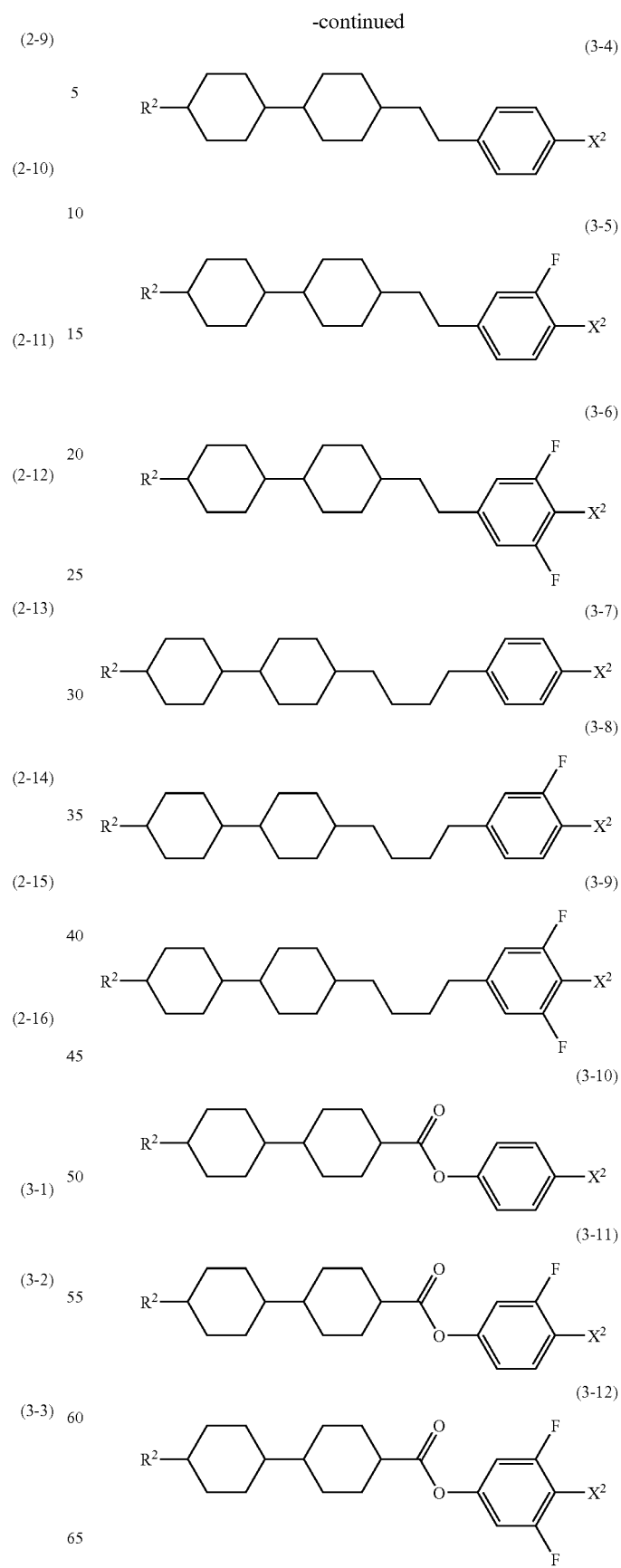

-continued
(3-13) 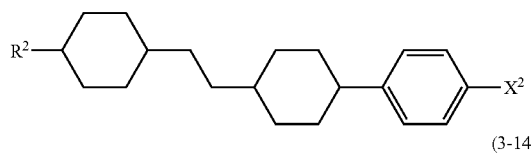
(3-14) 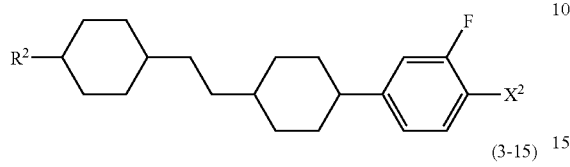
(3-15) 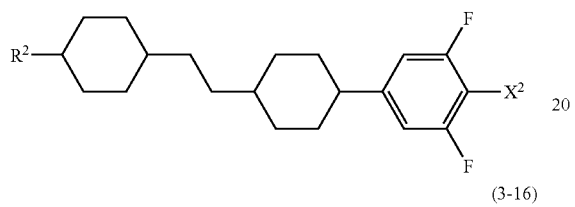
(3-16) 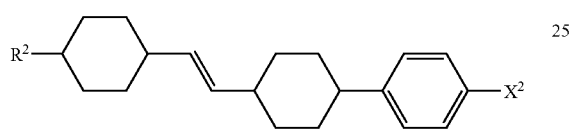
(3-17) 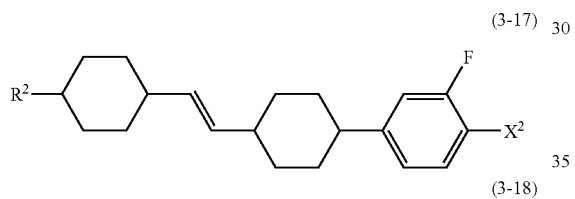
(3-18) 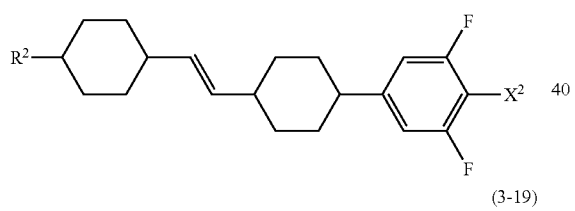
(3-19) 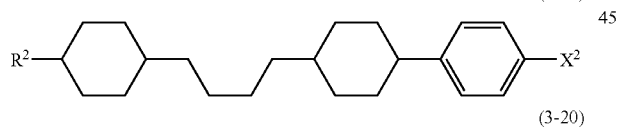
(3-20) 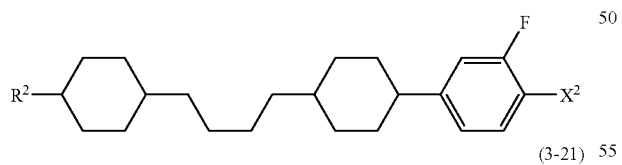
(3-21) 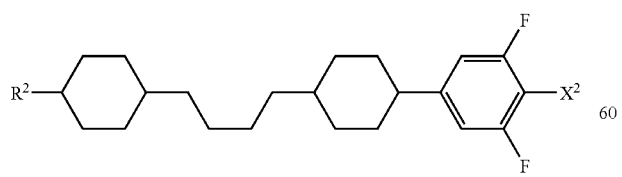
(3-22) 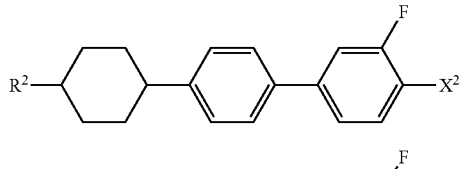
-continued
(3-23) 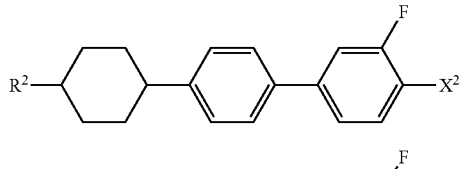
(3-24) 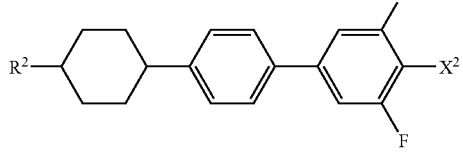
(3-25) 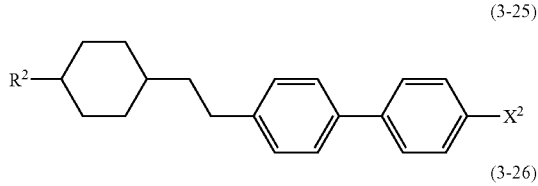
(3-26) 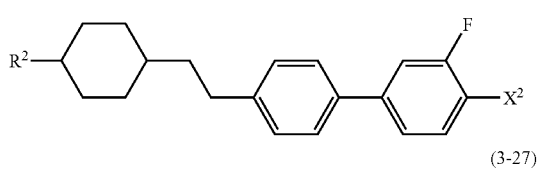
(3-27) 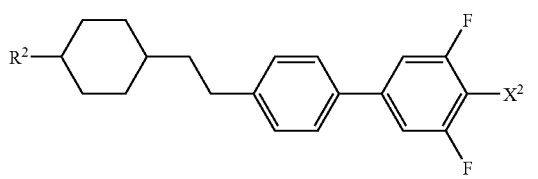
(3-28) 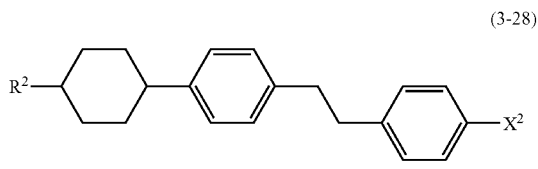
(3-29) 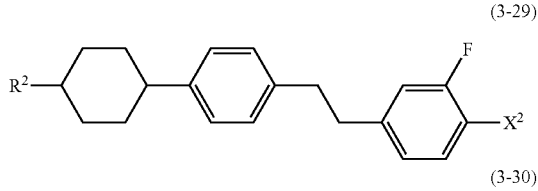
(3-30) 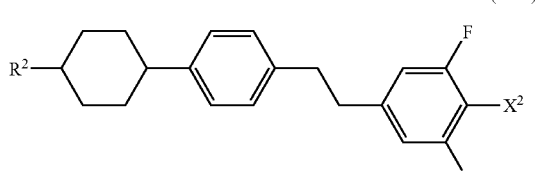
(3-31) 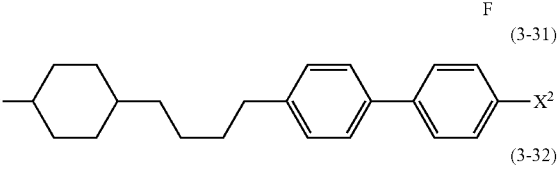
(3-32) 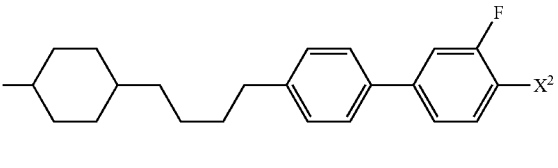

-continued

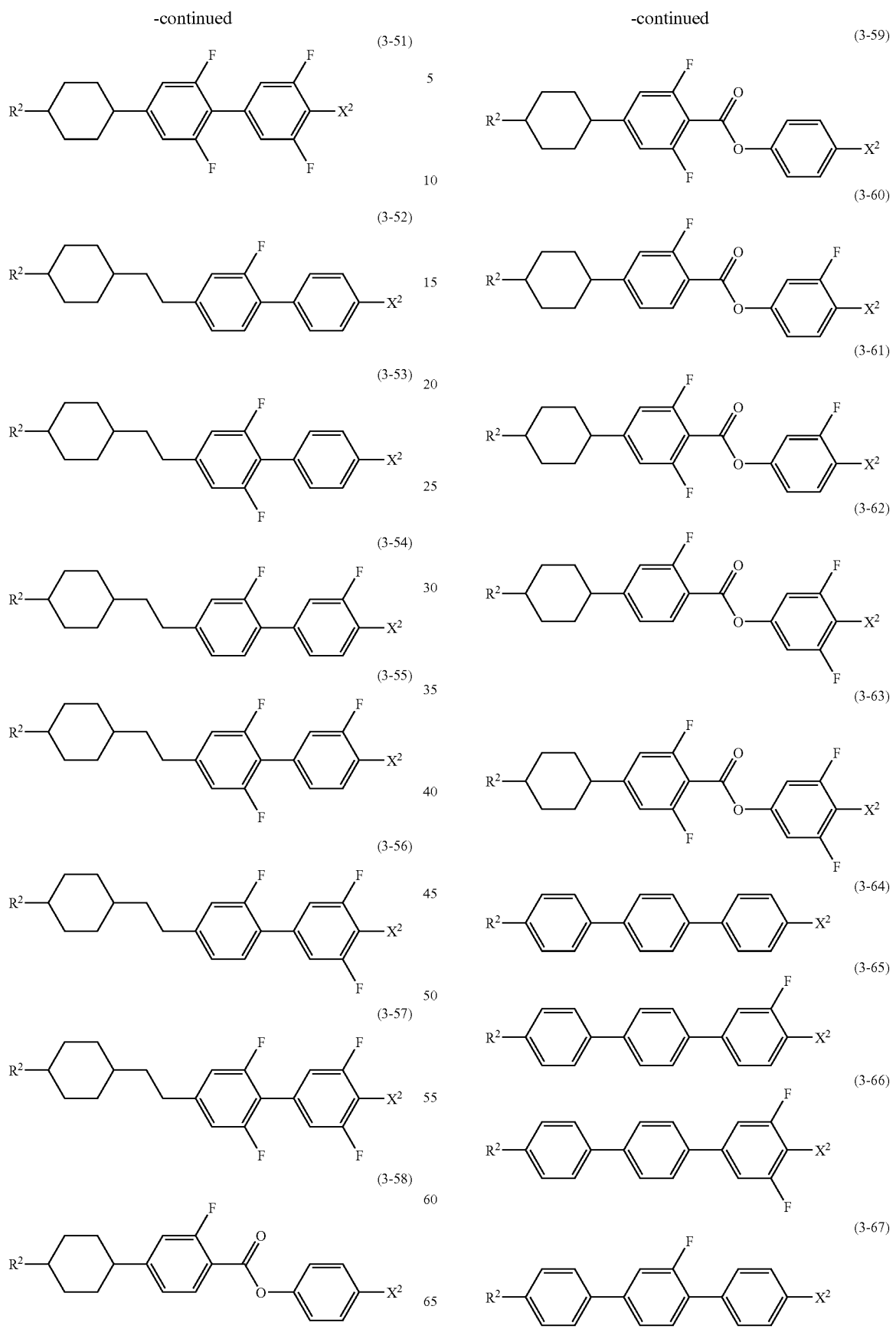

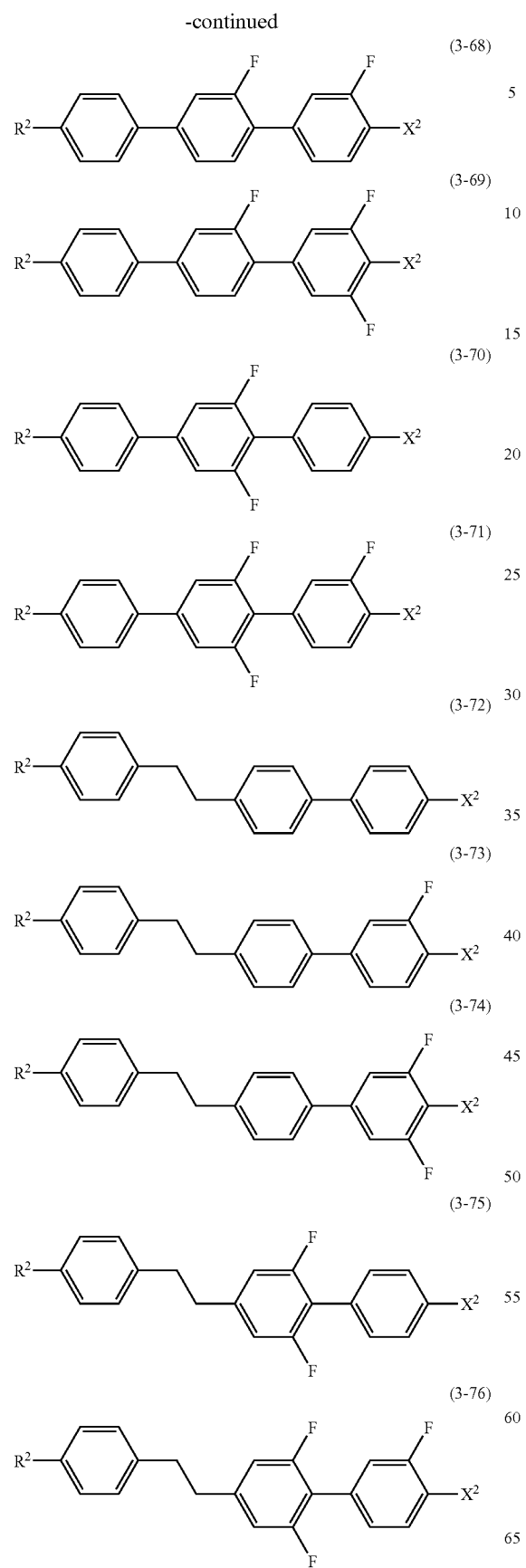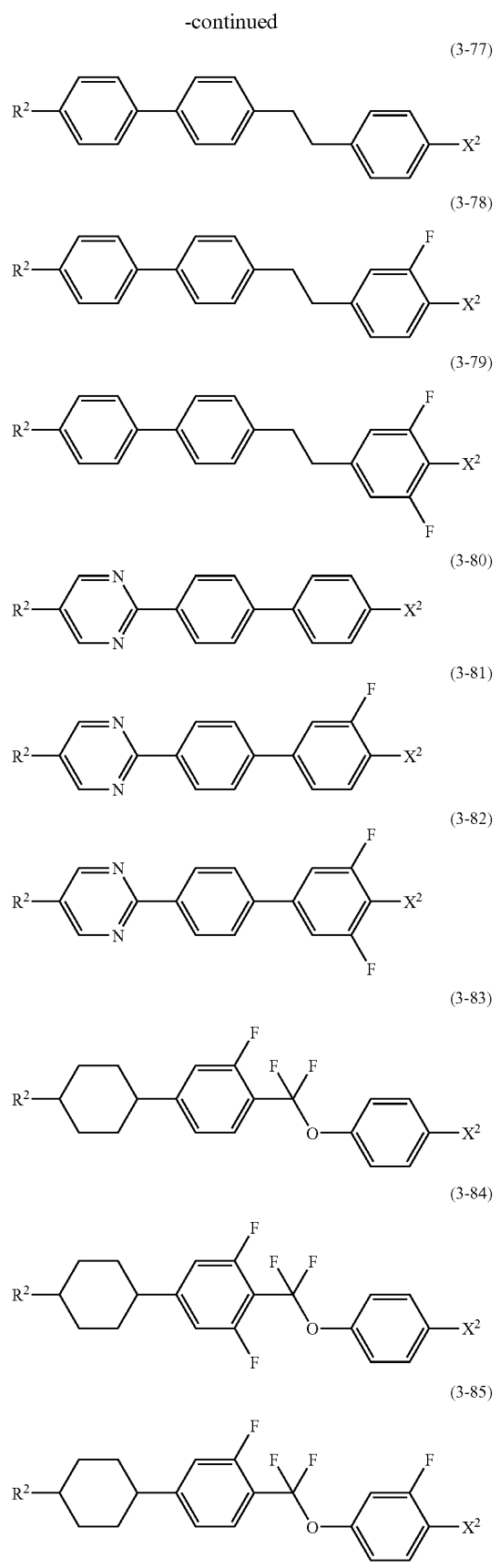

-continued
(3-86)
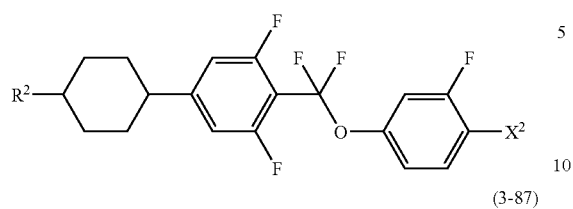
(3-87)
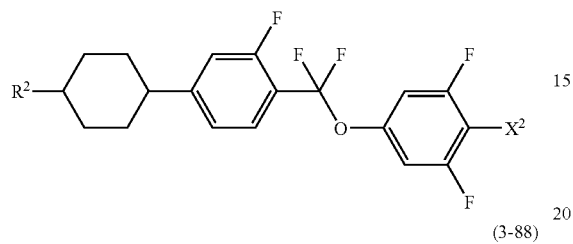
(3-88)
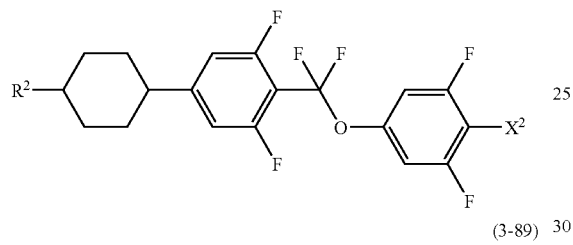
(3-89)
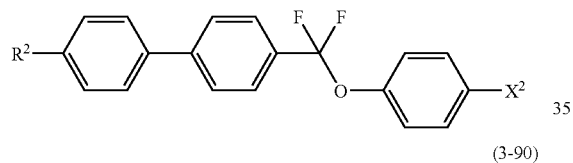
(3-90)
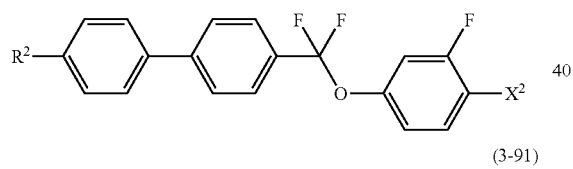
(3-91)
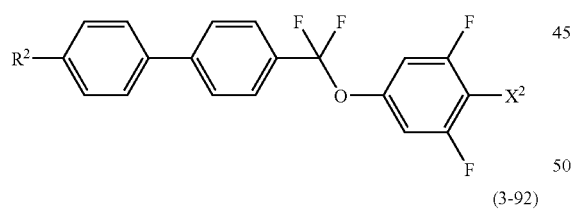
(3-92)
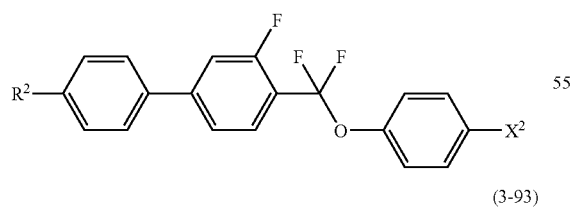
(3-93)
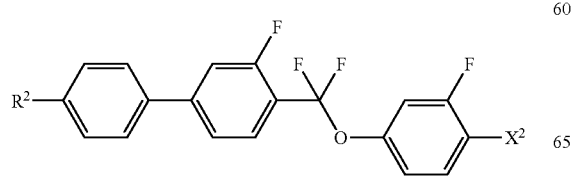
-continued
(3-94)
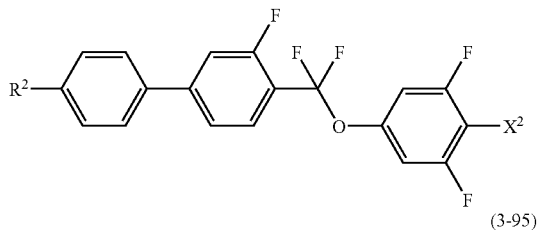
(3-95)
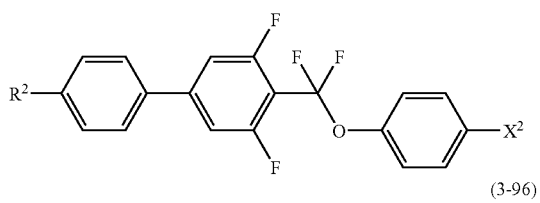
(3-96)
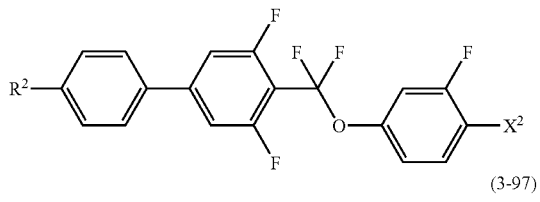
(3-97)
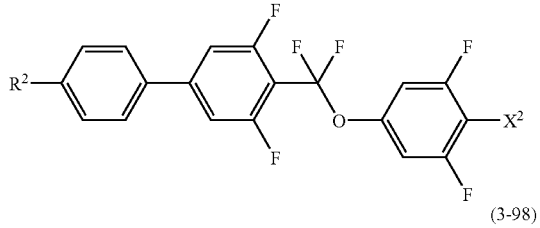
(3-98)
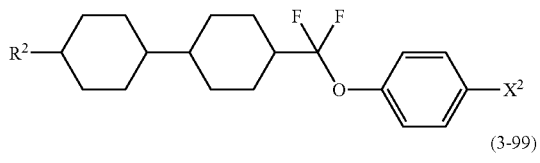
(3-99)
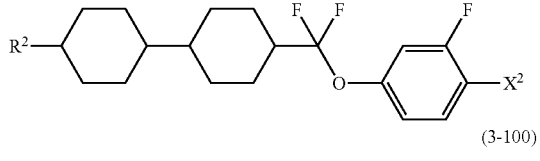
(3-100)
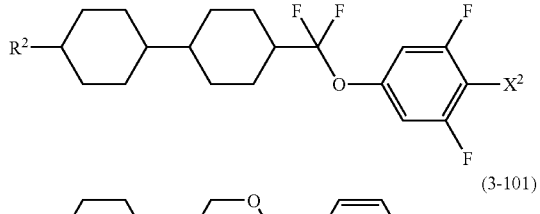
(3-101)
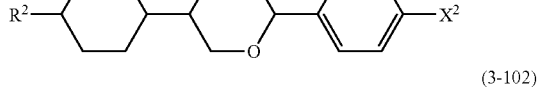
(3-102)
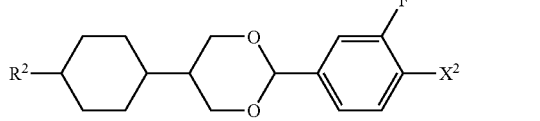

(3-103) 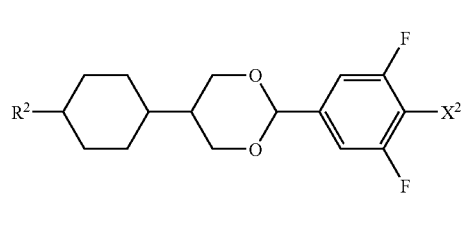
(3-104) 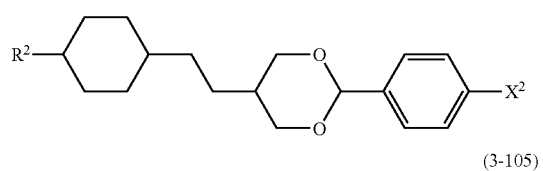
(3-105) 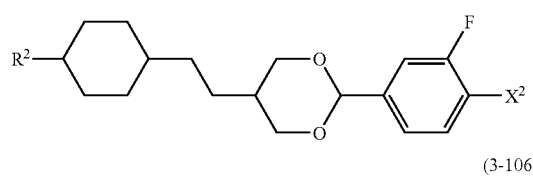
(3-106) 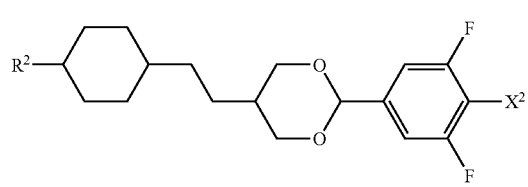
(3-107) 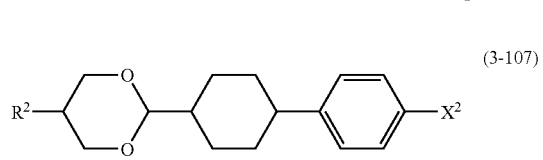
(3-108) 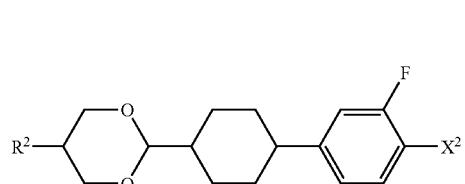
(3-109) 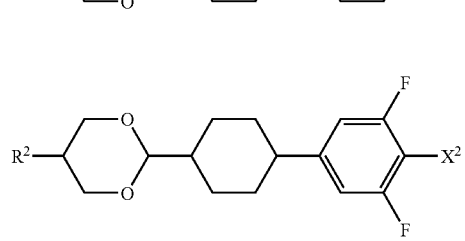
(3-110) 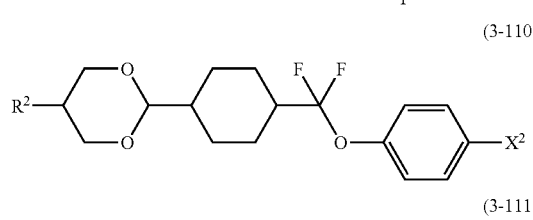
(3-111) 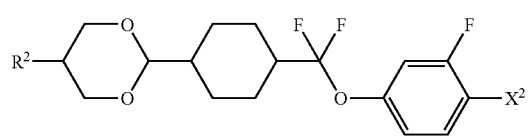
(3-112) 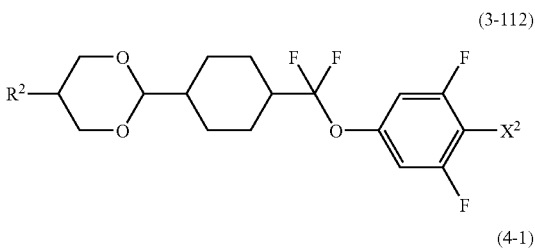
(4-1) 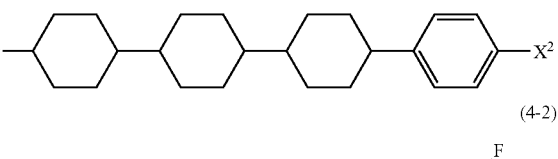
(4-2) 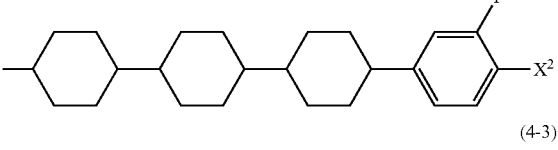
(4-3) 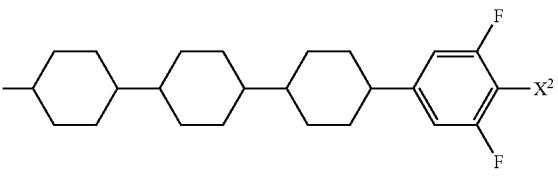
(4-4) 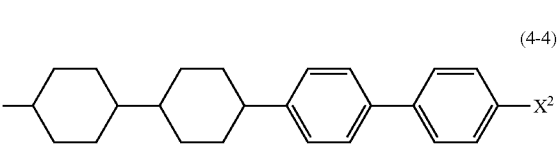
(4-5) 
(4-6) 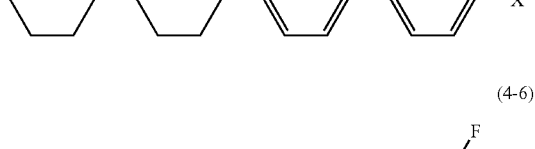
(4-7) 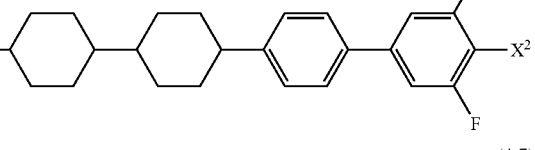
(4-8) 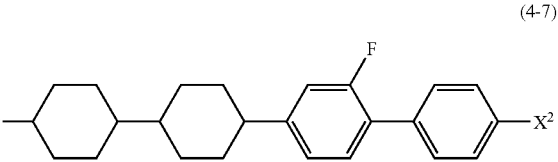

-continued
(4-9)
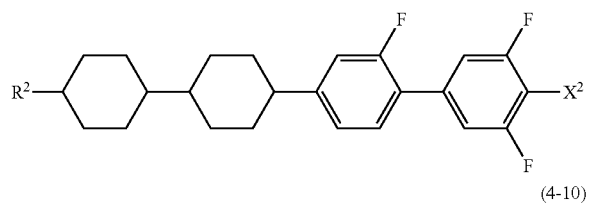
(4-10)
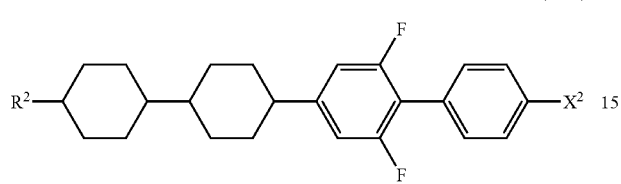
(4-11)
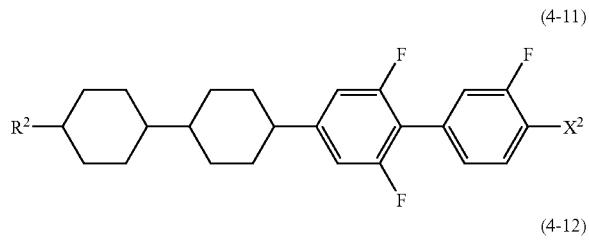
(4-12)
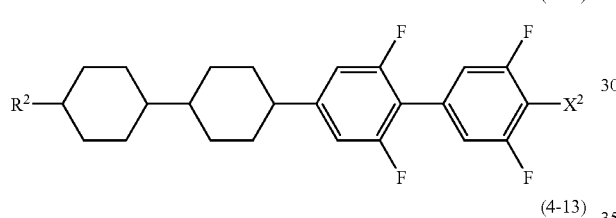
(4-13)
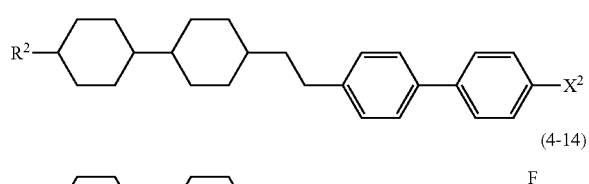
(4-14)
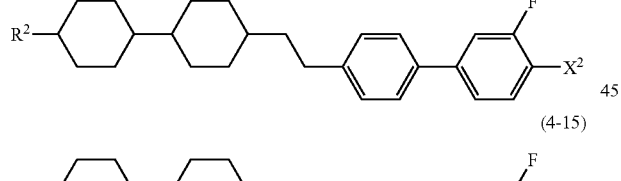
(4-15)
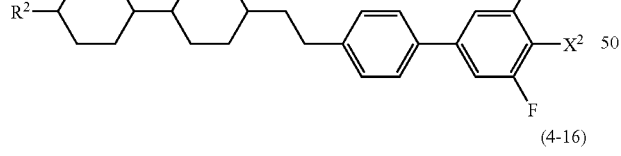
(4-16)
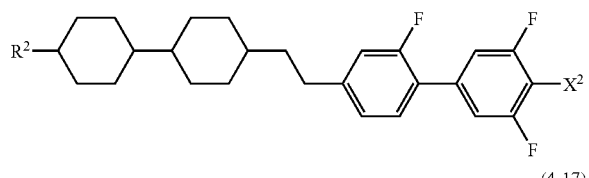
(4-17)
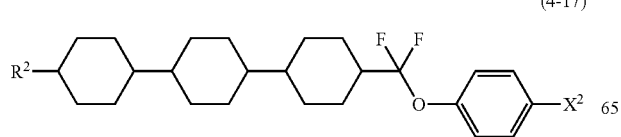
-continued
(4-18)
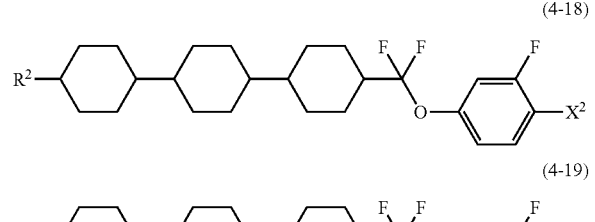
(4-19)
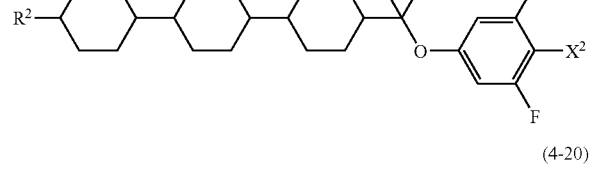
(4-20)
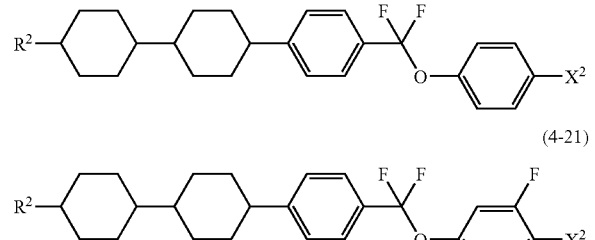
(4-21)
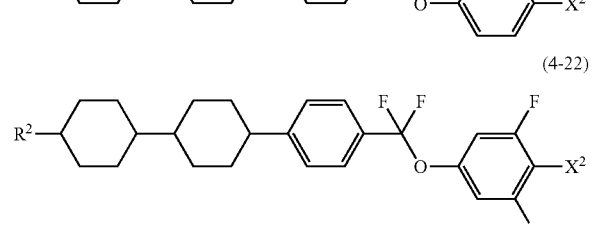
(4-22)
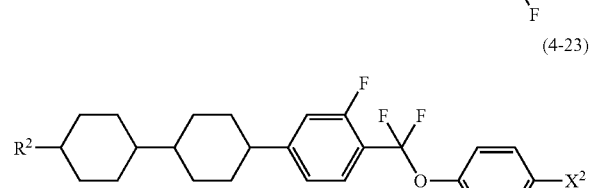
(4-23)
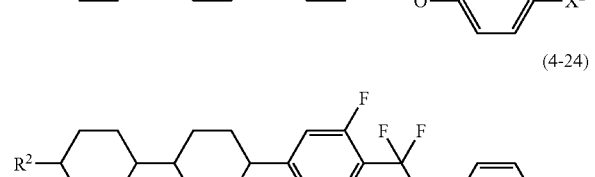
(4-24)
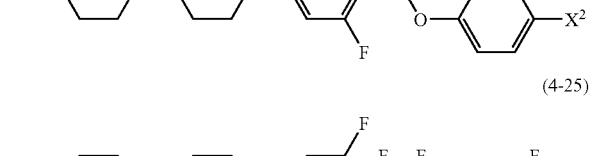
(4-25)
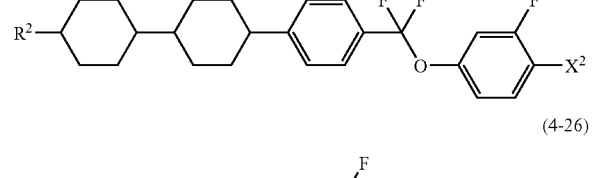
(4-26)
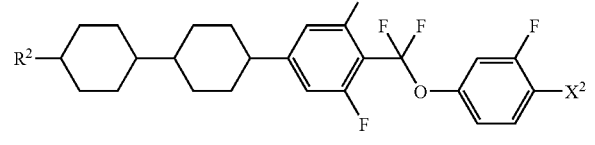

-continued
(4-27)
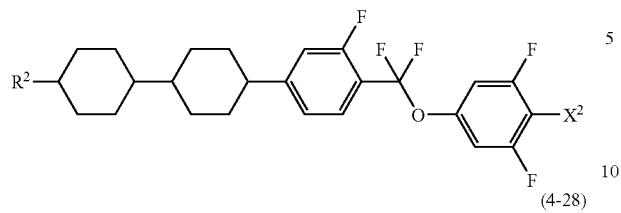
(4-28)
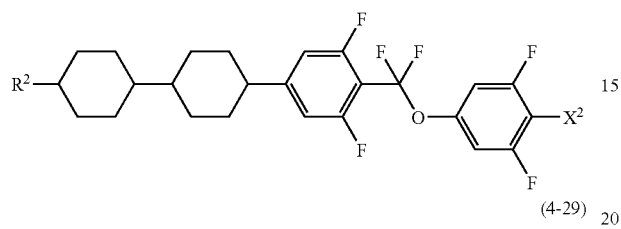
(4-29)
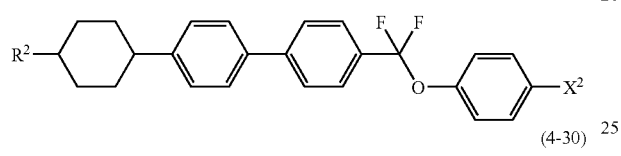
(4-30)
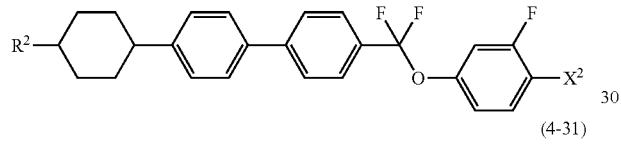
(4-31)
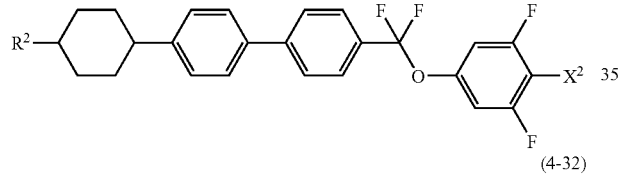
(4-32)
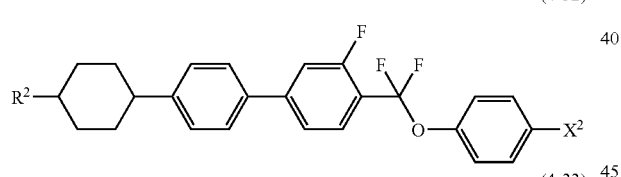
(4-33)
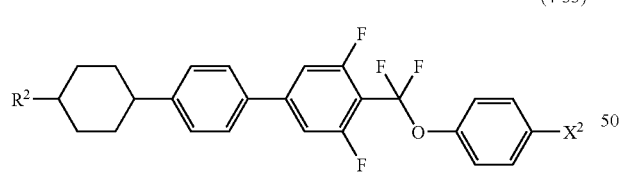
(4-34)
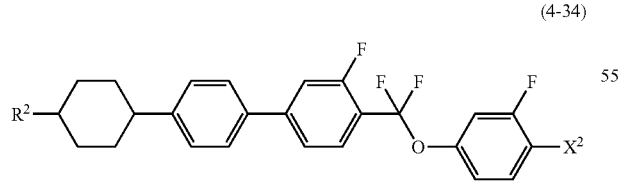
-continued
(4-36)
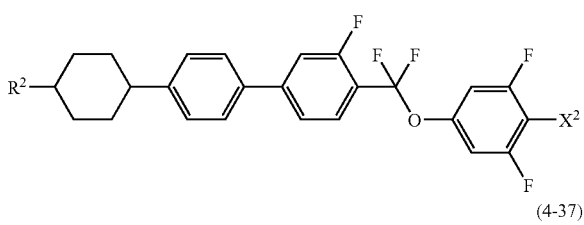
(4-37)
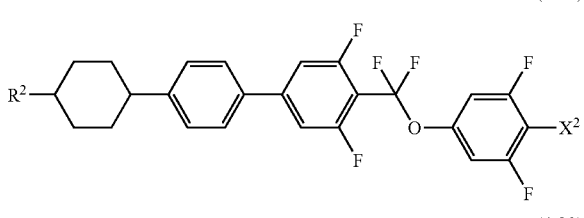
(4-38)
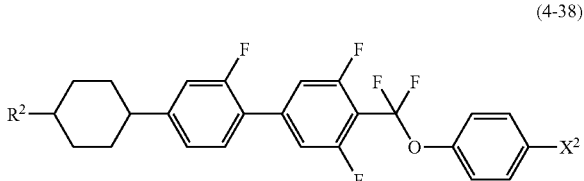
(4-39)
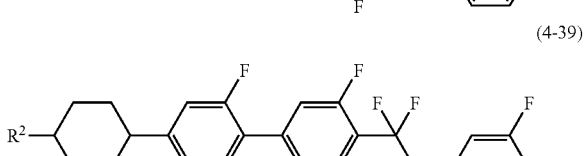
(4-40)
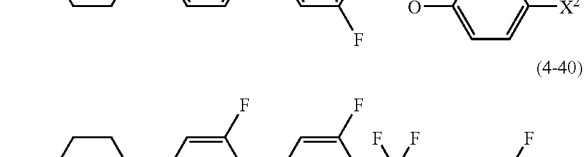
(4-41)
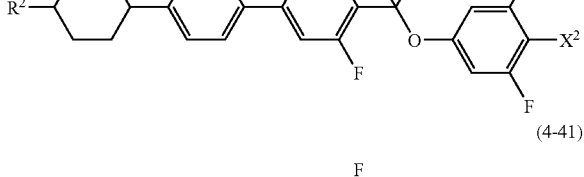
(4-42)
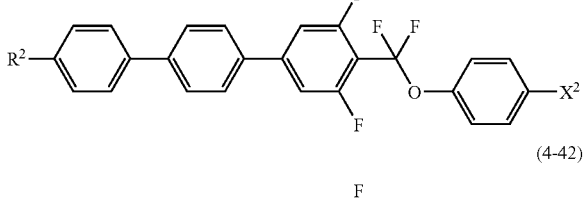
(4-43)
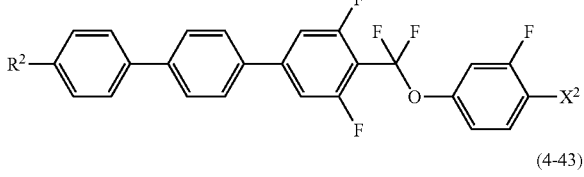

(4-44)
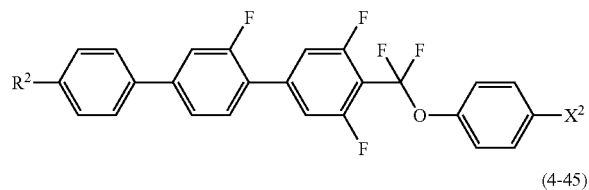

(4-45)
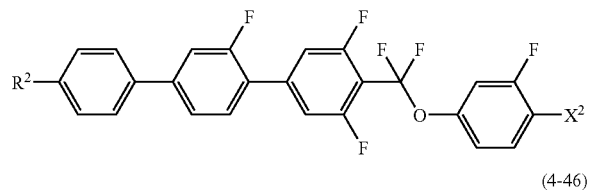

(4-46)
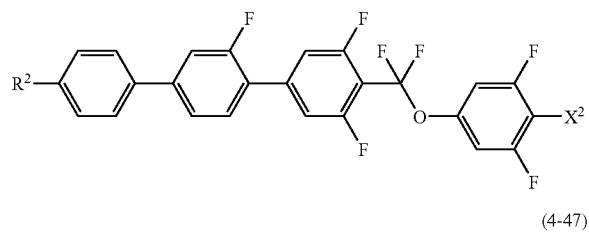

(4-47)
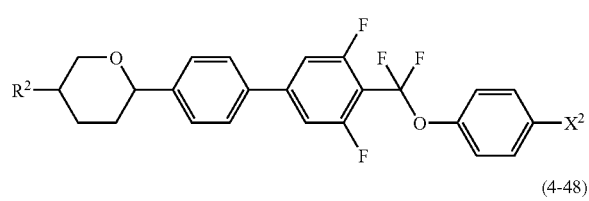

(4-48)
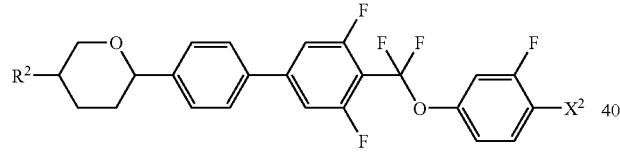

(4-49)
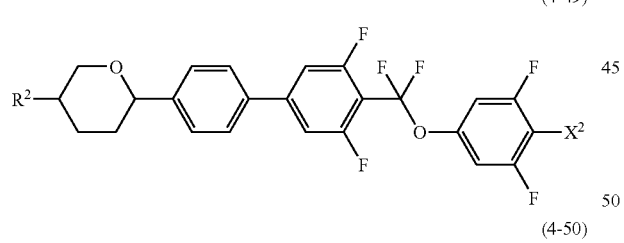

(4-50)
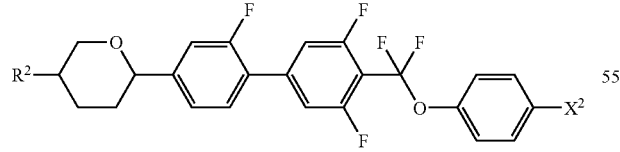

(4-51)
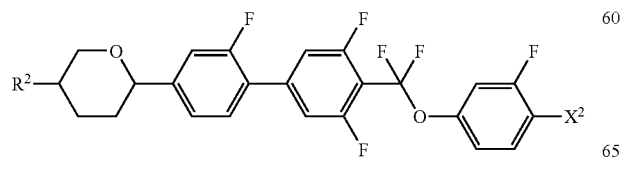

(4-52)
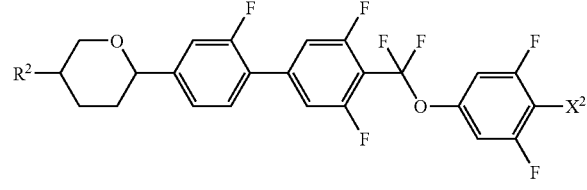

In the formulas (2-1) to (2-16), (3-1) to (3-112), and (4-1) to (4-52), $R^2$ and $X^2$ have the same meanings as described above.

The compound represented by formulas (2) to (4), i.e., the component B, has a positive dielectric anisotropy and is significantly excellent in heat stability and chemical stability, and thus the compound is used for preparing a liquid crystal composition for a TFT mode device. The content of the component B in the liquid crystal composition of the invention is suitably from approximately 1% to approximately 99% by weight, preferably approximately 10% to approximately 97% by weight, and more preferably from approximately 40% to approximately 95% by weight, based on the total amount of the composition. The viscosity of the composition can be controlled by further adding the compound represented by formulas (11) to (13) (component E).

Preferred examples of the compound represented by formula (5), i.e., the component C, include compounds represented by formulas (5-1) to (5-62).

(5-1)
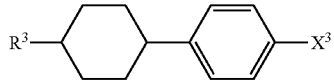

(5-2)

(5-3)
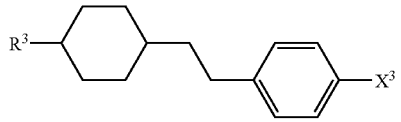

(5-4)
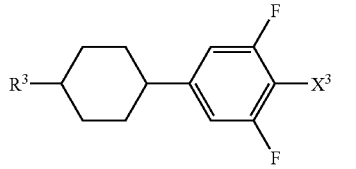

(5-5)
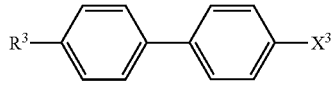

(5-6)
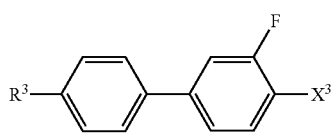

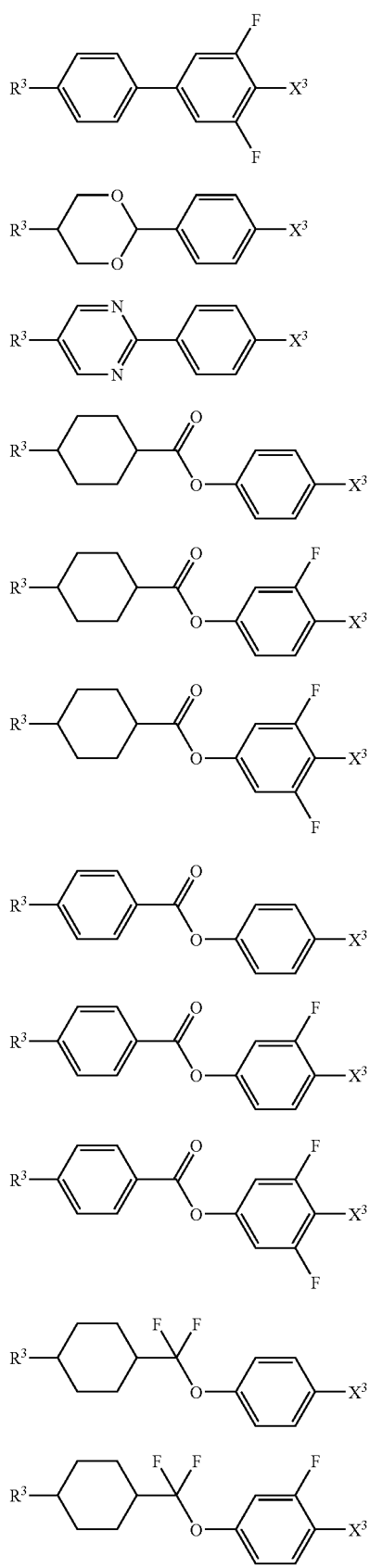
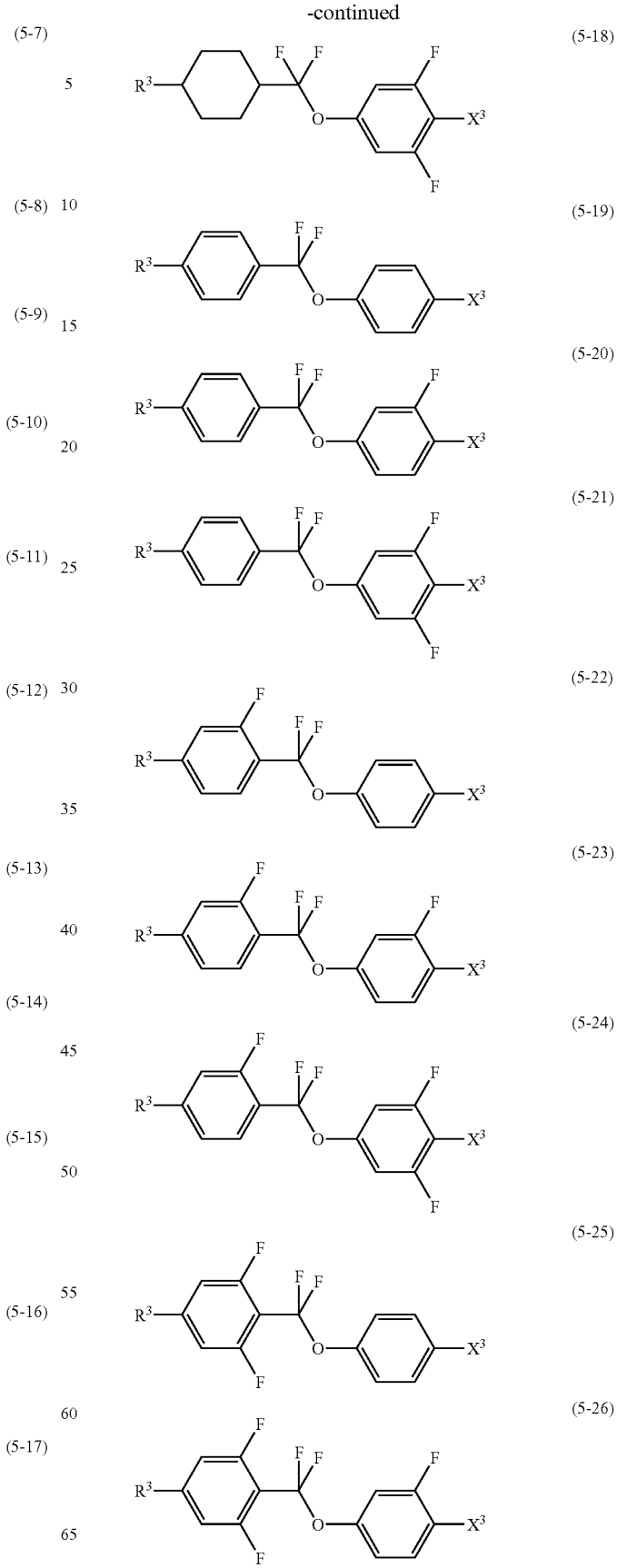

(5-27) 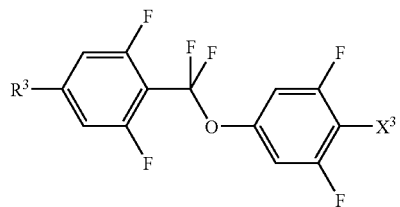
(5-28) 
(5-29) 
(5-30) 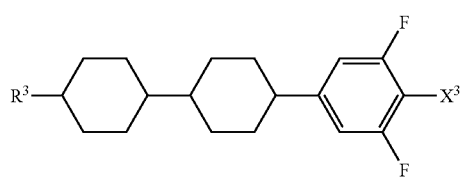
(5-31) 
(5-32) 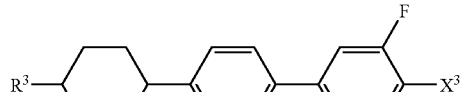
(5-33) 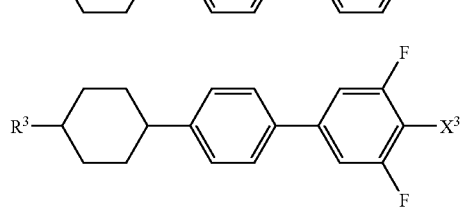
(5-34) 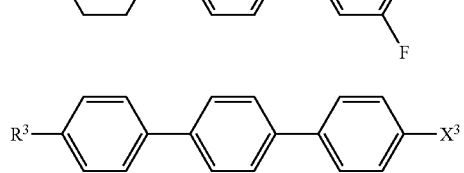
(5-35) 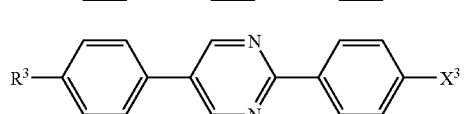
(5-36) 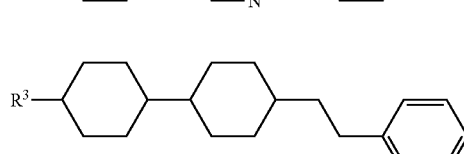
(5-37) 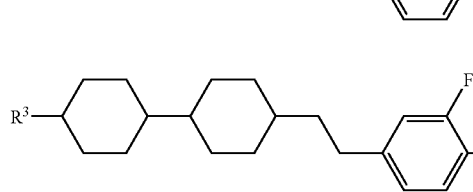
(5-38) 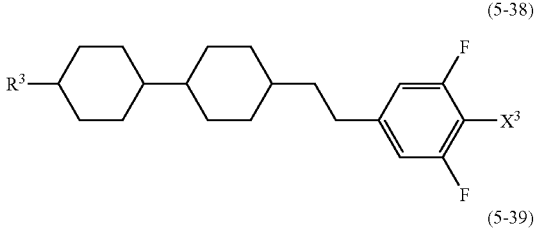
(5-39) 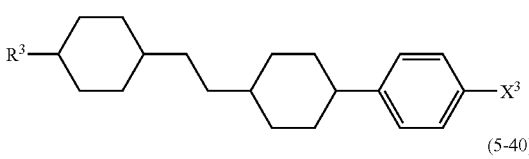
(5-40) 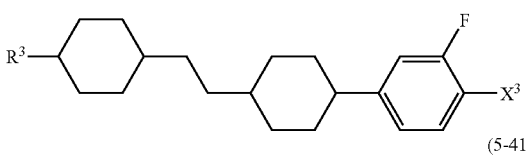
(5-41) 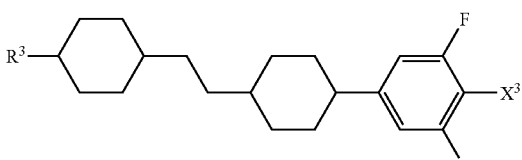
(5-42) 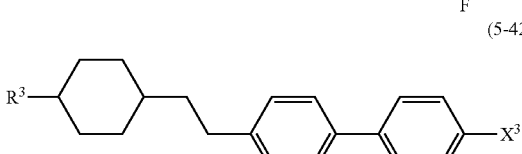
(5-43) 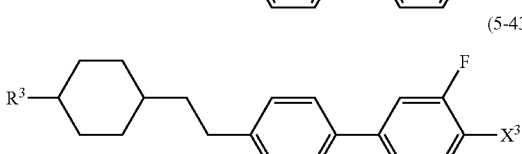
(5-44) 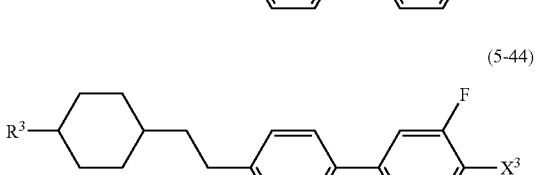
(5-45) 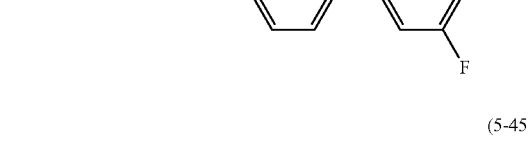
(5-46) 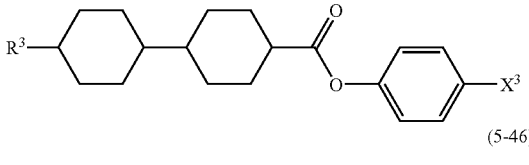

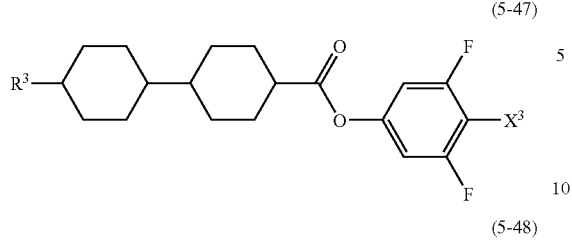 (5-47)
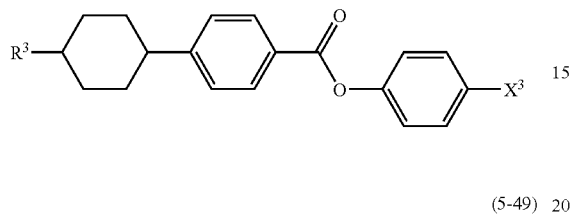 (5-48)
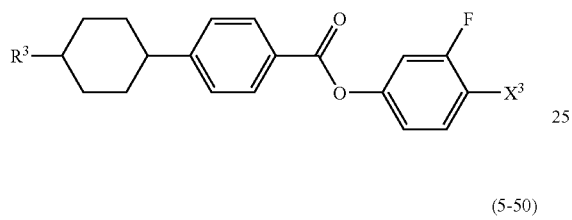 (5-49)
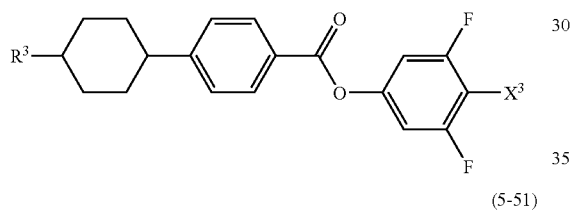 (5-50)
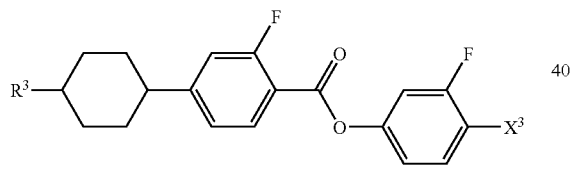 (5-51)
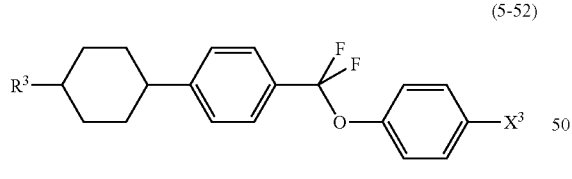 (5-52)
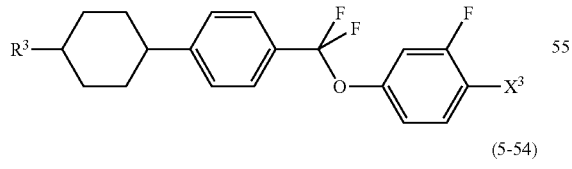 (5-53)
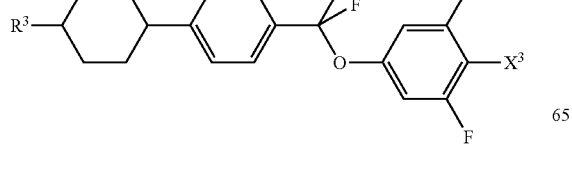 (5-54)
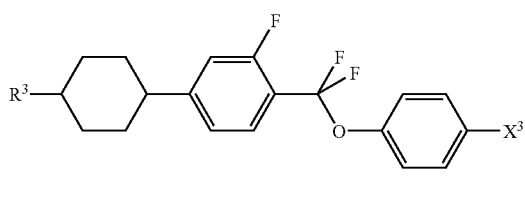 (5-55)
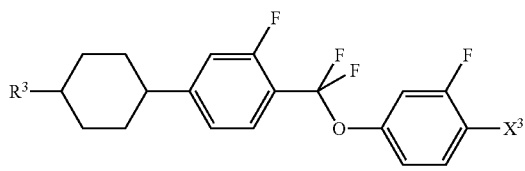 (5-56)
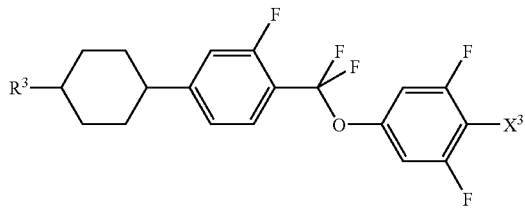 (5-57)
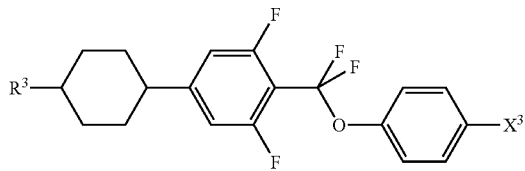 (5-58)
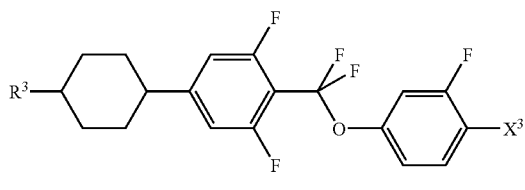 (5-59)
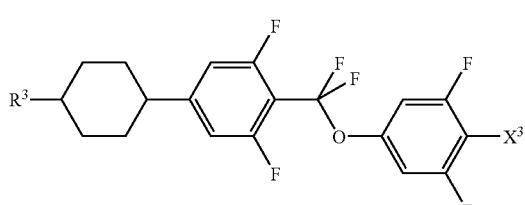 (5-60)
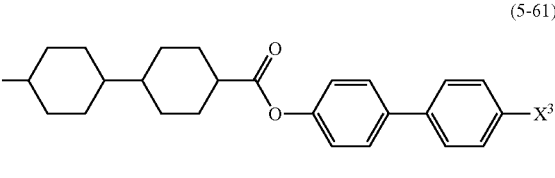 (5-61)

-continued (5-62)

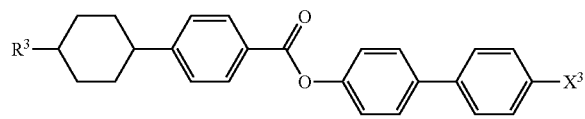

In the formulas (5-1) to (5-62), $R^3$ and $X^3$ have the same meanings as described above.

The compound represented by formula (5), i.e., the component C, has a large positive dielectric anisotropy, and thus the compound is used for preparing a liquid crystal composition for an STN mode device or a TN mode device. The addition of the component C decreases the threshold voltage of the composition. The addition of the component C enables control of the viscosity, control of the refractive index anisotropy and enhancement of the temperature range of a liquid crystal phase. The component C is also used for improving steepness of the characteristics.

The content of the component C for preparing a liquid crystal composition for an STN mode device or a TN mode device is preferably approximately 0.1% to approximately 99.9% by weight, more preferably from approximately 10% to approximately 97% by weight, and further preferably from approximately 40% to approximately 95% by weight, based on the total amount of the composition. The threshold voltage, the temperature range of a liquid crystal phase, the refractive index anisotropy, the dielectric anisotropy, the viscosity and so forth can be controlled by adding components described later.

The component D containing at least one compound selected from the group of compounds represented by formulas (6) to (8) and (10) is preferably used for preparing the liquid crystal composition of the invention that has a negative dielectric anisotropy for use in a vertical alignment (VA) mode.

Preferred examples of the compounds represented by formulas (6) to (8) and (10), i.e., the component D, include compounds represented by formulas (6-1) to (6-5), (7-1) to (7-9), (8-1), and (10-1) to (10-11).

(6-1)

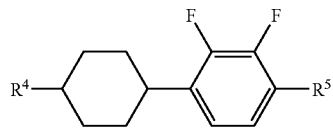

(6-2)

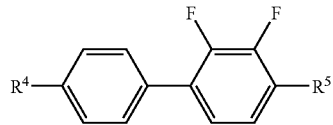

(6-3)

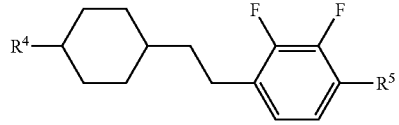

(6-4)

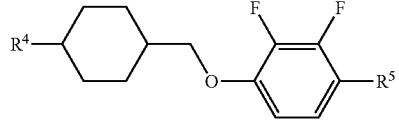

-continued (6-5)

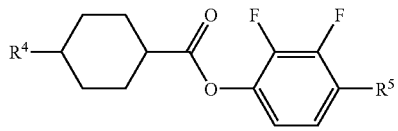

(7-1)

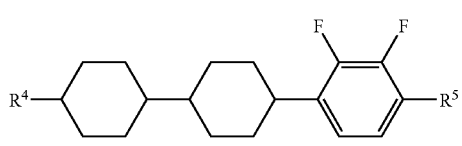

(7-2)

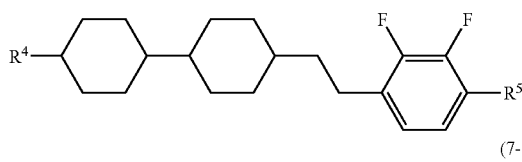

(7-3)

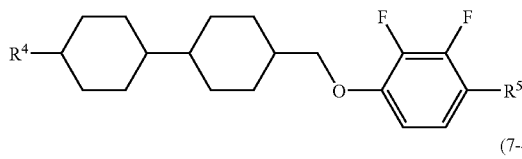

(7-4)

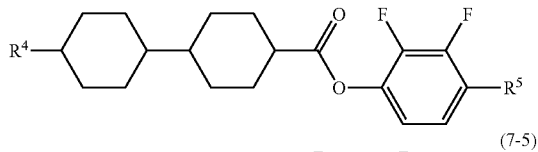

(7-5)

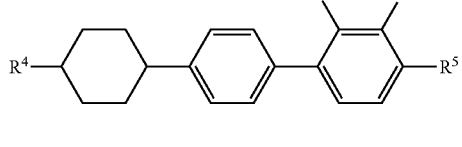

(7-6)

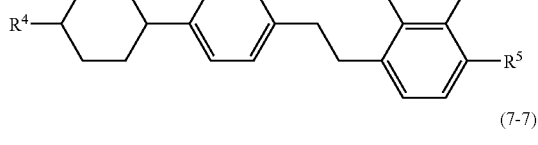

(7-7)

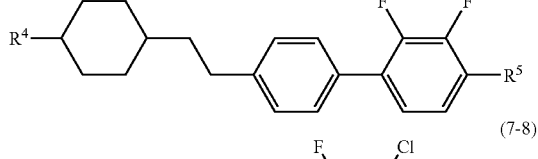

(7-8)

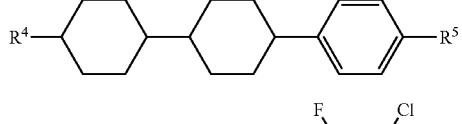

(7-9)

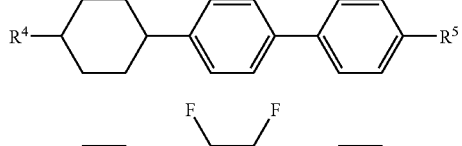

(8-1)

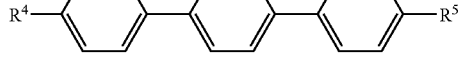

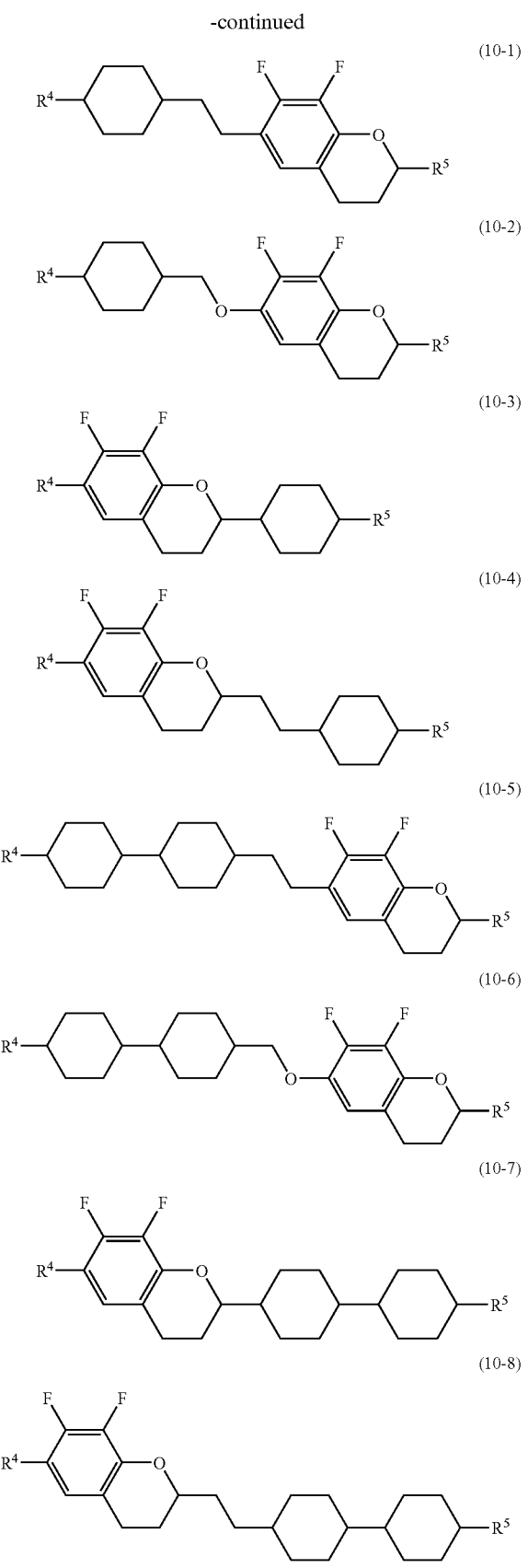

In the formulas (6-1) to (6-5), (7-1) to (7-9), (8-1), and (10-1) to (10-11), $R^4$ and $R^5$ have the same meanings as described above.

The component D is used mainly in a liquid crystal composition having a negative dielectric anisotropy for a VA mode. In the case where the content of the component D is increased, the threshold voltage of the composition is decreased, but the viscosity thereof is increased. Accordingly, the content of the component D is preferably small as far as the demanded value of the threshold value is satisfied. Since the absolute value of the dielectric anisotropy is approximately 5% by weight, there are cases where the device cannot be driven with voltage when the content of the component is less than approximately 40% by weight.

In the component D, the compound represented by formula (6) is a bicyclic compound and thus is effective for controlling the threshold voltage, the viscosity or the refractive index anisotropy. The compound represented by formulas (7) and (8) is a tricyclic compound and thus provides such effects as increase of the clear point, enhancement of the nematic range, decrease of the threshold voltage, increase of the refractive index anisotropy, and so forth.

The content of the component D for preparing a composition for a VA mode is preferably approximately 40% by weight or more, and more preferably from approximately 50% to approximately 95% by weight, based on the total amount of the composition. The addition of the component D enables control of the elastic constant and control of the voltage-transmittance curve of the composition. In the case where the component D is added to the composition having a positive dielectric anisotropy, the content thereof is preferably approximately 30% by weight or less based on the total amount of the composition.

Preferred examples of the compounds represented by formulas (11), (12) and (13), i.e., the component E, include compounds represented by formulas (11-1) to (11-11), (12-1) to (12-18) and (13-1) to (13-6).

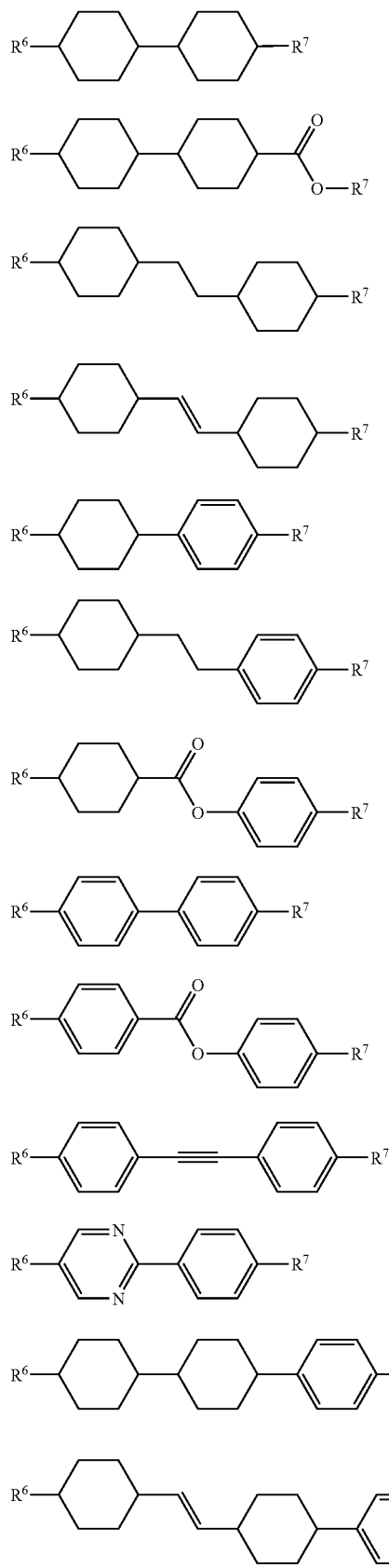
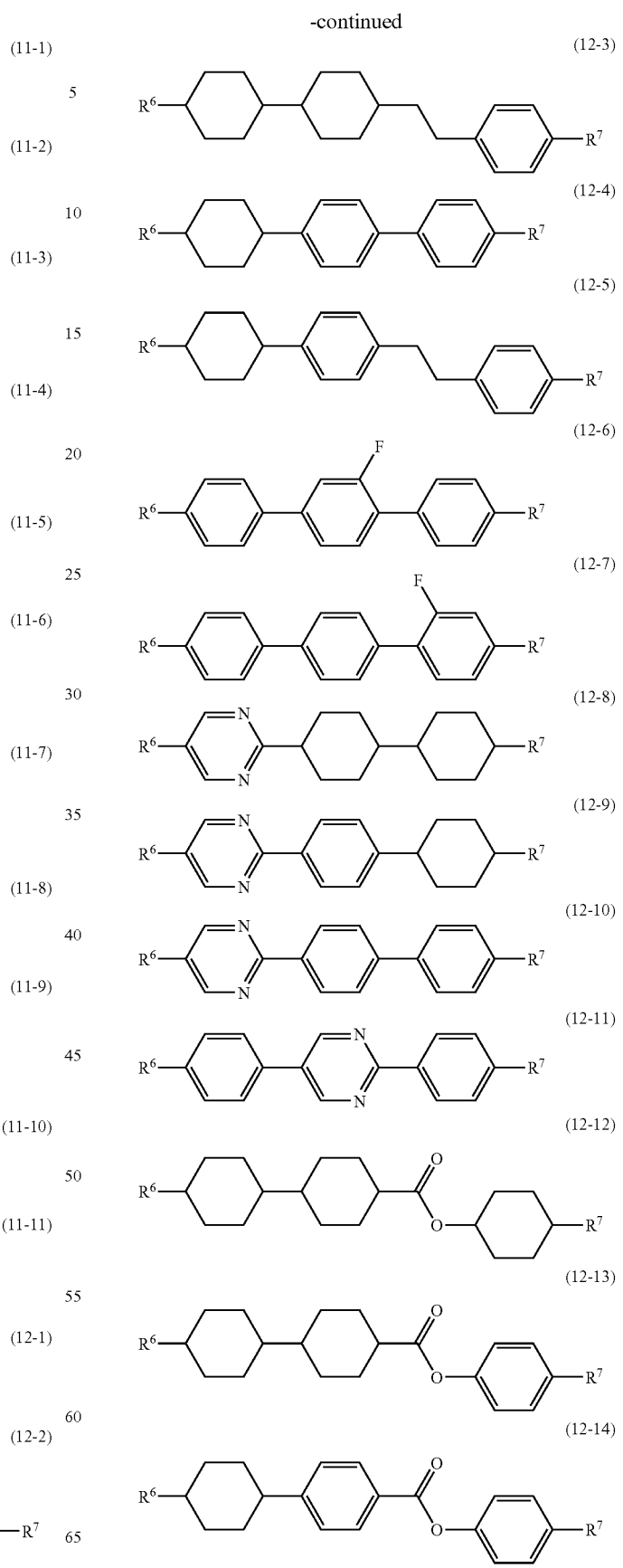

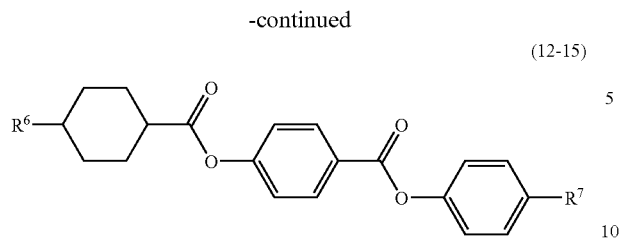
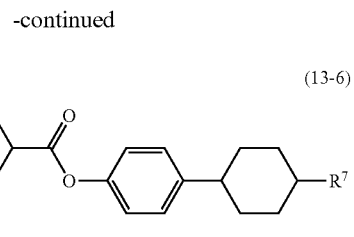

In the formulas (11-1) to (11-11), (12-1) to (12-18) and (13-1) to (13-6), $R^6$ and $R^7$ have the same meanings as described above.

The compound represented by formulas (11) to (13), i.e., the component E, is a compound having a small absolute value of dielectric anisotropy, i.e., a nearly neutral compound. The compound represented by formula (11) is effective mainly for controlling the viscosity and for controlling the refractive index anisotropy, and the compound represented by formulas (12) and (13) is effective mainly for enhancing the nematic range, for example, increasing the clear point, and for controlling the refractive index anisotropy.

In the case where the content of the compound of the component E is increased, the liquid crystal composition is increased in threshold voltage and lowered in viscosity, and therefore the content is preferably large as far as the demanded value of the threshold voltage of the liquid crystal composition is satisfied. In the case where a liquid crystal composition for a TFT mode device is prepared, the content of the component E is preferably approximately 60% by weight or less, and more preferably approximately 40% by weight or less, based on the total amount of the composition. In the case where a liquid crystal composition for an STN mode device or a TN mode device is prepared, the content of the component E is preferably approximately 70% by weight or less, and more preferably approximately 60% by weight or less, based on the total amount of the composition.

The liquid crystal composition of the invention preferably contains at least one kind of the compound represented by formula (1) of the invention in a ratio of from approximately 0.1% to approximately 99% by weight for exhibiting the excellent characteristics.

The liquid crystal composition of the invention can be generally prepared by a known method, for example, by dissolving the necessary components at an increased temperature. An additive having been known in the art may be added to the composition depending on purposes, whereby a liquid crystal composition containing a chiral agent or a liquid crystal composition for a GH mode containing a dye can be prepared according to the invention. The additive has been well known by a skilled person in the art and is disclosed in literatures in detail.

The liquid crystal composition of the invention may contain at least one kind of a chiral agent.

A known chiral dopant may be added as the chiral agent. The chiral dopant has such a function that a helical structure of the liquid crystal is induced, whereby the necessary helical angle is controlled to prevent reverse twisting. Examples of the chiral dopant include the following chiral agents (Op-1) to (Op-13) and (K1) to (K5).

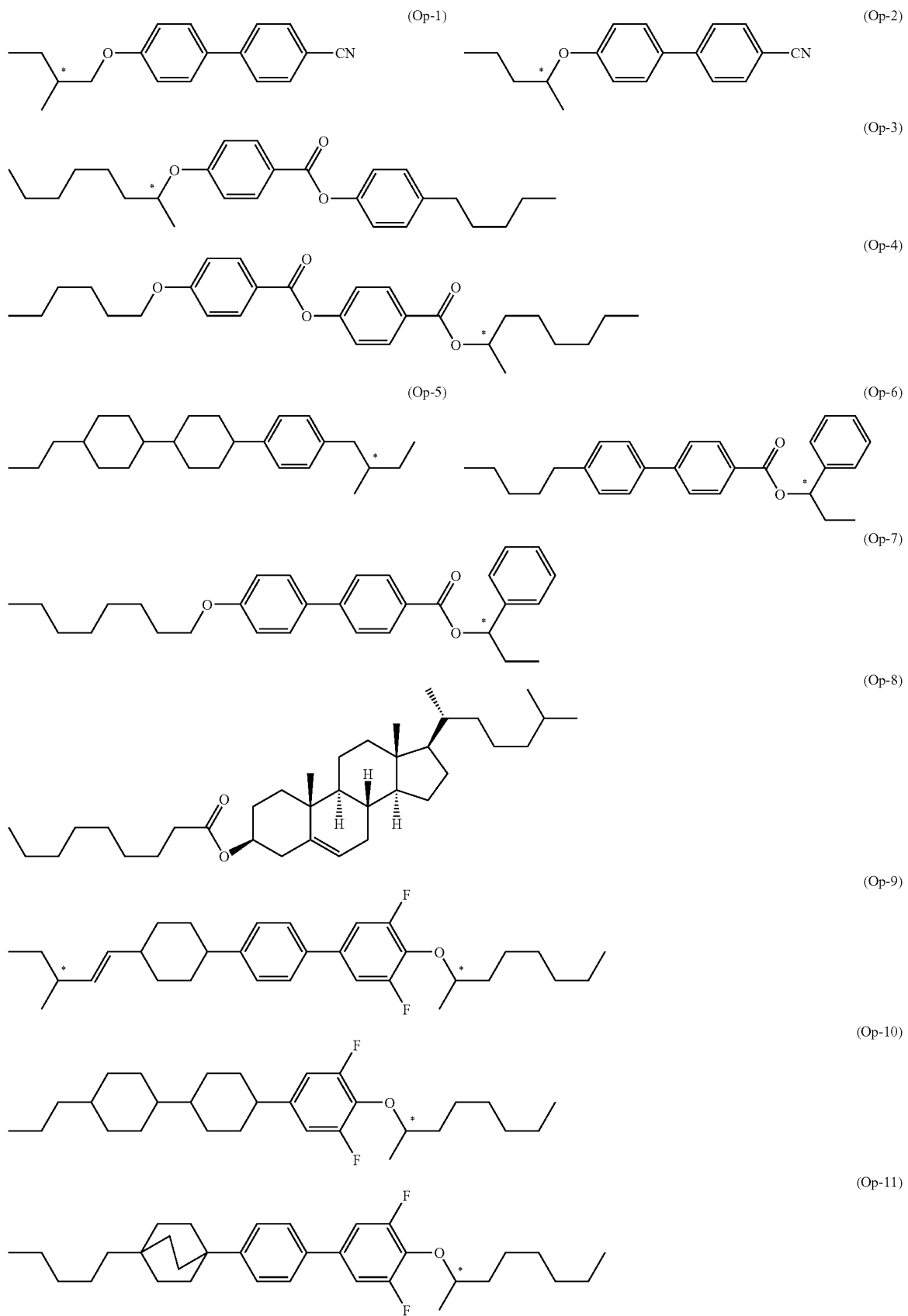

-continued

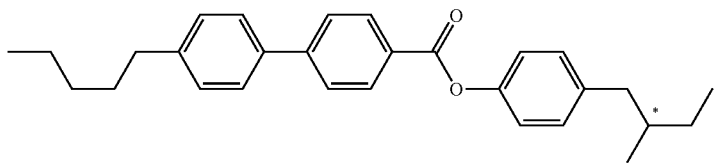
(Op-12)

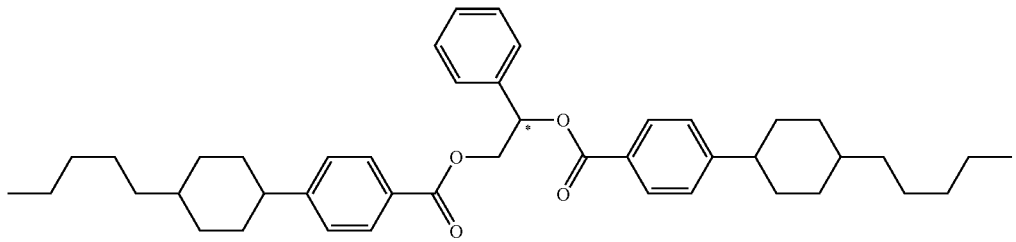
(Op-13)

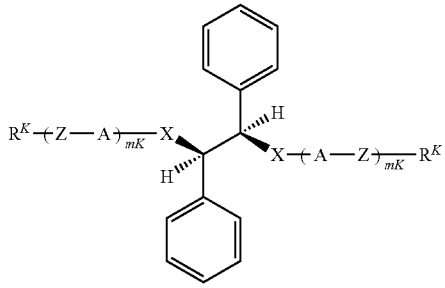
(K1)

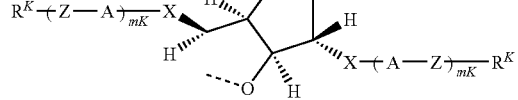
(K2)

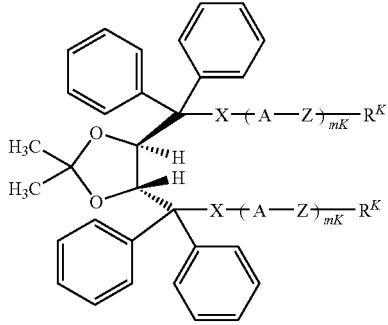
(K3)

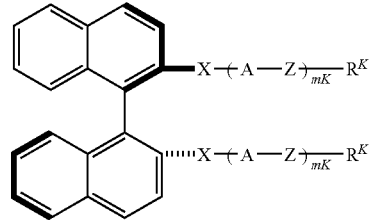
(K4)

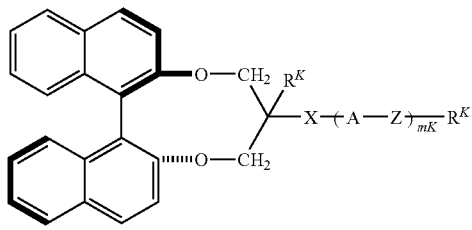
(K5)

wherein $R^K$ is independently hydrogen, halogen, —C≡N, —N=C=O, —N=C=S or alkyl having 1 to 20 carbons, in which in the alkyl, arbitrary —CH$_2$— may be replaced by —O—, —S—, —COO—, —OCO—, —CH=CH—, —CF=CF— or —C≡C—, and arbitrary hydrogen may be replaced by halogen;

A is independently an aromatic or nonaromatic 3-membered to 8-membered ring or a condensed ring having 9 or more carbons, in which in the rings, arbitrary hydrogen may be replaced by halogen, alkyl having 1 to 3 carbon or halogenated alkyl, in which in the rings, arbitrary —CH$_2$— may be replaced by —O—, —S— or —NH—, and arbitrary —CH= may be replaced by —N=;

Z is independently a single bond or alkylene having 1 to 8 carbons, in which in the alkylene, arbitrary —CH$_2$— may be replaced by —O—, —S—, —COO—, —OCO—, —CSO—, —OCS—, —N=N—, —CH=N—, —N=CH—, —CH=CH—, —CF=CF— or —C≡C—, and arbitrary hydrogen may be replaced by halogen;

Z is independently a single bond or alkylene having 1 to 8 carbons, in which in the alkylene, arbitrary —CH$_2$— may be replaced by —O—, —S—, —COO—, —OCO—, —CSO—, —OCS—, —N=N—, —CH=N—, —N=CH—, —CH=CH—, —CF=CF— or —C≡C—, and arbitrary hydrogen may be replaced by halogen;

X is a single bond, —COO—, —OCO—, —CH$_2$O—, —OCH$_2$—, —CF$_2$O—, —OCF$_2$— or —CH$_2$CH$_2$—; and mK is an integer of from 1 to 4.

The liquid crystal composition of the invention is controlled in helical pitch generally by adding the chiral agent. The helical pitch is preferably controlled to a range of from approximately 40 μm to approximately 200 μm for a liquid crystal composition for a TFT mode device or a TN mode device, is preferably controlled to a range of from approximately 6 μm to approximately 20 μm for a liquid crystal composition for an STN mode device, and is preferably controlled to a range of from approximately 1.5 μm to approximately 4 μm for a liquid crystal composition for a bistable TN mode device. Two or more kinds of chiral agents may be added for the purpose of controlling the temperature dependency of the pitch.

Among them, the chiral dopants contained in the liquid crystal composition are preferably represented by formulae (K2-1) to (K2-8) included in formula (K2) and formulae (K5-1) to (K5-3) included in formula (K5) when the short helical pitch (<1.5 □m) is required for the liquid crystal composition,

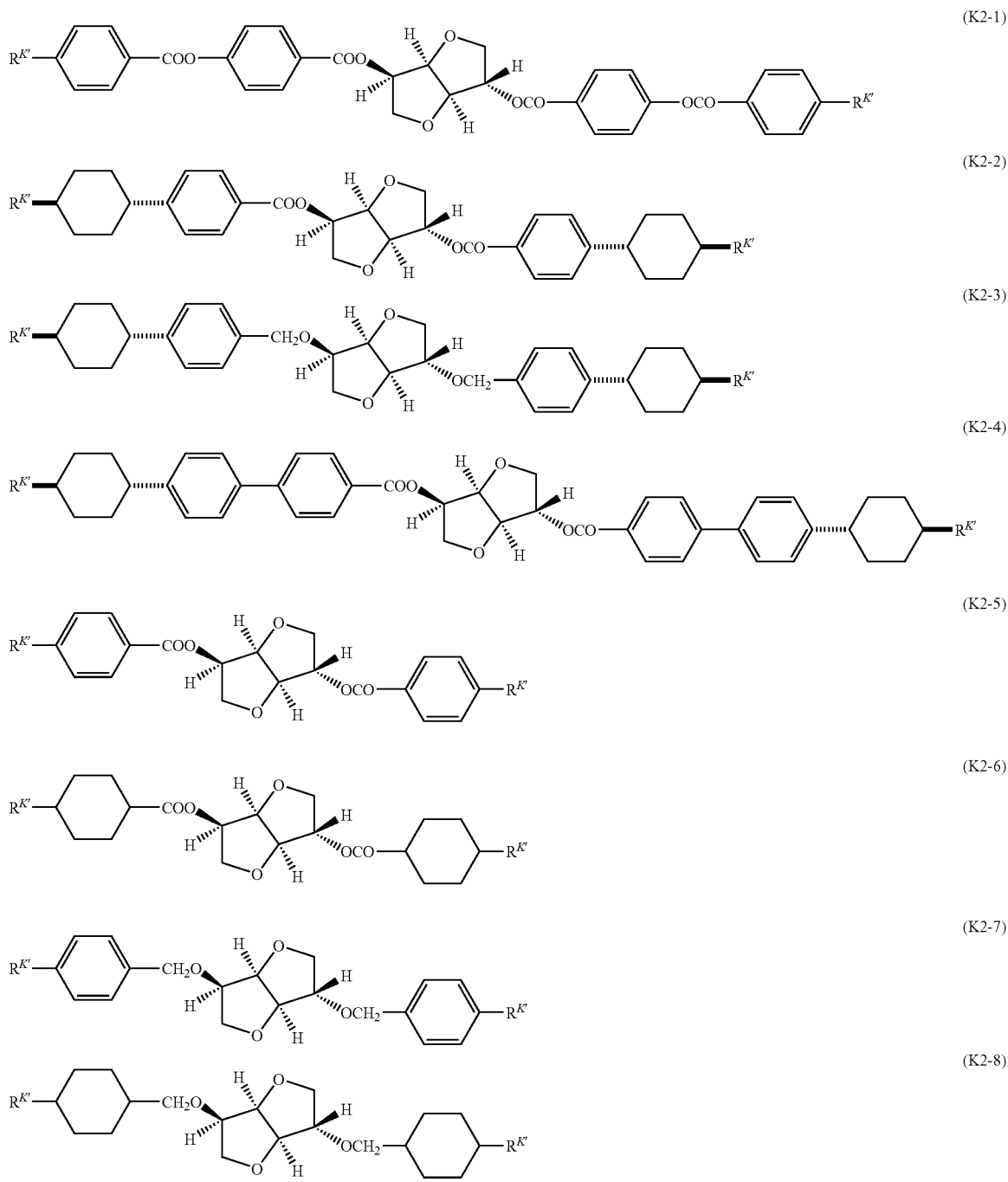

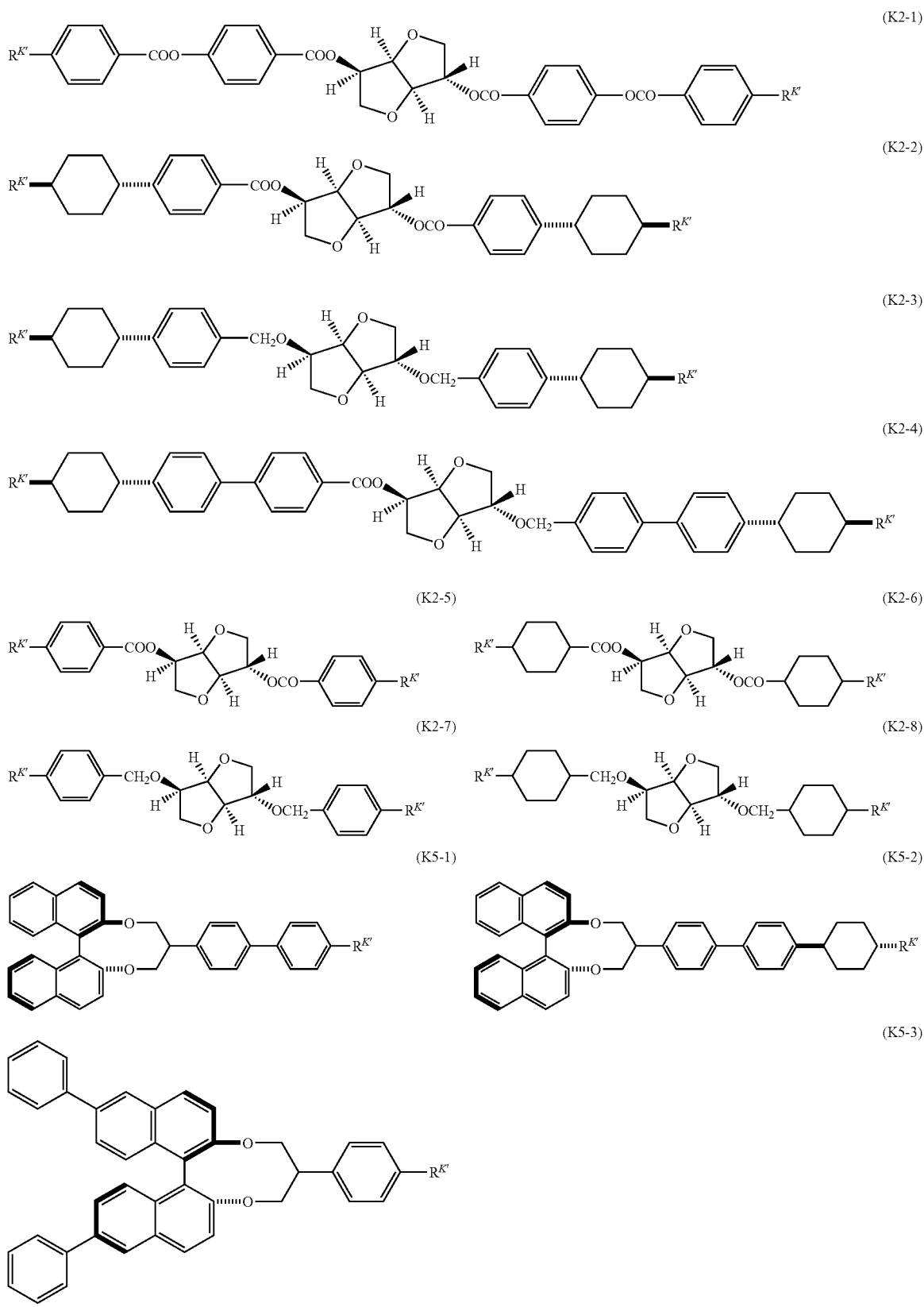

wherein in the formulae (K2-1) to (K2-8) and (K5-1) to (K5-3), each $R^{K'}$ is independently alkyl having 3 to 10 carbon atoms, wherein —CH₂— adjacent to the ring in the alkyl can be substituted with —O—, and any —CH₂— can be substituted with —CH═CH—.

The above-described "alkyl" is preferably alkyl having 3 to 10 carbon atoms, and more preferably alkyl having 3 to 6 carbon atoms. Examples of alkyls include, but are not limited to, propyl, isopropyl, n-butyl, s-butyl, t-butyl, pentyl, hexyl and dodecanyl.

In general, the content of the chiral dopants in the optically isotropic liquid crystal composition of the present invention is preferably approximately 0.001% to approximately 20% by weight, and particularly preferably approximately 0.001% to approximately 10% by weight.

The liquid crystal composition of the invention can be used as a liquid crystal composition for a GH mode device by adding a dichroic dye, such as a merocyanine series, a styryl series, an azo series, an azomethine series, an azoxy series, a quinophthalone series, an anthraquinone series and a tetrazine series.

The liquid crystal composition of the invention can be applied to such purposes as a nematic curvilinear aligned phase (NCAP) device prepared by microcapsulating a nematic liquid crystal composition, a polymer-dispersed liquid crystal display device (PDLCD) produced by forming a three-dimensional network polymer in a liquid crystal composition, a polymer network liquid crystal display device (PNLCD), an electrically controlled birefringence (ECB) mode liquid crystal display device and a dynamic scattering (DS) mode liquid crystal display device.

3. Liquid Crystal Composition 2 of the Invention

The invention concerns, as a third aspect, a composition containing the compound represented by formula (1), which is preferably a liquid crystal composition capable of being applied to such purposes as PDLCD, PNLCD and a polymer-stabilized cholesteric liquid crystal display device (PSCLCD). The liquid crystal composition of the invention necessarily contains the compound represented by formula (1) of the invention as a component A. The composition may be a composition containing only the component A or a composition containing the component A and another component, the component name of which is not specified herein. The liquid crystal composition of the invention with various characteristics can be provided by adding a component selected from the following components F and G to the component A.

Preferred examples of the component to be added to the component A include the component F containing at least one compound selected from the group of compounds represented by formulas (15), (16), (17) and (18), and the component G containing at least one compound selected from the group of compounds represented by formula (19).

The components of the liquid crystal composition used in the invention may be analogues thereof containing isotopes of the elements constituting the components since there is no large difference among them in physical properties, such as the dielectric anisotropy, the refractive index anisotropy and the phase transition points.

In the component F, preferred examples of the compound represented by formula (15) include compounds represented by formulas (15-1) to (15-8), preferred examples of the compound represented by formula (16) include compounds represented by formulas (16-1) to (16-26), and preferred examples of the compound represented by formula (17) include compounds represented by formulas (17-1) to (17-22).

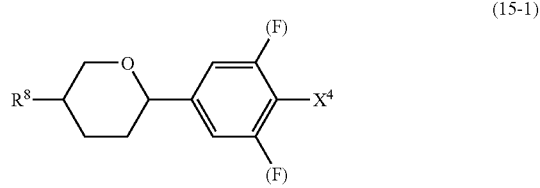
(15-1)

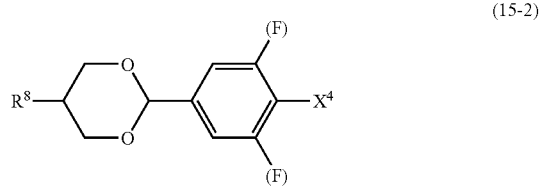
(15-2)

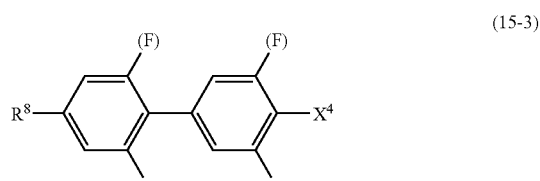
(15-3)

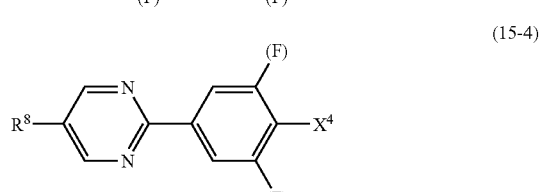
(15-4)

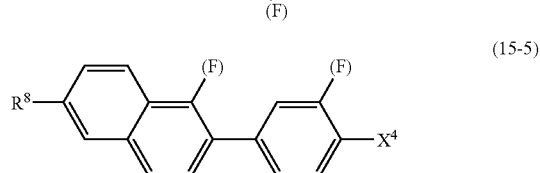
(15-5)

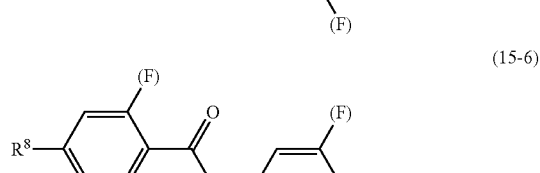
(15-6)

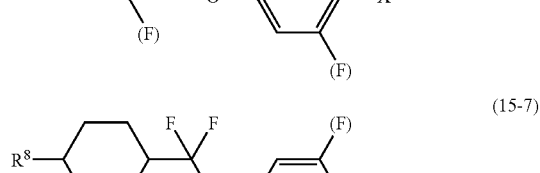
(15-7)

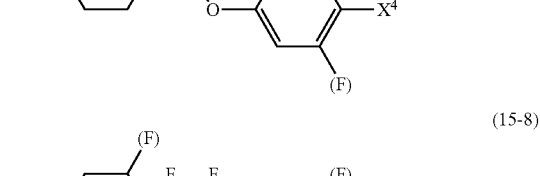
(15-8)

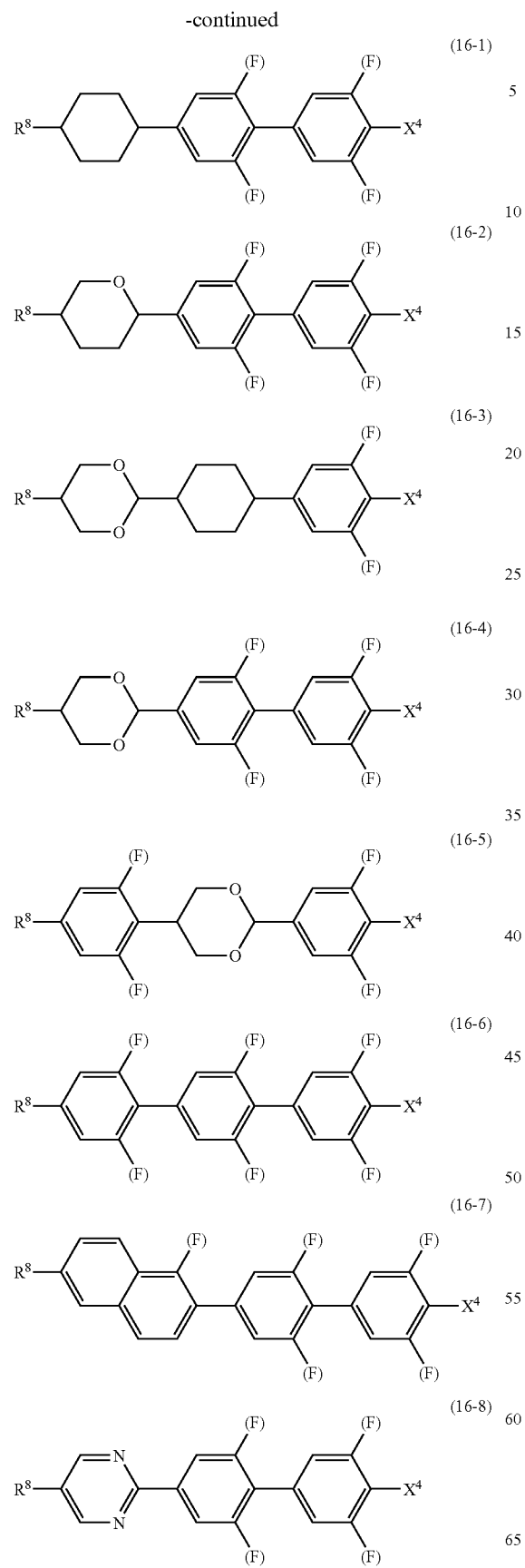
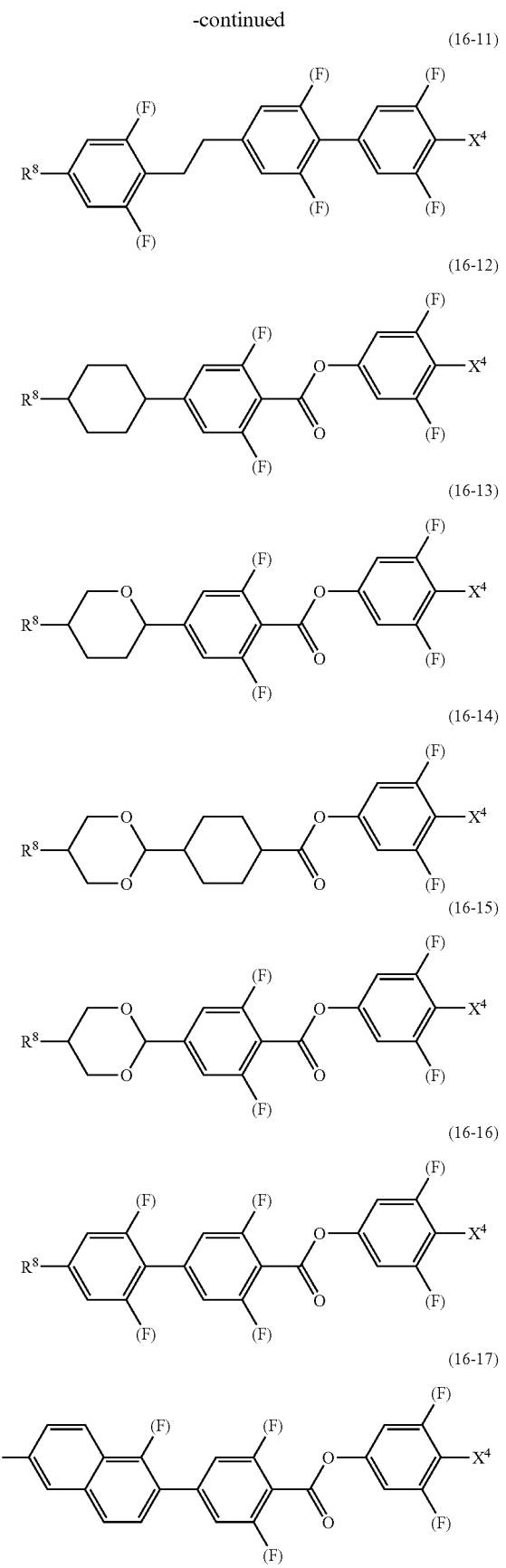

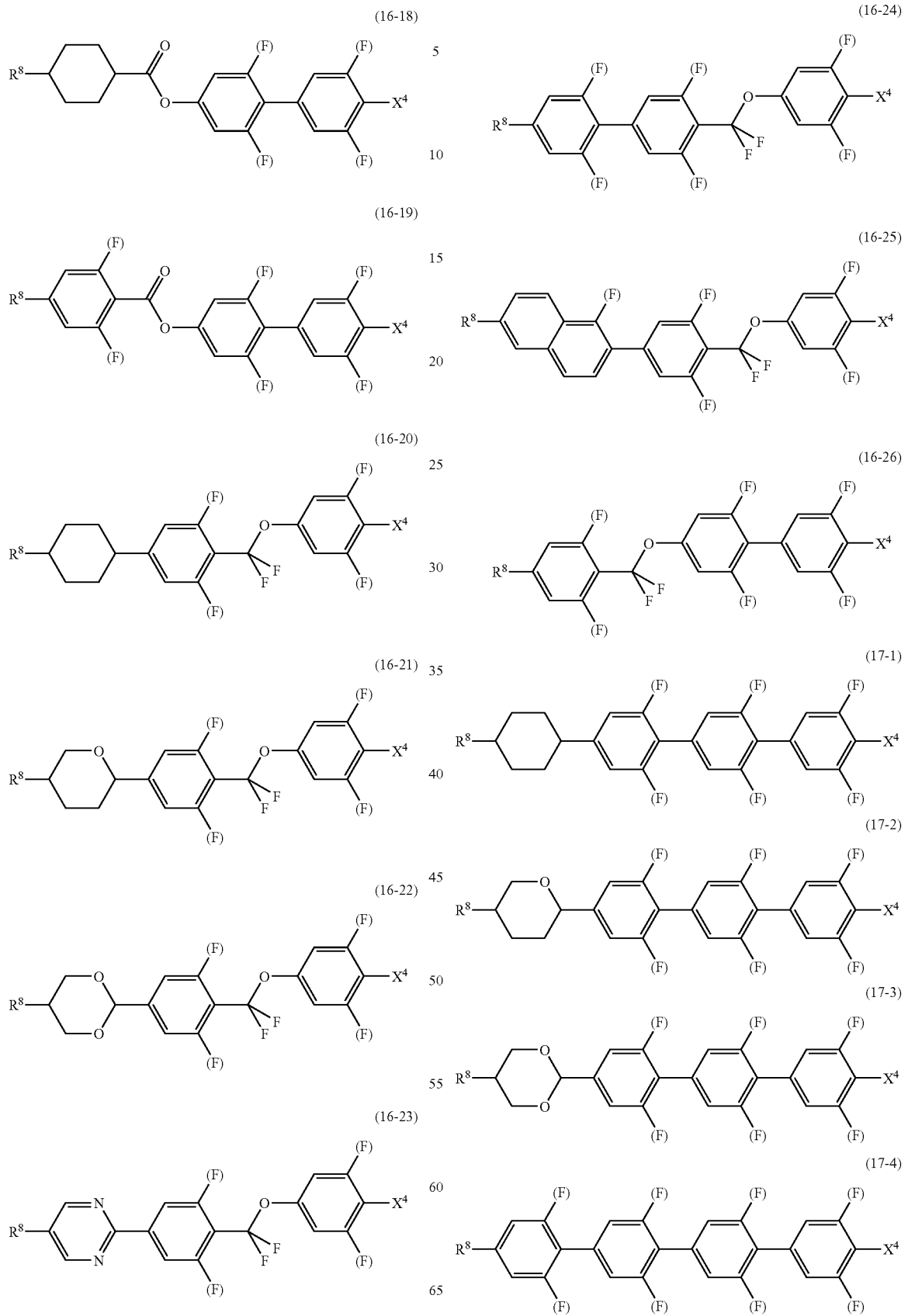

-continued
(17-5)
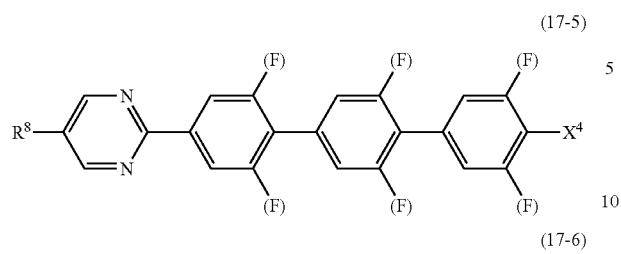
(17-6)
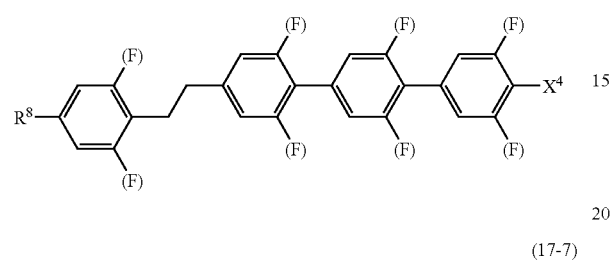
(17-7)
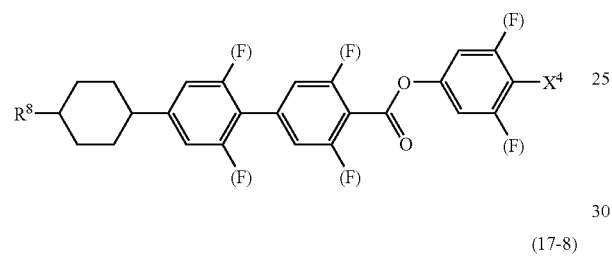
(17-8)
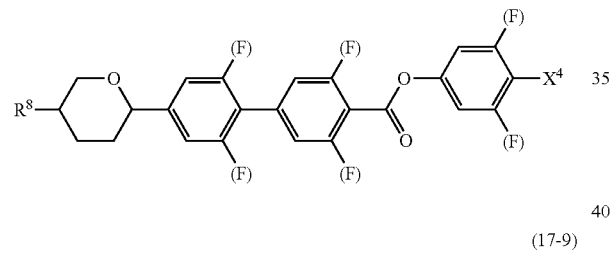
(17-9)
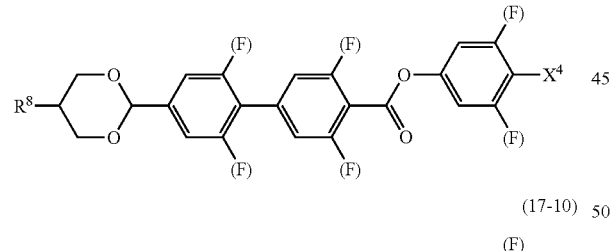
(17-10)
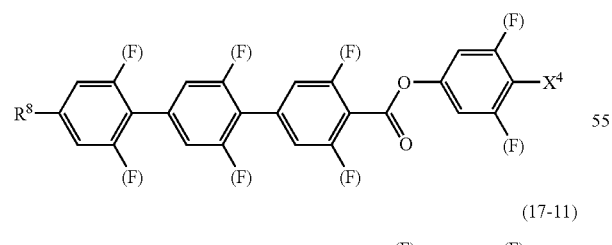
(17-11)
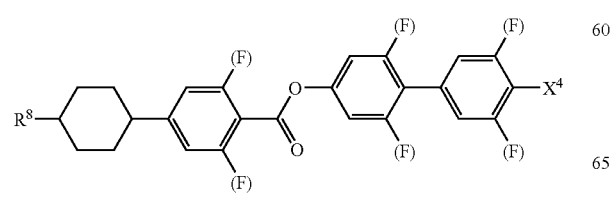
-continued
(17-12)
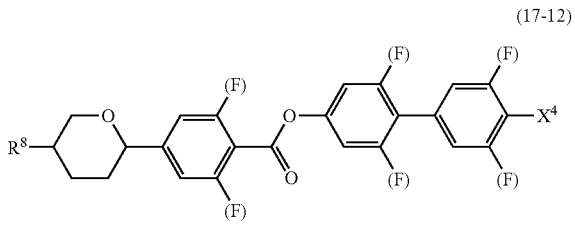
(17-13)
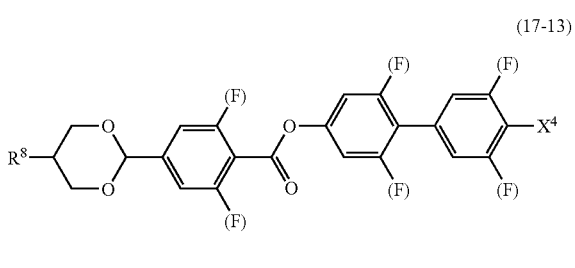
(17-14)
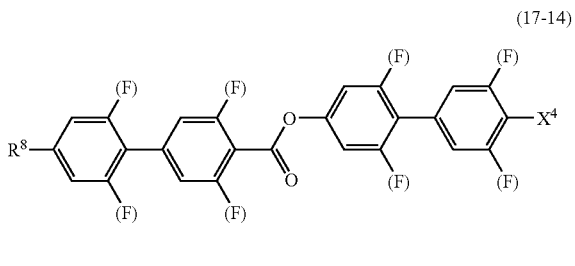
(17-15)
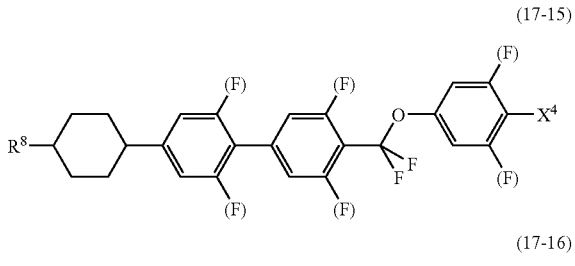
(17-16)
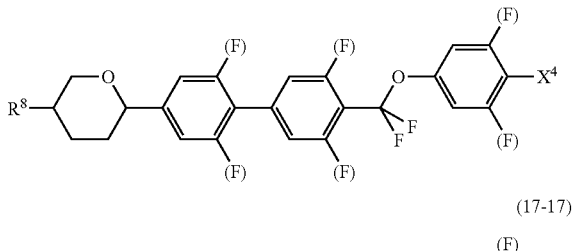
(17-17)
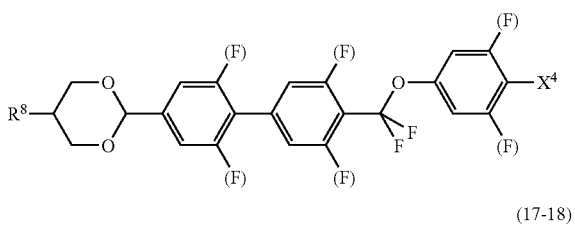
(17-18)
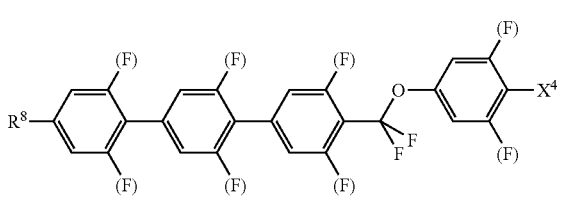

-continued (17-19)
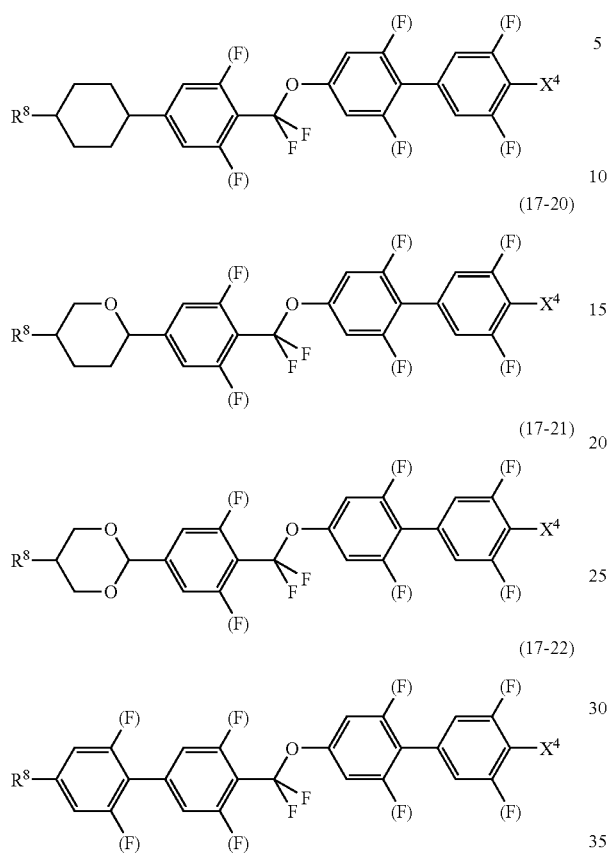
(17-20)

(17-21)

(17-22)

In the formulas (15-1) to (15-8), (16-1) to (16-26) and (17-1) to (17-22), $R^8$ and $X^4$ have the same meanings as described above, and (F) is hydrogen or fluorine.

The compound represented by formula (15) to (18) has a positive dielectric anisotropy and is excellent in heat stability and chemical stability, and thus the compound is preferred for preparing a liquid crystal composition for active driving, such as TFT driving. The content of the component F in the liquid crystal composition of the invention is suitably from approximately 1% to approximately 99% by weight, preferably from approximately 10% to approximately 97% by weight, and more preferably from approximately 40% to approximately 95% by weight, based on the total amount of the liquid crystal composition. The viscosity of the composition can be controlled by further adding the compound represented by formulas (11) to (13) (component E).

Preferred examples of the compound represented by formula (19), i.e., the component G, include compounds represented by formulas (19-1) to (19-37).

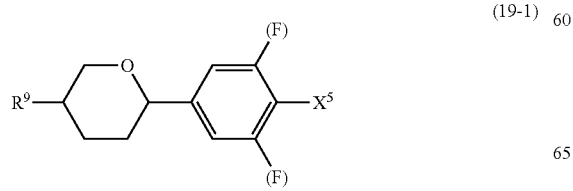
(19-1)

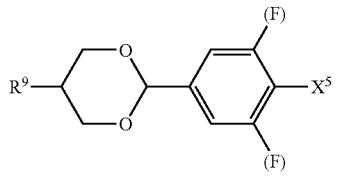
(19-2)

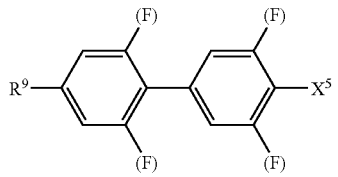
(19-3)

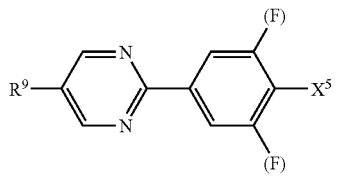
(19-4)

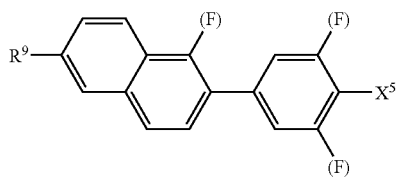
(19-5)

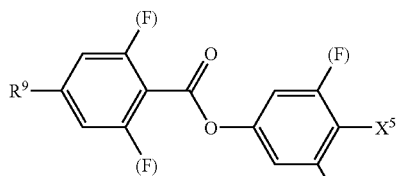
(19-6)

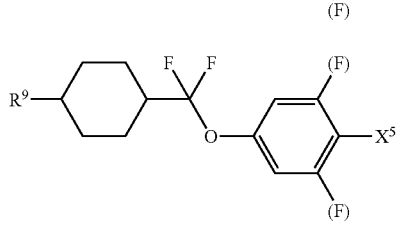
(19-7)

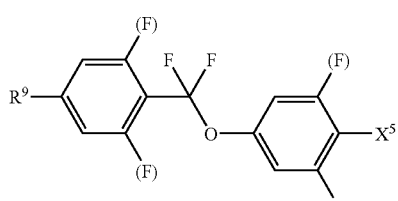
(19-8)

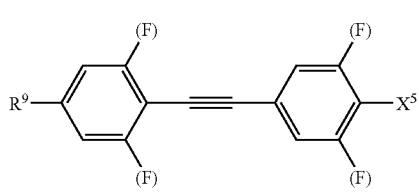
(19-9)

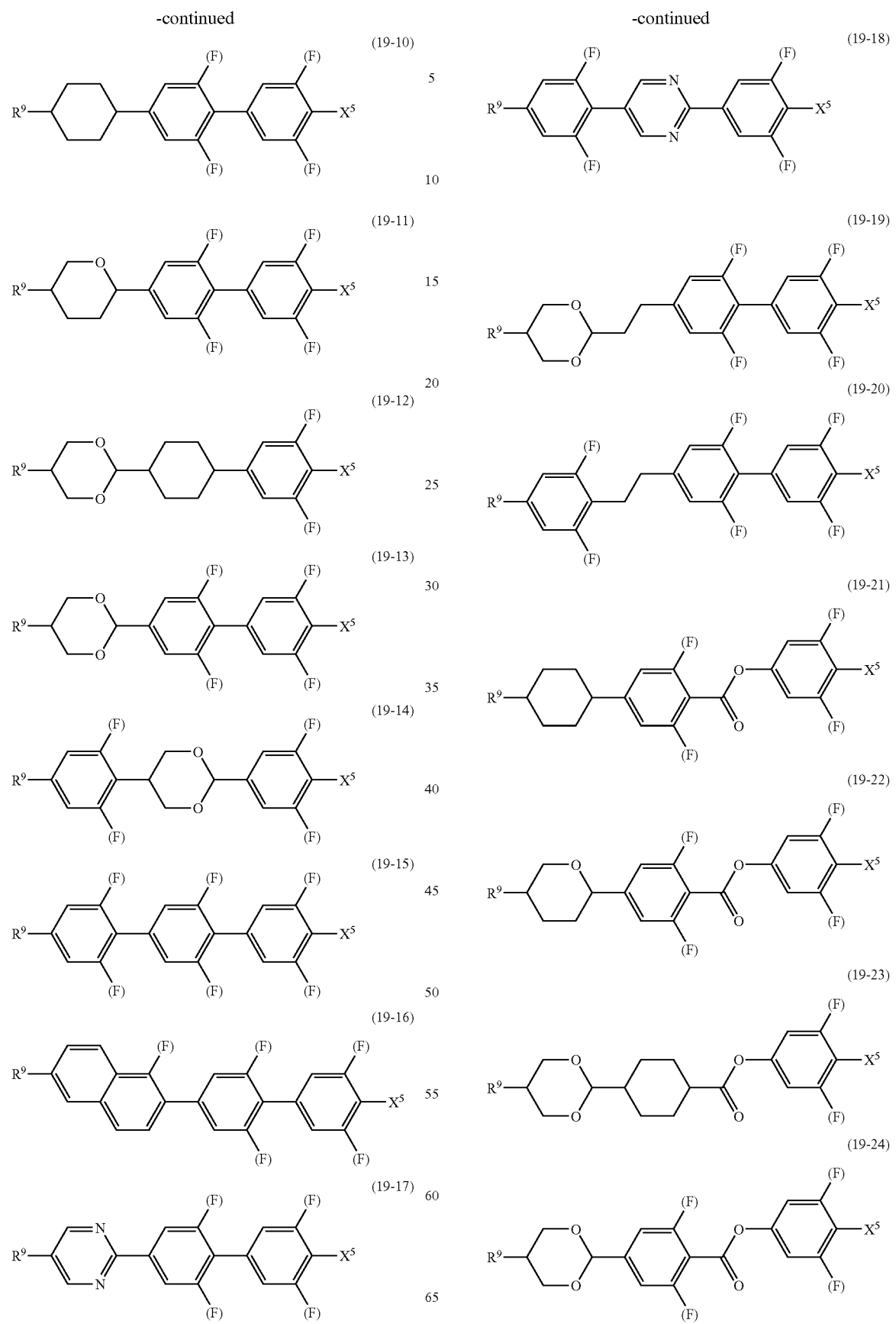

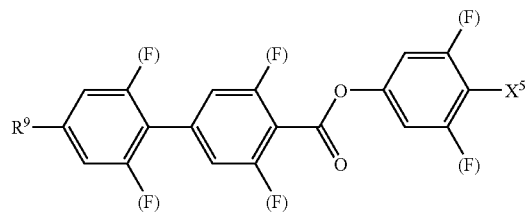
(19-25)

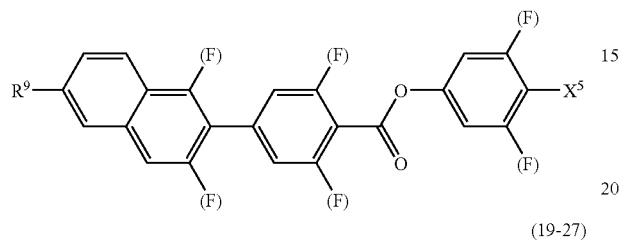
(19-26)

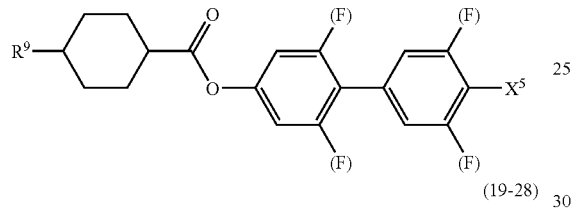
(19-27)

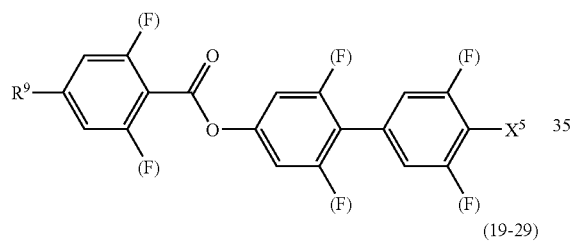
(19-28)

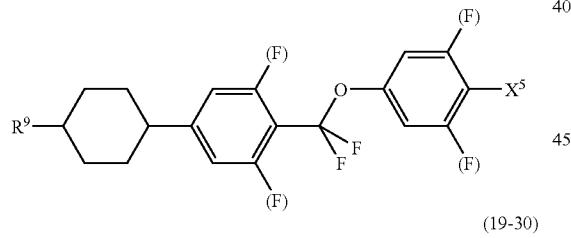
(19-29)

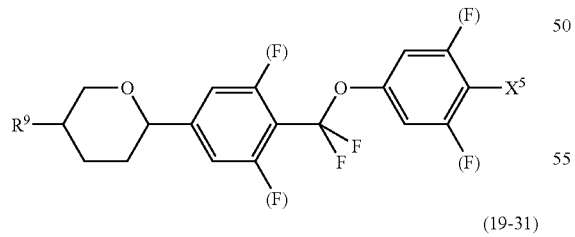
(19-30)

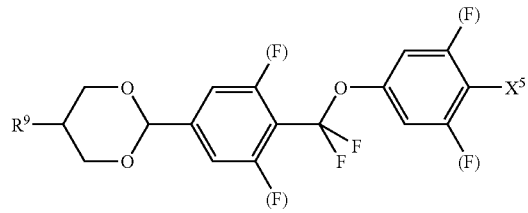
(19-31)

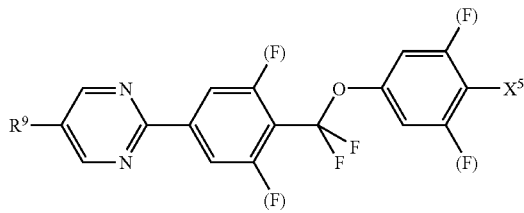
(19-32)

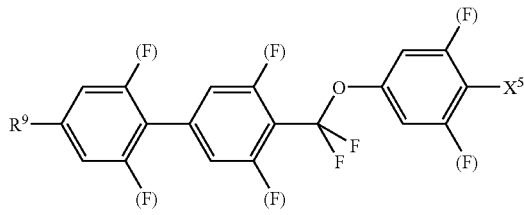
(19-33)

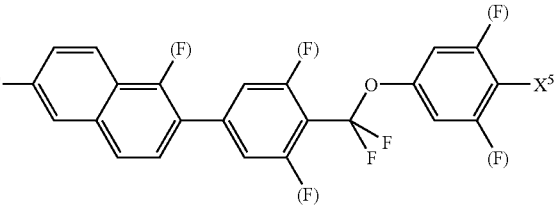
(19-34)

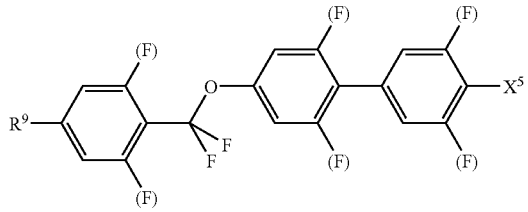
(19-35)

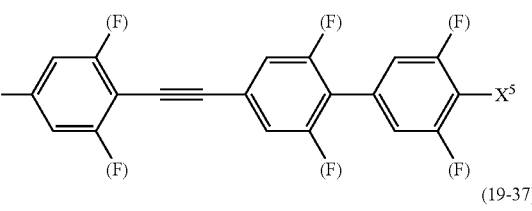
(19-36)

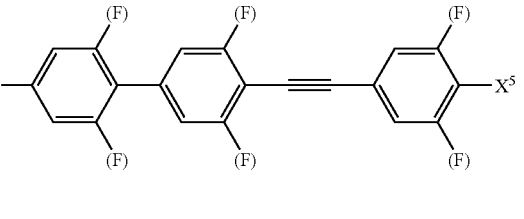
(19-37)

In the formulas (19-1) to (19-37), $R^9$ and $X^5$ have the same meanings as described above.

The compound represented by formula (19), i.e., the component G, has a significantly large positive dielectric anisotropy and is used mainly in the case where a device driven in an optically isotropic liquid crystal phase and a device, such as PDLCD, PNLCD and PSCLCD, are driven at a low voltage. The addition of the component G decreases the driving voltage of the liquid crystal composition. The addition of the component G enables control of the viscosity, control of the refractive index anisotropy and enhancement of the temperature range of a liquid crystal phase. The component G is also used for improving steepness of the characteristics.

The content of the component G is preferably from approximately 0.1% to approximately 99.9% by weight, more preferably from approximately 10% to approximately 97% by weight, and further preferably from approximately 40% to approximately 95% by weight, based on the total amount of the composition.

The liquid crystal composition and the polymer-liquid crystal composite material of the invention do not exhibit an optically isotropic liquid crystal phase. A liquid crystal composition having optical isotropy shows optical isotropy through an isotropic alignment of liquid crystal molecules in a macroscopic view, and has liquid crystal regularity in a microscopic view.

The term "isotropic phase" referred herein is an isotropic phase that is ordinarily defined, i.e., an isotropic phase that is a disordered phase, in which even when a region where the order parameter is not zero is formed locally, the cause thereof is fluctuation. For example, an isotropic phase formed on a high temperature side of a nematic phase corresponds to an isotropic phase defined herein. The same definition is applied to the chiral liquid crystal referred herein. The term "optically isotropic liquid crystal phase" referred herein is a phase exhibiting an isotropic phase optically but not by fluctuation, and examples thereof include a phase exhibiting a platelet structure (blue phase of narrow definition).

4 Other Additives

The liquid crystal composition of the invention may contain other compounds, such as a polymer substance and so forth, in such a range that the characteristics of the composition are not impaired. The liquid crystal composition of the invention may contain, for example, a dichroic dye and a photochromic compound, in addition to the polymer substance.

5 Polymer-Liquid Crystal Composite Material

The invention concerns, as a fourth aspect, a composite material of a liquid crystal composition containing the compound represented by formula (1) and a polymer, and the composite material does not exhibit an optically isotropic liquid crystal phase. The polymer-liquid crystal composite material is constituted, for example, by the liquid crystal composition shown in the items (20) to (48) and a polymer.

The "polymer-liquid crystal composite material" of the invention is not particularly limited as far as it is a composite material containing both a liquid crystal material and a polymer, and may be in such a state that the polymer may not be dissolved partially or wholly in the liquid crystal material, i.e., the polymer is phase-separated from the liquid crystal material.

A preferred embodiment of the polymer-liquid crystal composite material of the invention can be applied to a mode that does not require a polarizing plate, i.e., a mode, such as a polymer-liquid crystal composite film, a polymer-dispersed liquid crystal (PDLC) (disclosed in J. of Chem. Soc. of Japan, No. 10, 1019 (1992) and SID Symposium Digest Tech Papers, 16, 68 (1985)), a guest-host mode and a polymer-stabilized cholesteric liquid crystal (PSChLC) (disclosed in J. of Japanese Liq. Cryst. Soc., vol. 11, No. 2, 137 (2007), Mol. Cryst. Liq. Cryst., 200, 197 (1991), Liq. Cryst., 24, 387 (1998) and Liq. Cryst., 24, 397 (1998)), in which an electric field is applied to the liquid crystal composite material to switch between a transparent state and a scattered state or between a transparent state and a colored state.

The use of the polymer-liquid crystal composite material of the invention enables low voltage driving of a device, increase in scattering intensity and enhancement of wavelength band of the selective reflection wavelength even in the mode that does not require the polarizing plate described above.

5-2 Polymer

The composite material of the invention can be produced by mixing a liquid crystal composition exhibiting a nematic phase or a cholesteric phase with a polymer that has been obtained through polymerization in advance, but is preferably produced by mixing a liquid crystal composition with a monomer, a macromonomer, an oligomer or the like having a low molecular weight (which are referred to as a monomer or the like hereinafter) as a starting material of the polymer to provide a mixture, and then carrying out polymerization reaction in the mixture. The mixture containing the monomer or the like and the liquid crystal composition herein is referred to as a polymerizable monomer-liquid crystal mixture. The polymerizable monomer-liquid crystal mixture may contain a polymerization initiator, a curing agent, a catalyst, a stabilizer, a dichroic dye, a photochromic compound and so forth described later depending on necessity in such a range that the advantages of the invention are not impaired. For example, the polymerizable monomer-liquid crystal mixture of the invention may contain a polymerization initiator in an amount of from approximately 0.1 to approximately 20 parts by weight per the polymerizable monomer depending on necessity.

In the case where a polymer-liquid crystal composite film or a polymer-dispersed liquid crystal (PDLC) is to be prepared, the polymerization temperature is preferably a temperature, at which the polymerizable monomer-liquid crystal mixture exhibits an isotropic phase, and suffers phase transition to a liquid crystal phase during polymerization. In the case where a polymer-stabilized cholesteric liquid crystal (PSChLC) is to be prepared, the polymerizable monomer-liquid crystal mixture is preferably polymerized in such a state that the mixture exhibits a planar structure. As a method for exhibiting a planar structure, such methods have been known as a method of forming an oriented layer, a method of selecting a proper substrate, and a method of applying a voltage to orient the liquid crystal molecules vertically, followed by removing the voltage instantaneously, but the method is not particularly limited.

As a starting material of the polymer constituting the composite material of the invention, for example, a monomer, a macromonomer and an oligomer, which have a low molecular weight, may be used, and the term "raw material monomer" of the polymer referred herein encompasses a monomer, a macromonomer and an oligomer, which have a low molecular weight. The resulting polymer may have a three-dimensionally crosslinked structure, and a polyfunctional monomer having two or more polymerizable functional groups may be used as the raw material monomer of the polymer. The species of the polymerizable functional group is not particularly limited, and examples thereof include an acrylic group, a methacrylic group, a glycidyl group, an epoxy group, an oxetanyl group, a vinyl group and so forth. An acrylic group and a methacrylic group are preferred from the standpoint of polymerization speed.

The polymer may have a mesogen moiety, and a raw material monomer having a mesogen moiety may be used as a part or the whole of the raw material monomer of the polymer.

5-2-1 Monofunctional or Bifunctional Monomer having Mesogen Moiety

The monofunctional or bifunctional monomer having a mesogen moiety is not particularly limited in structure, and examples thereof include compounds represented by formulas (M1) and (M2).

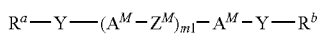  (M1)

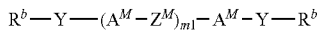  (M2)

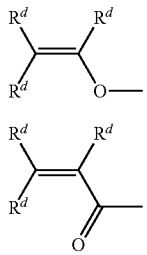  (M3-1)

(M3-2)

(M3-3)

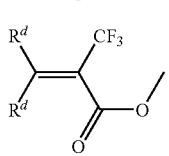  (M3-4)

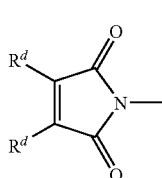  (M3-5)

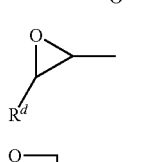  (M3-6)

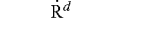  (M3-7)

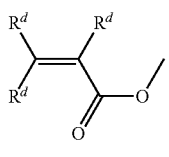

In formula (M1), $R^a$ is independently hydrogen, halogen, —C≡N, —N=C=O, —N=C=S or alkyl having 1 to 20 carbons, in which in the alkyl, arbitrary —CH$_2$— may be replaced by —O—, —S—, —CO—, —COO—, —OCO—, —CH=CH—, —CF=CF— or —C≡C—, and arbitrary hydrogen may be replaced by halogen or —C≡N.

$R^a$ is preferably hydrogen, halogen, —C≡N, —CF$_3$, —CF$_2$H, —CFH$_2$, —OCF$_3$, —OCF$_2$H, alkyl having 1 to 20 carbons, alkoxy having 1 to 19 carbons, alkenyl having 2 to 21 carbons or alkynyl having 2 to 21 carbons. $R^a$ is more preferably —C≡N, alkyl having 1 to 20 carbons or alkoxy having 1 to 19 carbons. In formula (M1), $R^b$ is independently a polymerizable group represented by formulas (M3-1) to (M3-7).

In formula (M2), $R^b$ is independently a polymerizable group represented by formulas (M3-1) to (M3-7).

In the groups (M3-1) to (M3-7), $R^d$ is independently hydrogen, halogen or alkyl having 1 to 5 carbons, in which in the alkyl, arbitrary hydrogen may be replaced by halogen. $R^d$ is preferably hydrogen, halogen or methyl. $R^d$ is more preferably hydrogen, fluorine or methyl.

The groups (M3-2), (M3-3), (M3-4) and (M3-7) are preferably polymerized by radical polymerization. The groups (M3-1), (M3-5) and (M3-6) are preferably polymerized by cationic polymerization. Both polymerization modes are living polymerization, which is initiated when a small amount of a radical or cationic active species is present in the reaction system. A polymerization initiator may be used for accelerating generation of the active species. The generation of the active species may be attained, for example, by using light or heat.

In formulas (M1) and (M2), $A^M$ is independently an aromatic or nonaromatic 5-membered or 6-membered ring or a condensed ring having 9 or more carbons, in which in the rings, arbitrary —CH$_2$— may be replaced by —O—, —S—, —NH— or —NCH$_3$—, arbitrary —CH= may be replaced by —N=, and arbitrary hydrogen may be replaced by halogen, alkyl having 1 to 5 carbons or halogenated alkyl. Preferred specific examples of $A^M$ include 1,4-cyclohexylene, 1,4-cyclohexenylene, 1,4-phenylene, naphthalen-2,6-diyl, tetrahydronaphthalen-2,6-diyl, fluoren-2,7-diyl and bicyclo[2.2.2]octan-1,4-diyl, in which in the rings, arbitrary —CH$_2$— may be replaced by —O—, arbitrary —CH= may be replaced by —N=, and arbitrary hydrogen may be replaced by halogen, alkyl having 1 to 5 carbons or halogenated alkyl having 1 to 5 carbons.

In consideration of stability of the compound, —CH$_2$—O—CH$_2$—O— where two oxygen are not adjacent to each other is preferred rather than —CH$_2$—O—O—CH$_2$— where two oxygen are adjacent to each other. This relationship is applied when sulfur is selected instead of oxygen.

Preferred examples of $A^M$ among these include 1,4-cyclohexylene, 1,4-cyclohexenylene, 1,4-phenylene, 2-fluoro-1,4-phenylene, 2,3-difluoro-1,4-phenylene, 2,5-difluoro-1,4-phenylene, 2,6-difluoro-1,4-phenylene, 2-methyl-1,4-phenylene, 2-trifluoromethyl-1,4-phenylene, 2,3-bis(trifluoromethyl)-1,4-phenylene, naphthalen-2,6-diyl, tetrahydronaphthalen-2,6-diyl, fluoren-2,7-diyl, 9-methylfluoren-2,7-diyl, 1,3-dioxan-2,5-diyl, pyridin-2,5-diyl and pyrimidin-2,5-diyl. The steric configuration of 1,4-cyclohexylene and 1,3-dioxan-2,5-diyl is preferably trans rather than cis.

2-Fluoro-1,4-phenylene is structurally the same as 3-fluoro-1,4-phenylene, and thus the latter is not mentioned herein. The same rule is applied to the relationship between 2,5-difluoro-1,4-phenylene and 3,6-difluoro-1,4-phenylene, and so forth.

In formulas (M1) and (M2), Y is independently a single bond or alkylene having 1 to 20 carbons, in which in the alkylene, arbitrary —CH$_2$— may be replaced by —O—, —S—, —CH=CH—, —C≡C—, —COO— or —OCO—. Y is preferably a single bond, —(CH$_2$)$_{m2}$—, —O(CH$_2$)$_{m2}$— or —(CH$_2$)$_{m2}$O—, wherein m2 is an integer of from 1 to 20. Y is more preferably a single bond, —(CH$_2$)$_{m2}$—, —O(CH$_2$)$_{m2}$— or —(CH$_2$)$_{m2}$O—, wherein m2 is an integer of from 1 to 10. In consideration of stability of the compound, —Y—$R^a$ and —Y—$R^b$ preferably do not contain —O—O—, —O—S—, —S—O— and —S—S— in the groups.

In formulas (M1) and (M2), $Z^M$ is independently a single bond, —(CH$_2$)$_{m3}$—, —O(CH$_2$)$_{m3}$—, —(CH$_2$)$_{m3}$O—, —O(CH$_2$)$_{m3}$O—, —CH=CH—, —C≡C—, —COO—, —OCO—, —(CF$_2$)$_2$—, —(CH$_2$)$_2$—COO—, —OCO—(CH$_2$)$_2$—, —CH=CH—COO—, —OCO—CH=CH—, —C≡C—COO—, —OCO—C≡C—, —CH═CH—(CH$_2$)$_2$—, —(CH$_2$)$_2$—CH═CH—, —CF═CF—, —C≡C—CH═CH—, —CH═CH—C≡C—, —OCF$_2$—(CH$_2$)$_2$—, —(CH$_2$)$_2$—CF$_2$O—, —OCF$_2$— or —CF$_2$O—, wherein m3 is an integer of from 1 to 20.

$Z^M$ is preferably a single bond, —(CH$_2$)$_{m3}$—, —O(CH$_2$)$_{m3}$—, —(CH$_2$)$_{m3}$O—, —CH═CH—, —C≡C—, —COO—, —OCO—, —(CH$_2$)$_2$—COO—, —OCO—(CH$_2$)$_2$—, —CH═CH—COO—, —OCO—CH═CH—, —OCF$_2$— or —CF$_2$O—.

In formulas (M1) and (M2), m1 is an integer of from 1 to 6, and preferably an integer of from 1 to 3. In the case where m1 is 1, the compound is a bicyclic compound having two rings, such as a 6-membered ring. In the case where m1 is 2 or 3, the compound is a tricyclic or tetracyclic compound. In the case, for example, where m1 is 1, two groups represented by $A^M$ may be the same as or different from each other. In the case, for example, where m1 is 2, three groups represented by $A^M$ (or two groups represented by $Z^M$) may be the same as or different from each other. The same rule is applied to the case where m1 is from 3 to 6. The same rule is applied to $R^a$, $R^b$, $Z^M$, $A^M$ and Y.

The compound (M1) represented by formula (M1) and the compound (M2) represented by formula (M2) may contain isotopes, such as $^2$H (deuterium) and $^{13}$C, in an amount larger than the natural abundances since the similar characteristics are obtained.

Preferred examples of the compound (M1) and the compound (M2) include compounds (M1-1) to (M1-41) and (M2-1) to (M2-27) represented by formulas (M1-1) to (M1-41) and (M2-1) to (M2-27). In these compounds, $R^a$, $R^b$, $Z^M$, and Y have the same meanings as in formulas (M1) and (M2) described in the embodiment.

The following partial structures in the compounds (M1-1) to (M1-41) and (M2-1) to (M2-27) will be described. The partial structure (a1) shows 1,4-phenylene, in which arbitrary hydrogen is replaced by fluorine. The partial structure (a2) shows 1,4-phenylene, in which arbitrary hydrogen may be replaced by fluorine. The partial structure (a3) shows 1,4-phenylene, in which arbitrary hydrogen may be replaced by one of fluorine and methyl. The partial structure (a4) shows fluoren-2,7-diyl, in which hydrogen at the 9-position may be replaced by methyl.

(a1)

(a2)

(a3)

(a4)

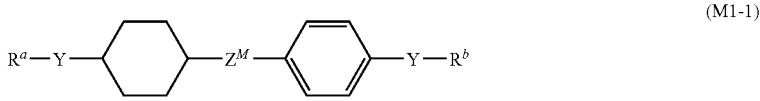
(M1-1)

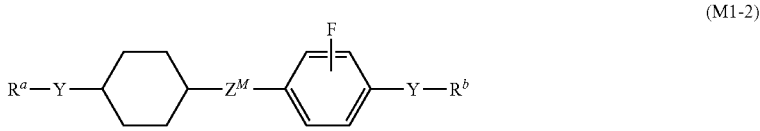
(M1-2)

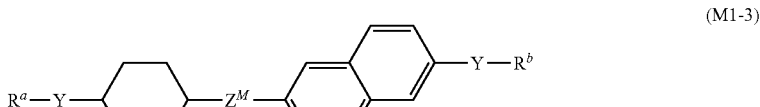
(M1-3)

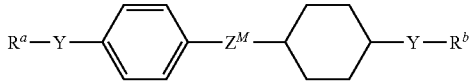
(M1-4)

-continued
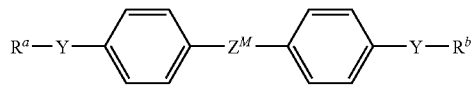
(M1-5)
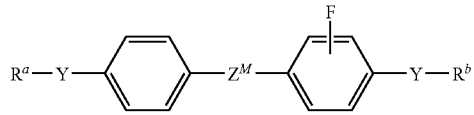
(M1-6)
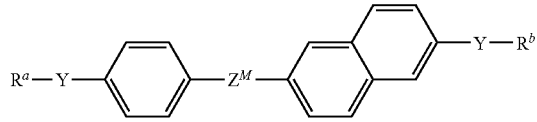
(M1-7)
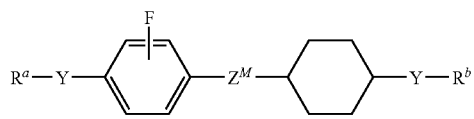
(M1-8)
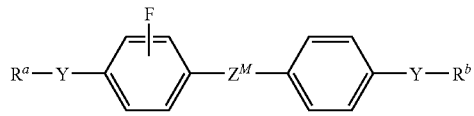
(M1-9)
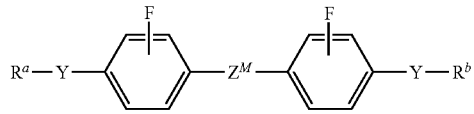
(M1-10)
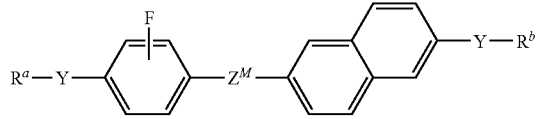
(M1-11)
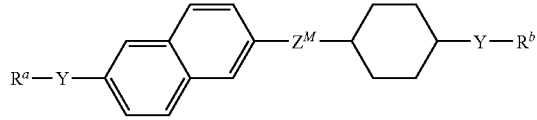
(M1-12)
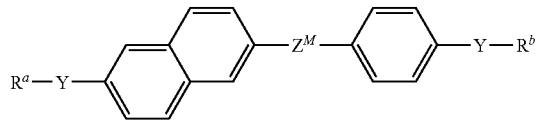
(M1-13)
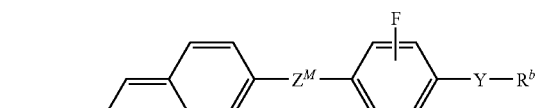
(M1-14)
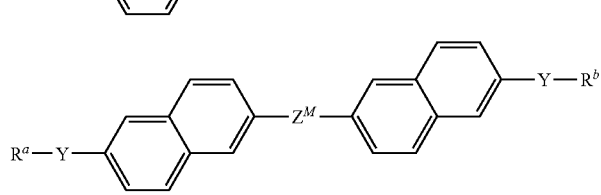
(M1-15)
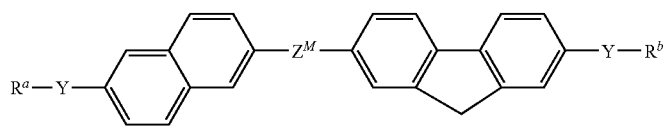
(M1-16)

-continued
(M1-17) 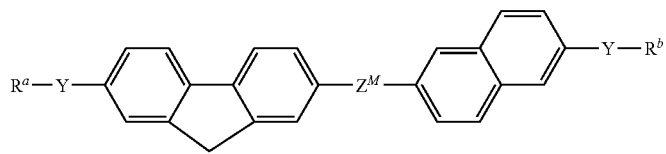
(M1-18) 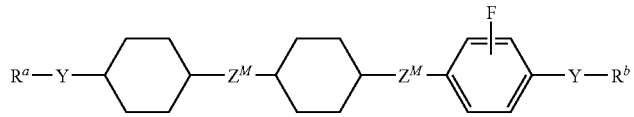
(M1-19) 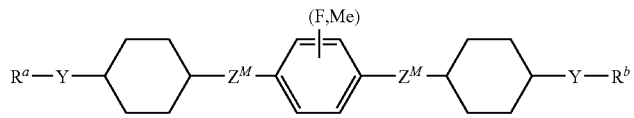
(M1-20) 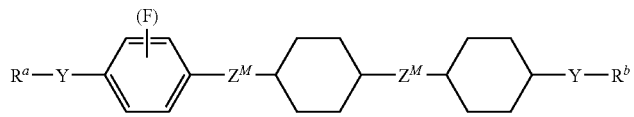
(M1-21) 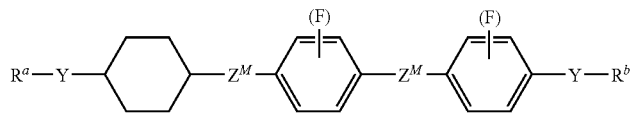
(M1-22) 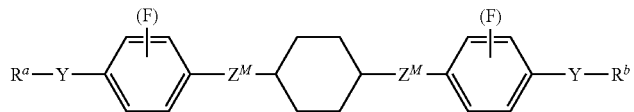
(M1-23) 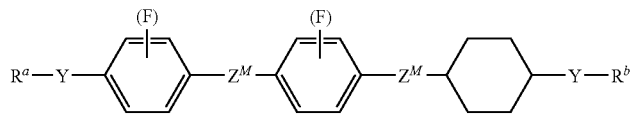
(M1-24) 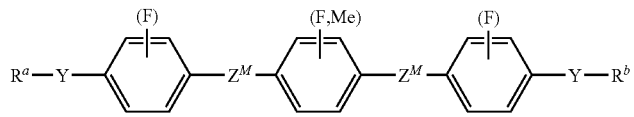
(M1-25) 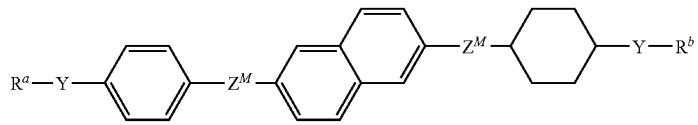
(M1-26) 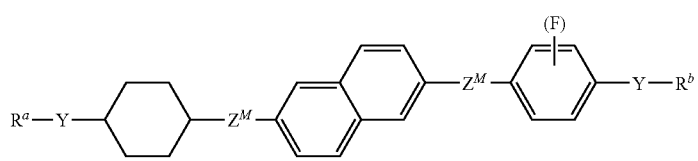
(M1-27) 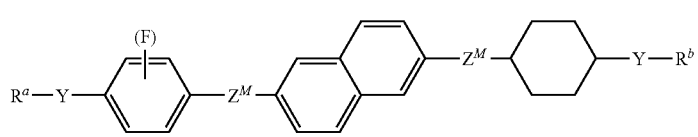
(M1-28) 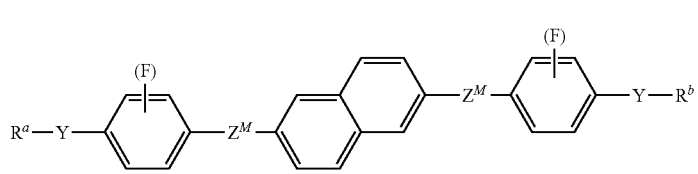

-continued
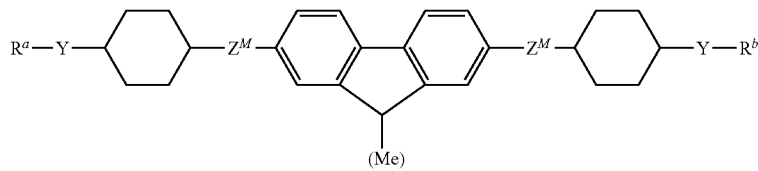
(M1-29)
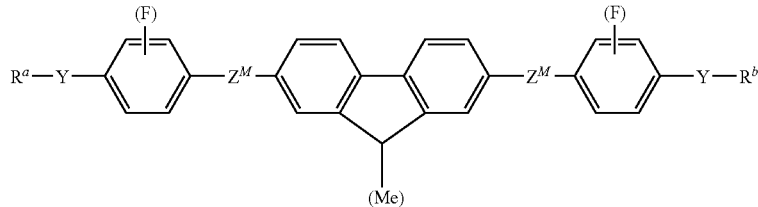
(M1-30)
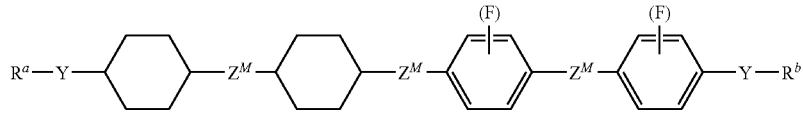
(M1-31)
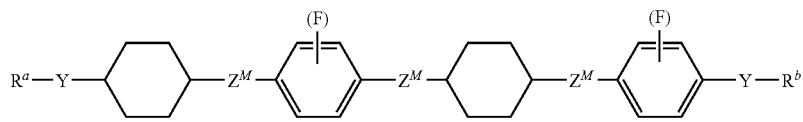
(M1-32)
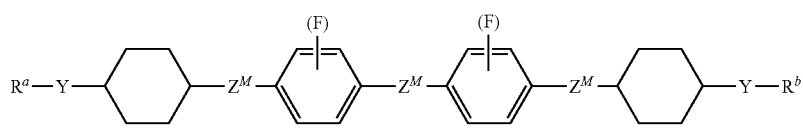
(M1-33)
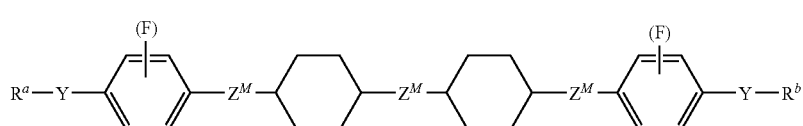
(M1-34)
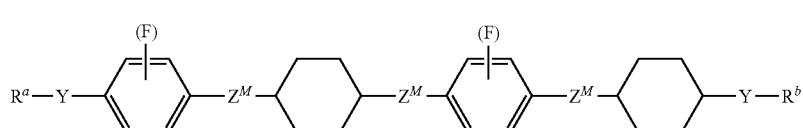
(M1-35)
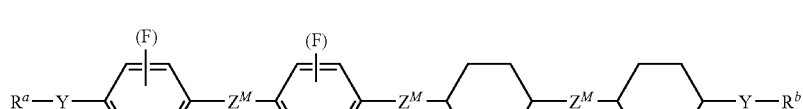
(M1-36)
(M1-37)
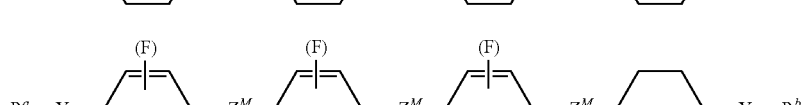
(M1-38)
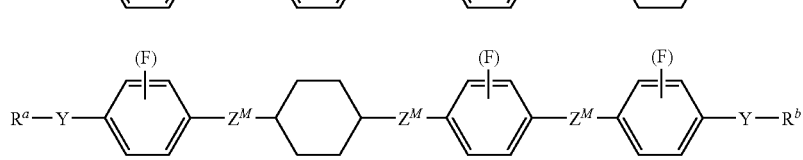
(M1-39)

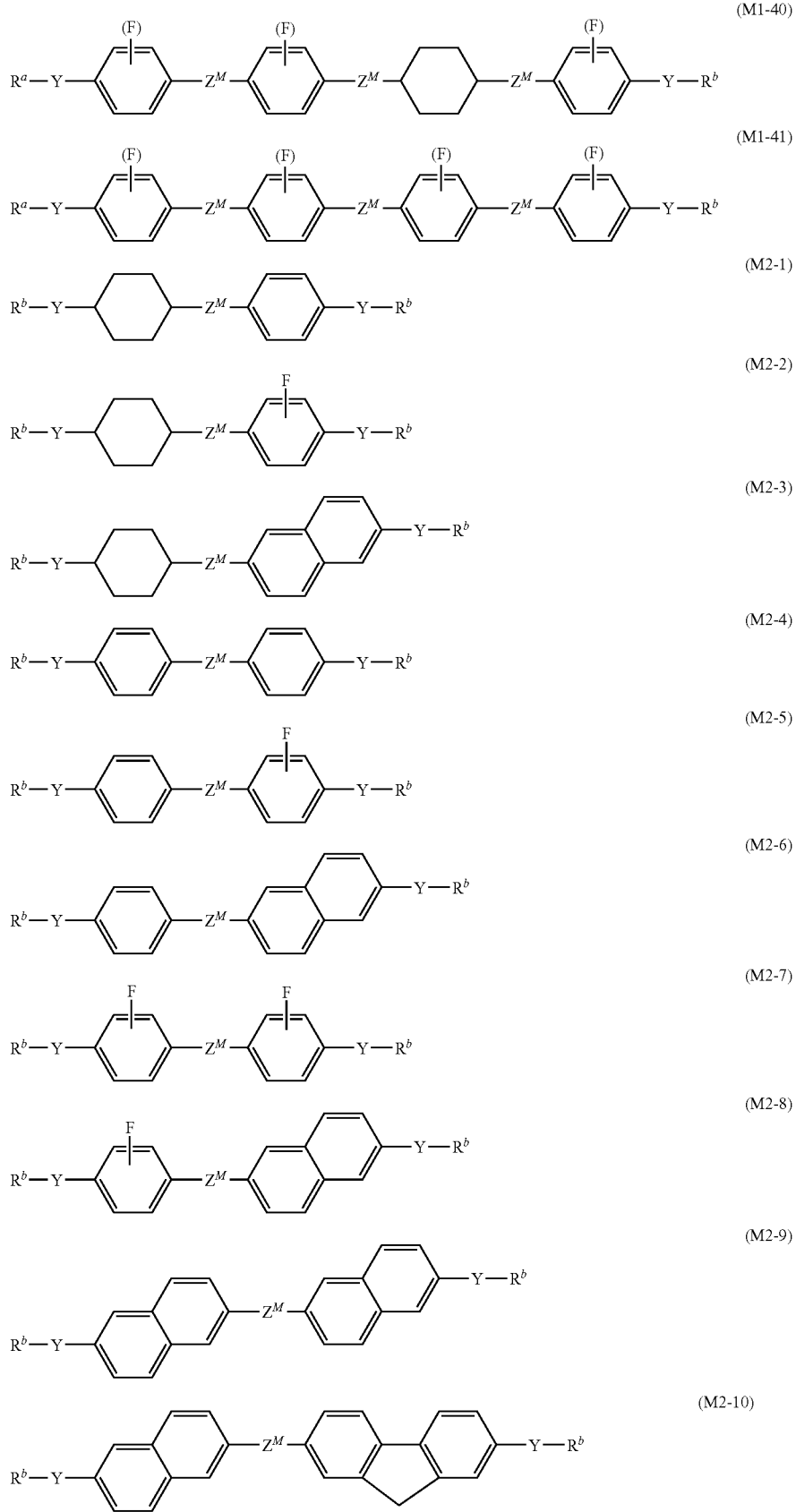

-continued
(M2-11)
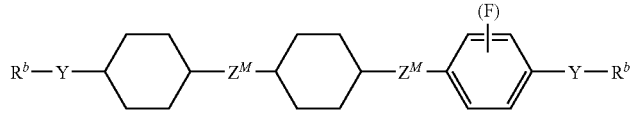
(M2-12)
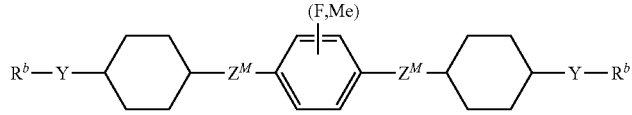
(M2-13)
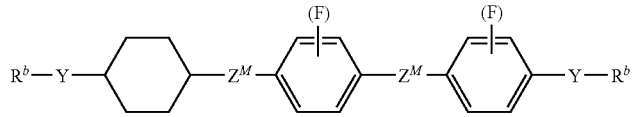
(M2-14)
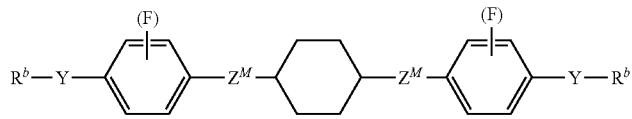
(M2-15)
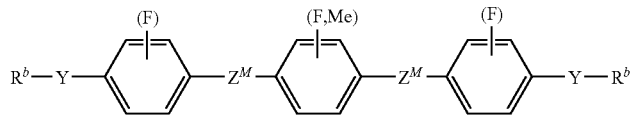
(M2-16)
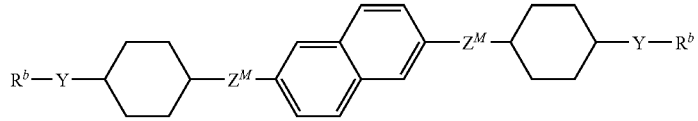
(M2-17)
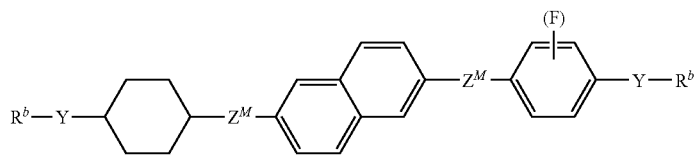
(M2-18)
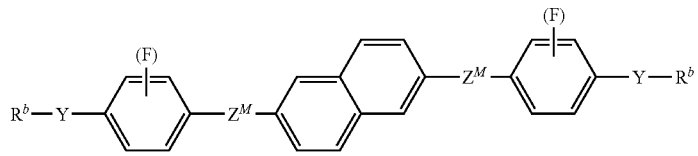
(M2-19)
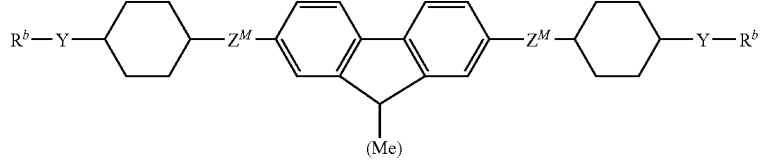
(M2-20)
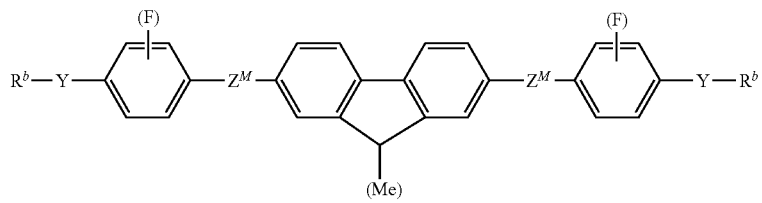
(M2-21)
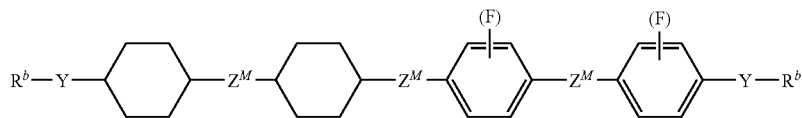

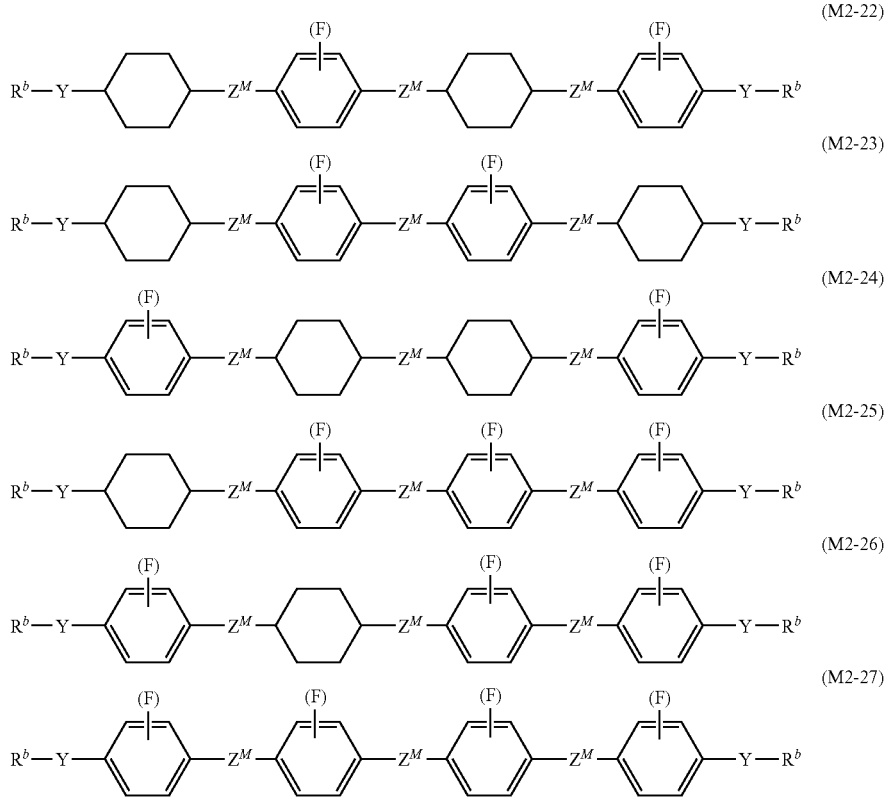

A polymerizable compound other than the monomer having no mesogen moiety and the monomers (M1) and (M2) having a mesogen moiety may be used depending on necessity.

In the polymer-liquid crystal composite material of the invention, a monomer having a mesogen moiety and having three or more polymerizable functional groups may be used. As the monomer having a mesogen moiety and having three or more polymerizable functional groups, a known compound may be preferably used, and examples thereof include compounds represented by formulas (M4-1) to (M4-3). More specific examples thereof include the compounds disclosed in JP 2000-327632 A/2000, JP 2004-182949 A/2004 and JP 2004-59772 A/2004. In formulas (M4-1) to (M4-3), $R^b$, $Z^M$, Y and (F) have the same meanings as above.

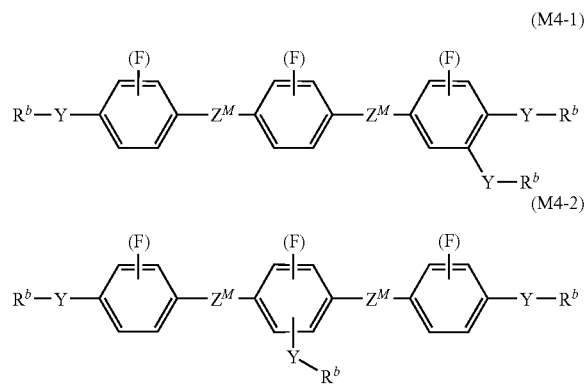

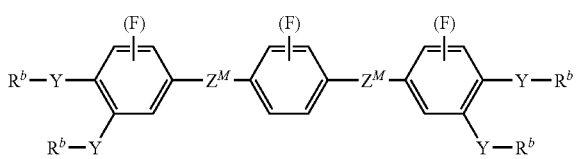

5-2-2 Monomer having no Mesogen Moiety and having Polymerizable Functional Group Examples of the monomer having no mesogen moiety and having a polymerizable functional group include a linear or branched acrylate having 1 to 30 carbons and a linear or branched diacrylate having 1 to 30 carbons, and examples of the monomer having three or more polymerizable functional groups include glycerol propoxylate (1PO/OH) triacrylate, pentaerythritol propoxylate triacrylate, pentaerythritol triacrylate, trimethylolpropane ethoxylate triacrylate, trimethylolpropane propoxylate triacrylate, trimethylolpropane triacrylate, di(trimethylolpropane) tetraacrylate, pentaerythritol tetraacrylate, di(pentaerythritol) pentaacrylate, di(pentaerythritol) hexaacrylate and trimethylolpropane triacrylate. However, the monomers are not limited to these examples.

5-2-3 Polymerization Initiator

The polymerization reaction for producing the polymer constituting the composite material of the invention is not particularly limited, and for example, radical photopolymerization, radical thermal polymerization, cationic photopolymerization and so forth may be carried out.

Examples of a radical photopolymerization initiator used in radical photopolymerization include Darocure 1173 and 4265 (trade names, produced by Ciba Specialty Chemicals, Inc.) and Irgacure 184, 369, 500, 651, 784, 819, 907, 1300, 1700, 1800, 1850 and 2959 (trade names, produced by Ciba Specialty Chemicals, Inc.).

Preferred examples of an initiator used in thermal radical polymerization include benzoyl peroxide, diisopropyl peroxydicarbonate, t-butyl peroxy-2-ethylhexanoate, t-butyl peroxypivalate, t-butyl peroxyisobutyrate, lauroyl peroxide, dimethyl 2,2'-azobisisobutyrate (MAIB), di-t-butyl peroxide (DTBPO), azobisisobutyronitrile (AIBN) and azobiscyclohexanecarbonitrile (ACN).

Examples of the cationic photopolymerization initiator used in cationic photopolymerization include a diaryliodonium salt (hereinafter abbreviated as DAS) and a triarylsulfonium salts (hereinafter abbreviated as TAS).

Examples of the DAS include diphenyliodonium tetrafluoroborate, diphenyliodonium hexafluorophosphonate, diphenyliodonium hexafluoroarsenate, diphenyliodonium trifluoromethanesulfonate, diphenyliodonium trifluoroacetate, diphenyliodonium p-toluenesulfonate, diphenyliodonium tetra(pentafluorophenyl)borate, 4-methoxyphenylphenyliodonium tetrafluoroborate, 4-methoxyphenylphenyliodonium hexafluorophosphonate, 4-methoxyphenylphenyliodonium hexafluoroarsenate, 4-methoxyphenylphenyliodonium trifluoromethanesulfonate, 4-methoxyphenylphenyliodonium trifluoroacetate and 4-methoxyphenylphenyliodonium p-toluenesulfonate.

The DAS can be sensitized by adding a photosensitizer, such as thioxanthone, phenothiazine, chlorothioxanthone, xanthone, anthracene, diphenylanthracene and rubrene.

Examples of the TAS include triphenylsulfonium tetrafluoroborate, triphenylsulfonium hexafluorophosphonate, triphenylsulfonium hexafluoroarsenate, triphenylsulfonium trifluoromethanesulfonate, triphenylsulfonium trifluoroacetate, triphenylsulfonium p-toluenesulfonate, triphenylsulfonium tetra(pentafluorophenyl)borate, 4-methoxyphenyldiphenylsulfonium tetrafluoroborate, 4-methoxyphenyldiphenylsulfonium hexafluorophosphonate, 4-methoxyphenyldiphenylsulfonium hexafluoroarsenate, 4-methoxyphenyldiphenylsulfonium trifluoromethanesulfonate, 4-methoxyphenyldiphenylsulfonium trifluoroacetate and 4-methoxyphenyldiphenylsulfonium p-toluenesulfonate.

Examples of a commercially available product of the cationic photopolymerization initiator include Cyracure UVI-6990, Cyracure UVI-6974 and Cyracure UVI-6992 (trade names, produced by Union Carbide Corp.), Adeka Optomer SP-150, SP-152, SP-170 and SP-172 (trade names, produced by Adeka Corp.), Rhodorsil Photoinitiator 2074 (a trade name, produced by Rhodia Japan, Inc.), Irgacure 250 (a trade name, produced by Ciba Specialty Chemicals, Inc.) and UV-9380C (a trade name, produced by GE Silicones).

5-2-4 Curing Agent and so Forth

In production of polymer constituting the composite material of the invention, one or plural suitable components, such as a curing agent, a catalyst, a stabilizer and so forth, may be added in addition to the monomer or the like and the polymerization initiator.

Examples of the curing agent used include a known latent curing agent, which has been generally used as a curing agent for an epoxy resin. Examples of the latent curing agent for an epoxy resin include an amine curing agent, a novolak resin curing agent, an imidazole curing agent and an acid anhydride curing agent. Examples of the amine curing agent include an aliphatic polyamine, such as diethylene triamine, triethylene tetramine, tetraethylene pentamine, m-xylene diamine, trimethylhexamethylene diamine, 2-methylpentamethylene diamine and diethylaminopropylamine, an alicyclic polyamine, such as isophorone diamine, 1,3-bisaminomethylcyclohexane, bis(4-aminocyclohexyl)methane, norbornene diamine, 1,2-diaminocyclohexane and Laromin, and an aromatic polyamine, such as diaminodiphenylmethane, diaminodiphenylethane and m-phenylenediamine.

Examples of the novolak resin curing agent include a phenol novolak resin and a bisphenol novolak resin. Examples of the imidazole curing agent include 2-methylimidazole, 2-ethylhexylimidazole, 2-phenylimidazole and 1-cyanoethyl-2-phenylimidazolyl trimellitate.

Examples of the acid anhydride curing agent include tetrahydrophthalic anhydride, hexahydrophthalic anhydride, methyltetrahydrophthalic anhydride, methylhexahydrophthalic anhydride, methylcyclohexenetetracarboxylic dianhydride, phthalic anhydride, trimellitic anhydride, pyromellitic anhydride and benzophenonetetracarboxylic dianhydride.

A curing accelerator may be used for accelerating curing reaction of a polymerizable compound having a glycidyl group, an epoxy group or an oxetanyl group with the curing agent. Examples of the curing accelerator include a tertiary amine compound, such as benzyldimethylamine, tris(dimethylaminomethyl)phenol and dimethylcyclohexylamine, an imidazole compound, such as 1-cyanoethyl-2-ethyl-4-methylimidazole and 2-ethyl-4-methylimidazole, an organic phosphorus compound, such as triphenylphosphine, a quaternary phosphonium salt compound, such as tetraphenylphosphonium bromide, a diazabicycloalkene compound, such as 1,8-diazabicyclo[5.4.0]undecene-7 and an organic acid salt thereof, a quaternary ammonium salt compound, such as tetraethylammonium bromide and tetrabutylammonium bromide, and a boron compound, such as boron trifluoride and triphenyl borate. The curing accelerator may be used solely or as a mixture of two or more of them.

A stabilizer is preferably added for preventing unnecessary polymerization, for example, during storage. As the stabilizer, any compound known in the art as a stabilizer may be used. Representative examples of the stabilizer include 4-ethoxyphenol, hydroquinone and butylated hydroxytoluene (BHT).

5-3 Contents of Liquid Crystal Material and so Forth

In the polymer-liquid crystal composite material of the invention, the content of the liquid crystal material is preferably from approximately 60% to approximately 99% by weight, more preferably approximately 60% to approximately 95% by weight, and particularly preferably from approximately 65% to approximately 95% by weight, based on the composite material. The content of the polymer is preferably from approximately 1% to approximately 40% by weight, more preferably from approximately 5% to approximately 40% by weight, and particularly preferably from approximately 5% to approximately 35% by weight, based on the composite material.

5-4 Other Additives

The polymer-liquid crystal composite material of the invention may contain, for example, a dichroic dye and a photochromic compound in such a range that does not impair the advantages of the invention.

EXAMPLES

The invention will be described in more detail with reference to examples below, but the invention is not construed as being limited to the examples. All occurrences of "%" are by weight unless otherwise indicated.

The resulting compounds are identified by magnetic nuclear resonance spectra obtained by $^1$H-NMR analysis, gas chromatograms obtained by gas chromatography (GC) analysis, and so forth, as described below.

$^1$H-NMR Analysis

DRX-500 (produced by Bruker Biospin Co., Ltd.) was used for measurement. A sample produced in the examples and so forth was dissolved in a deuterated solvent capable of dissolving the sample, such as $CDCl_3$, and the measurement was carried out at room temperature and 500 MHz with an accumulated number of 24. In the description of the resulting nuclear resonance spectra, s means a singlet, d means a doublet, t means a triplet, q means a quartet, and m means a multiplet. Tetramethylsilane (TMS) was used as a standard substance indicating zero point of chemical shift δ.

GC Analysis

Gas Chromatograph Model GC-14B made by Shimadzu was used for measurement. Capillary column CBP1-M25-025 (length: 25 m, bore: 0.22 mm, film thickness: 0.25 μm, dimethylpolysiloxane as stationary phase, no polarity) produced by Shimadzu Corp. was used as a column. Helium was used as a carrier gas and adjusted to a flow rate of 1 mL/min. The temperature of a sample vaporizing chamber was 280° C., and the temperature of the detector (FID) was 300° C.

The sample was dissolved in toluene to prepare a 1% by weight solution, and 1 μL of the resulting solution was injected into the sample vaporizing chamber.

Chromatopac Model C-R6A, produced by Shimadzu Corp., or an equivalent thereof was used as a recorder. The gas chromatogram obtained showed a retention time of a peak and a peak area corresponding to the component compound.

Solvents for diluting the sample may also be chloroform, hexane, and so forth. The following capillary columns may also be used: a capillary column DB-1, produced by Agilent Technologies Inc. (length: 30 m, bore: 0.32 mm, film thickness: 0.25 μm), a capillary column HP-1, produced by Agilent Technologies Inc. (length: 30 m, bore: 0.32 mm, film thickness: 0.25 μm), a capillary column Rtx-1, produced by Restek Corporation (length: 30 m, bore: 0.32 mm, film thickness: 0.25 μm), and a capillary column BP-1, produced by SGE International Pty. Ltd. (length: 30 m, bore: 0.32 mm, film thickness: 0.25 μm).

An area ratio of each peak in the gas chromatogram corresponds to a ratio of the component compound. In general, the percentages by weight of the component compounds of the analyzed sample are not completely identical to the percentages by area of the peaks of the analyzed sample. According to the invention, however, the percentages by weight of the component compounds of the analyzed sample substantially correspond to the percentages by area of the peaks of the analyzed sample because the correction coefficient is substantially 1 when the aforementioned columns are used in the invention. This is because there is no significant difference in correction efficient of component compounds. In order to obtain accurately compositional ratios of liquid crystal compounds in a liquid crystal composition, an internal reference method in gas chromatogram is used. The liquid crystal compound (sample to be measured) and a liquid crystal compound as a reference (reference substance), which have been weighed accurately to prescribed amounts, are simultaneously measured by gas chromatography, and a relative intensity of an area ratio of a peak of the sample to be measured and a peak of the reference substance is calculated in advance. The compositional ratios of the liquid crystal compounds in the liquid crystal composition can be accurately obtained from the gas chromatography by correcting by using the relative intensity of the peak areas of the component compounds with respect to the reference substance.

Sample of Liquid Crystal Compound for Measuring Characteristics

A sample of the liquid crystal compound for measuring characteristics includes two cases, i.e., the case where the compound itself is used as a sample, and the case where the compound is mixed with mother liquid crystals to prepare a sample.

In the latter case where a sample is prepared by mixing the compound with mother liquid crystals, the measurement is carried out in the following manner. A sample was produced by mixing 15% by weight of the compound and 85% by weight of mother liquid crystals. A value of characteristics of the compound was calculated by extrapolating from a value obtained by measurement.

Extrapolated Value=(100×(measured value of sample)−(percentage by weight of mother liquid crystals)×(value measured for mother liquid crystals))/(percentage by weight of liquid crystal compound)

In the case where a smectic phase or crystals were deposited at 25° C. at this ratio of the liquid crystal compound and the mother liquid crystals, the ratio of the compound and the mother liquid crystals was changed step by step in the order of (10% by weight/90% by weight), (5% by weight/95% by weight), (1% by weight/99% by weight), respectively. The value of characteristics of the sample was measured at a ratio where a smectic phase or crystals were not deposited at 25° C., and an extrapolated value was obtained by the aforementioned equation, which was designated as a value of characteristics of the liquid crystal compound.

While there are various kinds of mother liquid crystals for the aforementioned measurement, the composition of the mother liquid crystals A was as follows, for example.

Mother Liquid Crystals A

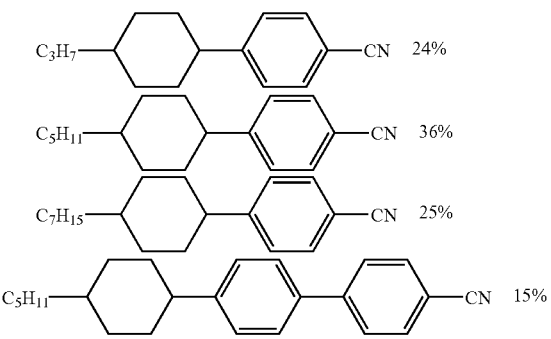

Measurement Method of Characteristics of Liquid Crystal Compound

Measurement of the characteristics was carried out according to the following methods. Most methods are described in the Standard of Electric Industries Association of Japan, EIAJ ED-2521 A or those with some modifications. A TFT was not attached to a TN device used for measurement.

Among the measured values, the values obtained with the liquid crystal compound itself as a sample were described as experimental data. In the case where the values were obtained with the mixture of the compound with the mother liquid crystals, the extrapolated values were described as experimental data.

Phase Structure and Phase Transition Temperature (° C.)

The measurement was carried out in the methods (1) and (2) below.

(1) A compound was placed on a hot plate (Hot Stage Model FP-52, produced by Mettler Co., Ltd.) in a melting point apparatus equipped with a polarizing microscope, and while heating at the rate of 3° C. per minute, the state of the phase and the changes thereof were observed with the polarizing microscope to determine the kind of the phase.

(2) A sample was heated and cooled at a rate of 3° C. per minute by using a scanning calorimeter, DSC-7 System or Diamond DSC System, produced by Perkin-Elmer, Inc., whereby a starting point of an endothermic peak or an exothermic peak associated with phase change of the sample was obtained by extrapolation (on set) to determine phase transition temperature.

In the following description, a crystal is denoted by "K". In the case where a crystal is distinguished into two crystals, they are denoted by "$K_1$" and "$K_2$", respectively. A smectic phase is denoted by "Sm", and a nematic phase is denoted by "N." A liquid (isotropic phase) is denoted by "I". In the case where a smectic phase is distinguished into a smectic B phase and a smectic A phase, they are denoted by "$Sm_B$" and "$Sm_A$", respectively. "BP" denotes a blue phase or an optically isotropic liquid crystal phase. A coexisting state of two phases may be denoted in the form of (N*+I) and (N*+BP). Specifically, (N*+I) denotes a phase having a non-liquid crystal isotropic phase and a chiral nematic phase coexisting, and (N*+BP) denotes a phase having a blue phase or an optically isotropic liquid crystal phase and a chiral nematic phase coexisting. "Un" denotes an unidentified phase that is not optically isotropic. The expression of the phase transition temperature, "K 50.0 N 100.0 I", for example, means that the transition temperature of from a crystal to a nematic phase (KN) is 50.0° C., and the transition temperature of from a nematic phase to a liquid (NI) is 100.0° C. The other expressions are applied with the same rule.

Maximum Temperature of Nematic Phase ($T_{NI}$; ° C.)

A sample (a mixture of a liquid crystal compound and the mother liquid crystals) was placed on a hot plate (Hot Stage Model FP-52, produced by Mettler Co., Ltd.) in a melting point apparatus equipped with a polarizing microscope, and while heating at the rate of 1° C. per minute, was observed with the polarizing microscope. A temperature where a part of the sample was changed from a nematic phase to an isotropic liquid was designated as a maximum temperature of a nematic phase. The maximum temperature of a nematic phase may be abbreviated to "a maximum temperature" in some cases.

Low Temperature Compatibility

Samples were prepared by mixing the mother liquid crystals and a liquid crystal compound to make a ratio of the liquid crystal compound of 20% by weight, 15% by weight, 10% by weight, 5% by weight, 3% by weight and 1% by weight, respectively, and then placed in glass bottles. The glass bottles were stored in a freezer at −10° C. or −20° C. for a prescribed period of time, and then were observed as to whether or not a crystal or a smectic phase was deposited.

Viscosity (η; measured at 20° C.; mPa·s)

A mixture of a liquid crystal compound and the mother liquid crystals was measured for viscosity by means of an E-type viscometer.

Refractive Index Anisotropy (Δn)

Measurement was carried out with an Abbe refractometer mounting a polarizing plate on an ocular using light having a wavelength of 589 nm at a temperature of 25° C. The surface of a main prism was rubbed in one direction, and then a sample (a liquid crystal composition or a mixture of a liquid crystal compound and the mother liquid crystals) was dropped on the main prism. A refractive index (n∥) was measured when the direction of polarized light was parallel to that of the rubbing. A refractive index (n⊥) was measured when the direction of polarized light was perpendicular to that of the rubbing. A value of refractive index anisotropy (Δn) was calculated from the equation: Δn=n∥−n⊥.

Dielectric Anisotropy (Δ∈; Measured at 25° C.)

A sample (a mixture of a liquid crystal compound and the mother liquid crystals) was put in a liquid crystal cell having a distance between two glass substrates (cell gap) of 9 μm and a twist angle of 80°. A voltage of 20 V was applied to the cell, and a dielectric constant (∈∥) in a major axis direction of a liquid crystal molecule was measured. A voltage of 0.5 V was applied to the cell, and a dielectric constant (∈⊥) in a minor axis direction of a liquid crystal molecule was measured. A value of a dielectric anisotropy was calculated from the equation: Δ∈=∈∥−∈⊥.

Pitch (P; Measured at 25° C.; nm)

The pitch length was measured by using selective reflection (see Liquid Crystal Handbook (Ekisho Binran), Maruzen, Inc. (2000)). The selective reflection wavelength λ satisfies the relational expression <n>p/λ=1, wherein <n> represents the average refractive index and is given by the expression $<n>=(n\|^2+n\perp^2)/2)^{1/2}$. The selective reflection wavelength was measured with a microscopic spectrophotometer MSV-350 (a trade name, produced by JEOL Ltd.). The pitch was obtained by dividing the resulting reflection wavelength by the average refractive index.

The pitch of a cholesteric liquid crystal having a reflection wavelength within a range longer than visible light is proportional to the reciprocal of the concentration of the chiral agent in a region where the concentration of the chiral agent is low. Accordingly, a pitch length of a liquid crystal having a selective reflection wavelength within the visible region was obtained at plural points, and the pitch was obtained by the linear extrapolation method.

Example 1

Synthesis of 1-chloro-6-(4-pentylphenyl)-2-(3,4,5-trifluorophenyl)naphthalene (S1-7)

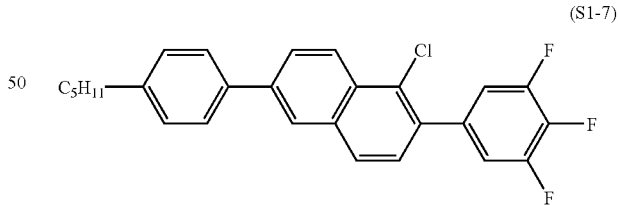

(S1-7)

K 116.5 (SmA 111.4)N 126.1 I (° C.)

The reaction scheme is shown below.

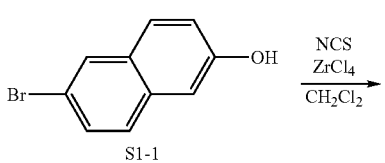

S1-1

-continued

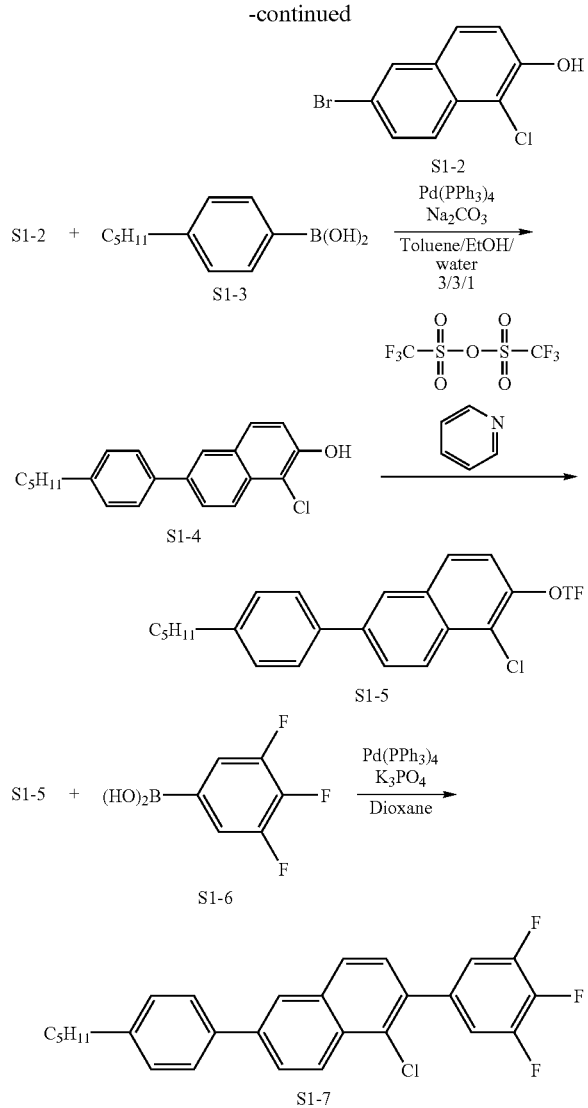

Synthesis of Compound (S1-2)

The compound (S1-2) was synthesized according to the method disclosed in Synlett., No. 18, 2837 (2005). 29.9 g of N-chlorosuccinic acid imide and 600 mL of dichloromethane were added to a reactor under a nitrogen atmosphere and cooled to 0° C., to which 2.6 g of zirconium(IV) chloride was added, and then 50 g of 6-bromo-2-naphthol (S-1) was added gradually. After heating to room temperature and stirred for 10 hours, the reaction mixture was washed with a saturated sodium bicarbonate aqueous solution and water and dried over magnesium sulfate, and the solvent was distilled off under reduced pressure. 55 g of 6-bromo-1-chloro-2-naphthol (S1-2) was obtained by recrystallization from a mixed solvent of toluene and heptane (1/1 by volume).

Synthesis of Compound (S1-4)

55 g of 6-bromo-1-chloro-2-naphthol (S1-2), 12.3 g of 4-pentylphenylboronic acid (S1-3), 1.0 g of tetrakistriphenylphosphine palladium, 13.6 g of sodium carbonate and 100 mL of a mixed solvent of toluene, ethanol and water (3/3/1) were added to a reactor under a nitrogen atmosphere and refluxed for 10 hours. The reaction mixture was cooled to room temperature, and toluene was added thereto. The reaction mixture was washed with 1N hydrochloric acid and water, and after drying over magnesium sulfate, the solvent was distilled off under reduced pressure. The resulting residue was purified by silica gel column chromatography with toluene as a developing solvent to provide 15 g of 6-(4-pentylphenyl)-1-chloro-2-naphthol (S1-4).

Synthesis of Compound (S1-5)

15 g of 6-(4-pentylphenyl)-1-chloro-2-naphthol (S1-4), 14 mL of pyridine and 200 mL of dichloromethane were added to a reactor under a nitrogen atmosphere and cooled to 0° C., to which 14.3 g of trifluoromethanesulfonic anhydride was added dropwise. The reaction mixture was stirred at the temperature unchanged for 4 hours, and then the reaction mixture was washed with sodium bicarbonate aqueous solution and water and dried over magnesium sulfate, followed by distilling off the solvent under reduced pressure. The resulting residue was purified by silica gel column chromatography with a mixed solvent of heptane and toluene (1/1) as a developing solvent to provide 13.3 g of the compound (S1-5).

Synthesis of Compound (S1-7)

5.0 g the compound (S1-5), 2.9 g of 3,4,5-trifluorophenylboronic acid (S1-6), 2.0 g of tetrakistriphenylphosphine palladium, 4.2 g of potassium phosphate ($K_3PO_4$) and 100 mL of dioxane were added to a reactor under a nitrogen atmosphere, and refluxed for 12 hours. Toluene was added to the reaction mixture, which was washed with 1N hydrochloric acid and water. The reaction mixture was dried over magnesium sulfate, and then the solvent was distilled off under reduced pressure. The resulting residue was purified by silica gel column chromatography with a mixed solvent of heptane and toluene (9/1) as a developing solvent and then recrystallized from a mixed solvent of ethanol and ethyl acetate (4/1), followed by drying under reduced pressure, to provide 1.8 g of 1-chloro-6-(4-pentylphenyl)-2-(3,4,5-trifluorophenyl)-naphthalene (S1-7).

The resulting compound (S1-7) had the following phase transition temperatures. Phase transition temperatures (° C.):

K 116.5 (SmA 111.4) N 126.1 I

The compound had the following chemical shift δ (ppm) on $^1$H-NMR and thus was identified as 1-chloro-6-(4-pentylphenyl)-2-(3,4,5-trifluorophenyl)naphthalene (S1-7). The measuring solvent was $CDCl_3$.

Chemical shift δ (ppm): 8.42 (d, 1H), 8.06 (d, 1H), 7.93-7.91 (dd, 1H), 7.85 (d, 1H), 7.66 (d, 2H), 7.38 (d, 1H), 7.33 (d, 2H), 7.17-7.14 (m, 2H), 2.68 (t, 2H), 1.69-1.66 (m, 2H), 1.38-1.35 (m, 4H), 0.92 (t, 3H)

Example 2

The four compounds shown as the mother liquid crystals were mixed to prepare the mother liquid crystals A having a nematic phase. The mother liquid crystals A had the following characteristics.

Maximum temperature ($T_{NI}$)=71.7° C.

Dielectric anisotropy (Δ∈)=11.0

Refractive index anisotropy (Δn)=0.137

Characteristics of Liquid Crystal Compound (S1-7)

A liquid crystal composition B containing 85% by weight of the mother liquid crystals and 15% by weight of 1-chloro-6-(4-pentylphenyl)-2-(3,4,5-trifluorophenyl)-naphthalene (S1-7) obtained in Example 1 was prepared. The resulting liquid crystal composition B was measured for characteristics, and the measured values were extrapolated to calculate the extrapolated values of the characteristics of the liquid crystal compound (S1-7). The values were as follows.

Maximum temperature ($T_{NI}$)=104.4° C.
Dielectric anisotropy ($\Delta\varepsilon$)=22.7
Refractive index anisotropy ($\Delta n$)=0.230

It was understood from the results that the liquid crystal compound (S1-7) had excellent compatibility with other liquid crystal compounds, a high maximum temperature ($T_{NI}$), a large dielectric anisotropy ($\Delta\varepsilon$) and a large refractive index anisotropy ($\Delta n$).

Example 3

Synthesis of 1-chloro-6-(4-propylphenyl)-2-(3,4,5-trifluorophenyl)naphthalene (S3)

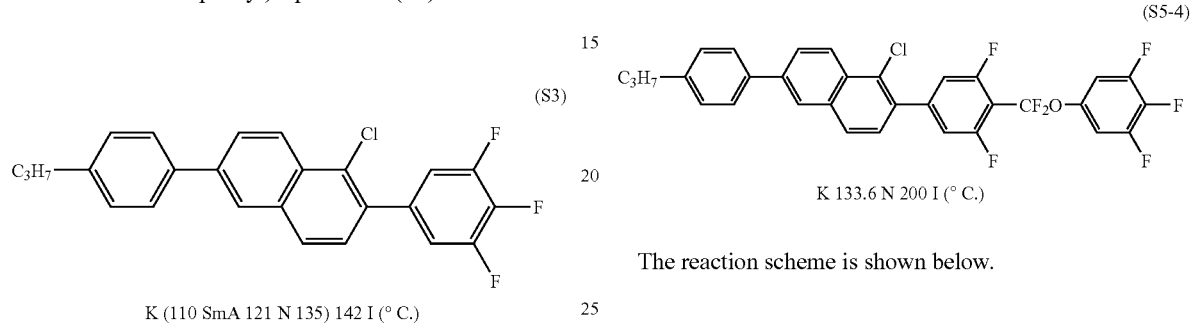

K (110 SmA 121 N 135) 142 I (° C.)

Synthesis of Compound (S3)

3.1 g of 1-chloro-6-(4-propylphenyl)-2-(3,4,5-trifluorophenyl)naphthalene (S3) was synthesized from 11.4 g of the compound (S1-2) in the similar synthesis method as in Example 1.

The resulting compound (S3) had the following phase transition temperatures.

Phase Transition Temperatures (° C.):
K (110 SmA 121 N 135) 142 I

The compound had the following chemical shift δ (ppm) on ¹H-NMR and thus was identified as 1-chloro-6-(4-propylphenyl)-2-(3,4,5-trifluorophenyl)naphthalene (S3). The measuring solvent was CDCl₃.

Chemical shift δ (ppm): 8.43 (d, 1H), 8.07 (d, 1H), 7.94-7.92 (dd, 1H), 7.86 (d, 1H), 7.67 (d, 2H), 7.39 (d, 1H), 7.33 (d, 2H), 7.18-7.15 (m, 2H), 2.67 (t, 2H), 1.74-1.69 (m, 2H), 1.00 (t, 3H)

Example 4

The four compounds shown as the mother liquid crystals were mixed to prepare the mother liquid crystals A having a nematic phase. The mother liquid crystals A had the following characteristics.

Maximum temperature ($T_{NI}$)=71.7° C.
Dielectric anisotropy ($\Delta\varepsilon$)=11.0
Refractive index anisotropy ($\Delta n$)=0.137

Characteristics of Liquid Crystal Compound (S3)

A liquid crystal composition C containing 85% by weight of the mother liquid crystals and 10% by weight of 1-chloro-6-(4-propylphenyl)-2-(3,4,5-trifluorophenyl)-naphthalene (S3) obtained in Example 3 was prepared. The resulting liquid crystal composition C was measured for characteristics, and the measured values were extrapolated to calculate the extrapolated values of the characteristics of the liquid crystal compound (S3). The values were as follows.

Maximum temperature ($T_{NI}$)=100.7° C.
Dielectric anisotropy ($\Delta\varepsilon$)=25.7
Refractive index anisotropy ($\Delta n$)=0.237

It was understood from the results that the liquid crystal compound (S3) had a high maximum temperature ($T_{NI}$), a large dielectric anisotropy ($\Delta\varepsilon$) and a large refractive index anisotropy ($\Delta n$).

Example 5

Synthesis of 1-chloro-6-(4-propylphenyl)-2-(4-difluoro-(3,4,5-trifluorophenoxy)methyl-3,5-difluorophenyl)-naphthalene (S5-4)

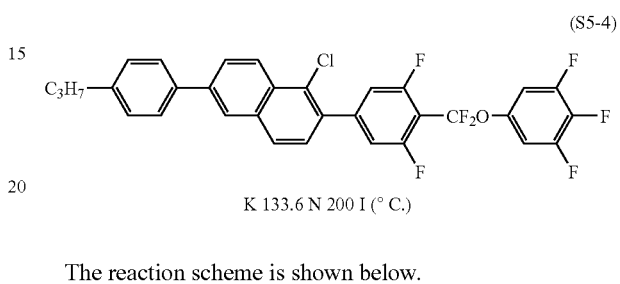

K 133.6 N 200 I (° C.)

The reaction scheme is shown below.

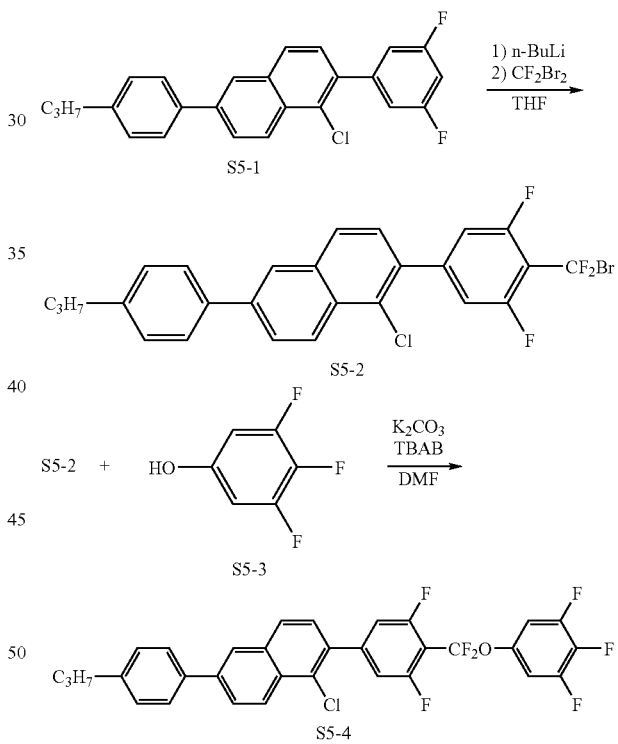

Synthesis of Compound (S5-1)

9.3 g of 1-chloro-6-(4-propylphenyl)-2-(3,5-difluorophenyl)naphthalene (S5-1) was synthesized from 26.5 g of the compound (S1-2) in the similar synthesis method as in Example 1.

Synthesis of Compound (S5-2)

9.3 g of the compound (S5-1) and 100 mL of THF were added to a reactor under a nitrogen atmosphere and cooled to −74° C. 18 mL of a 1.60 M n-hexane solution of n-butyl lithium was added dropwise thereto within a temperature range of from −74 to −60° C., followed by stirring for 60 minutes. Subsequently, a solution of 6.95 g of dibromodifluoromethane in 20.0 mL of THF was added dropwise thereto within a temperature range of from −75 to −70° C., followed by stirring for 60 minutes whole the temperature was being increased to 25° C. The resulting reaction mixture was poured into 150 mL of iced water and mixed therein. 100 mL of toluene was added thereto to separate into an organic layer and an aqueous layer, which were subjected to extraction. The resulting organic layer was collected and washed with a sodium chloride aqueous solution and then dried over anhydrous magnesium sulfate. The resulting solution was concentrated under reduced pressure, and the residue was purified by silica gel column chromatography with a mixed solvent of heptane and toluene (4/1) as a developing solvent. The solvent was distilled off, and the residue was dried to provide 10.4 g of 1-chloro-6-(4-propylphenyl)-2-(4-bromodifluoromethyl-3,5-difluorophenyl)naphthalene (S5-2).

Synthesis of Compound (S5-4)

2.7 g of the compound (S5-2), 0.8 g of 3,4,5-trifluorophenyl (S5-3), 3.5 g of potassium carbonate and 50 mL of N,N-dimethylformamide (DMF) were added to a reactor under a nitrogen atmosphere and stirred at 90° C. for 120 minutes. The reaction mixture cooled to 25° C. was poured into 50 mL of iced water and mixed therein. 100 mL of toluene was added thereto to separate into an organic layer and an aqueous layer, which were subjected to extraction. The resulting organic layer was collected and washed with a saturated sodium hydrogencarbonate aqueous solution, a 0.5 N sodium hydroxide aqueous solution and then a sodium chloride aqueous solution in this order, followed by drying over anhydrous magnesium sulfate. The resulting solution was concentrated under reduced pressure, and the residue was purified by silica gel column chromatography with a mixed solvent of heptane and ethyl acetate as a developing solvent and then recrystallized from a mixed solvent of heptane and Solmix A-11, followed by drying, to provide 1.8 g of 1-chloro-6-(4-propylphenyl)-2-(4-difluoro-(3,4,5-trifluorophenoxy)-methyl-3,5-difluorophenyl)naphthalene (S5-4).

The resulting compound (S5-4) had the following phase transition temperatures.

Phase Transition Temperatures (° C.):
K 133.6 N 200.0 I

The compound had the following chemical shift δ (ppm) on $^1$H-NMR and thus was identified as 1-chloro-6-(4-propylphenyl)-2-(4-difluoro-(3,4,5-trifluorophenoxy)methyl-3,5-difluorophenyl)naphthalene (S5-4). The measuring solvent was $CDCl_3$.

Chemical shift δ (ppm): 8.44 (d, 1H), 8.08 (d, 1H), 7.95-7.93 (dd, 1H), 7.89 (d, 1H), 7.67 (d, 2H), 7.39 (d, 1H), 7.33 (d, 2H), 7.20 (d, 2H), 7.04-7.01 (m, 2H), 2.67 (t, 2H), 1.73-1.69 (m, 2H), 1.00 (t, 3H)

Example 6

Characteristics of Liquid Crystal Compound (S5-4)

A liquid crystal composition D containing 85% by weight of the mother liquid crystals and 5% by weight of 1-chloro-6-(4-propylphenyl)-2-(4-difluoro-(3,4,5-trifluorophenoxy)methyl-3,5-difluorophenyl)-naphthalene (S5-4) obtained in Example 5 was prepared. The resulting liquid crystal composition D was measured for characteristics, and the measured values were extrapolated to calculate the extrapolated values of the characteristics of the liquid crystal compound (S5-4). The values were as follows.

Maximum temperature ($T_{NI}$)=133.7° C.
Dielectric anisotropy (Δ∈)=39.7
Refractive index anisotropy (Δn)=0.237

It was understood from the results that the liquid crystal compound (S5-4) had a high maximum temperature ($T_{NI}$), a large dielectric anisotropy (Δ∈) and a large refractive index anisotropy (Δn).

Example 7

Synthesis of 1-chloro-6-(1-pentynyl)-2-(4-difluoro-(3,4,5-trifluorophenoxy)methyl-3,5-difluorophenyl)-naphthalene (S7-8)

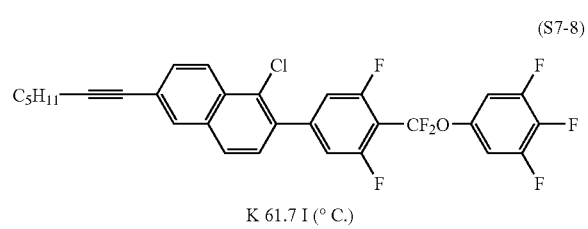

K 61.7 I (° C.)

The reaction scheme is shown below.

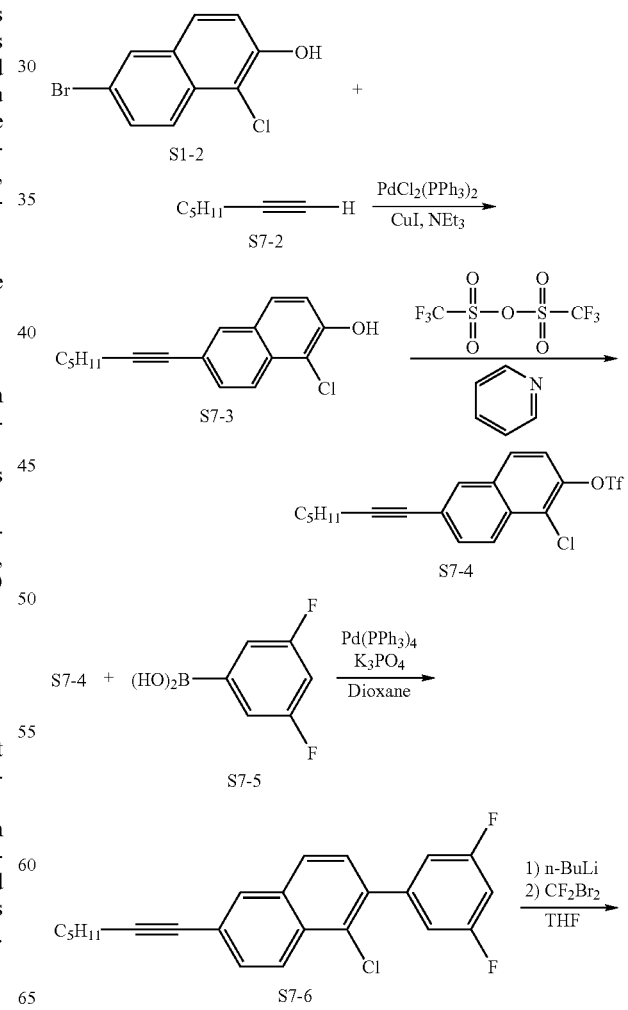

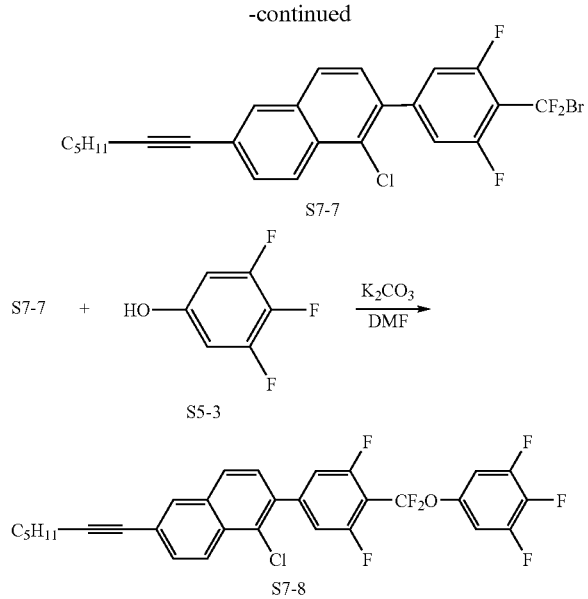

Synthesis of Compound (S7-3)

The compound (S7-3) was synthesized according to the method disclosed in Synthesis, No. 9, 1439 (2004). 38.3 g of 1-chloro-6-bromo-2-naphthol (S1-2), 5.2 g of $PdCl_2(PPh_3)_2$, 0.71 g of copper iodide and 400 mL of triethylamine were added to a reactor under a nitrogen atmosphere and stirred at room temperature, to which 35.8 g of 1-heptine (S7-2) was added, followed by refluxing for 6 hours. The reaction mixture was cooled to room temperature, and the solvent was distilled off under reduced pressure. Ethyl acetate was added to the resulting residue, and the mixture was filtered with Celite. The resulting solution was washed with 1N hydrochloric acid and water, and dried over anhydrous magnesium sulfate. The solvent was distilled off under reduced pressure, and the resulting residue was purified by silica gel column chromatography with a mixed solvent of heptane and ethyl acetate (3/1) as a developing solvent and dried under reduced pressure to provide 32.3 g of 1-chloro-6-(1-pentynyl)-2-naphthol (S7-3).

Synthesis of Compound (S7-6)

1.8 g of the compound (S7-6) was synthesized from 32.3 g of the compound (S7-3) according to the method for synthesizing the compound (S1-7) from the compound (S1-4) in Example 1.

Synthesis of Compound (S7-8)

0.4 g of the compound (S7-8) was synthesized from 1.7 g of the compound (S7-6) according to the method for synthesizing the compound (S5-4) from the compound (S5-1) in Example 5.

The resulting compound (S7-8) had the following phase transition temperatures.

Phase transition temperatures (° C.):
K 61.7 I

The compound had the following chemical shift δ (ppm) on $^1$H-NMR and thus was identified as 1-chloro-6-(1-pentynyl)-2-(4-difluoro(3,4,5-trifluorophenoxy)methyl-3,5-difluorophenyl)naphthalene (S7-8). The measuring solvent was $CDCl_3$.

Chemical shift δ (ppm): 8.29 (d, 1H), 7.94 (s, 1H), 7.77 (d, 1H), 7.65-7.62 (dd, 1H), 7.37 (d, 1H), 7.17 (d, 2H), 7.03-7.00 (m, 2H), 2.48 (t, 2H), 1.68-1.65 (m, 2H), 1.49-1.45 (m, 2H), 1.42-1.37 (m, 2H), 0.95 (t, 3H)

Example 8

Characteristics of Liquid Crystal Compound (S7-8)

A liquid crystal composition E containing 85% by weight of the mother liquid crystals and 15% by weight of 1-chloro-6-(1-pentynyl)-2-(4-difluoro-(3,4,5-trifluorophenoxy)methyl-3,5-difluorophenyl)-naphthalene (S7-8) obtained in Example 7 was prepared. The resulting liquid crystal composition E was measured for characteristics, and the measured values were extrapolated to calculate the extrapolated values of the characteristics of the liquid crystal compound (S7-8). The values were as follows.

Maximum temperature $(T_{NI})$=47.0° C.
Dielectric anisotropy (Δ∈)=34.7
Refractive index anisotropy (Δn)=0.20

It was understood from the results that the liquid crystal compound (S7-8) had good compatibility with other liquid crystal compounds, and has a large dielectric anisotropy (Δ∈) and a large refractive index anisotropy (Δn) although the compound has a low maximum temperature $(T_{NI})$.

TABLE 1

| 表1. 記号を用いた化合物の表記方法 | |
|---|---|
| Method of Description of Compounds using Symbols | |
| 1) 左末端基 R— | 記号 |
| 1) Left Terminal Group R— | Symbol |
| $C_nH_{2n+1}O$— | nO— |
| $C_nH_{2n+1}OC_mH_{2m}$— | nOm- |
| $CH_2$=CH— | V— |
| $CH_2$=CH$C_nH_{2n}$— | Vn- |
| $C_nH_{2n+1}$CH=CH— | nV— |
| $C_nH_{2n+1}$CH=CH$C_mH_{2m}$— | nVm- |
| $CF_2$=CH— | VFF— |
| $CF_2$=CH$C_nH_{2n}$— | VFFn- |
| $C_nH_{2n+1}$C≡C— | nT- |

TABLE 1-continued
Method of Description of Compounds using Symbols
| 2) Ring Structure —A$_n$— | Symbol |
|---|---|
|  | B |
| 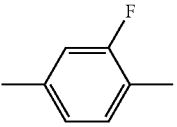 | B(F) |
| 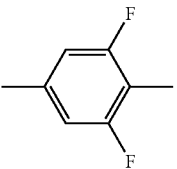 | B(F, F) |
| 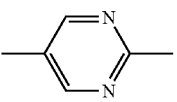 | Py |
|  | H |
| 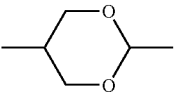 | G |
| 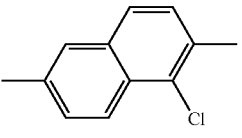 | Np(Cl) |
| 3) Bonding Group —Z$_n$— | Symbol |
|---|---|
| —C$_4$H$_8$— | 4 |
| —CH=CH— | V |
| —CF$_2$O— | X |
| —COO— | E |
| —C≡C— | T |
| 4) Right Terminal Group —X | Symbol |
|---|---|
| —OC$_n$H$_{2n+1}$ | —On |
| —CH=CH$_2$ | —V |
| —CH=CHC$_n$H$_{2n+1}$ | —Vn |
| —C$_n$H$_{2n}$CH=CH$_2$ | -nV |
| —C$_n$H$_{2n}$CH=CHC$_m$H$_{2m+1}$ | -nVm |
| —CH=CF$_2$ | —VFF |
| —COOCH$_3$ | -EMe |
| —F | —F |
| —Cl | —CL |
| —CN | —C |
| —OCF$_2$H | —OCF2H |
| —OCF$_3$ | —OCF3 |
| —CF$_3$ | —CF3 |

TABLE 1-continued

Method of Description of Compounds using Symbols

5) Example of Description

Example 1                        (F,F)—F

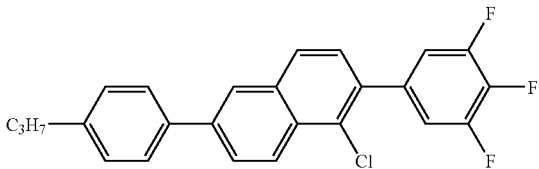

Example 2                      5-HBB(F)B-3

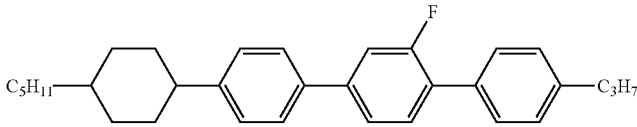

Example                      3-HH-V

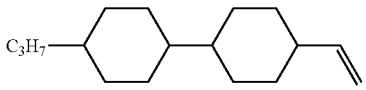

Representative examples of the composition of the invention are shown in Examples 9 to 30. The compositions as the components of the composition and the amounts (% by weight) thereof are firstly shown. The compounds are described with symbols for the left terminal group, the bonding group, the ring structure and the right terminal group according to the rule shown in Table 1. The steric configuration of 1,4-cyclohexylene and 1,3-dioxan-2,5-diyl is trans. No symbol indicated for the terminal group means that the terminal group is hydrogen. The characteristic values of the composition are then shown. The characteristic values herein are the measured values themselves.

Measurement of the characteristics was carried out according to the following methods. Most methods are described in the Standard of Electric Industries Association of Japan, EIAJ ED-2521A or those with some modifications. A TFT was not attached to a TN device used for measurement.

Maximum Temperature of Nematic Phase (NI; ° C.)

A sample was placed on a hot plate in a melting point apparatus equipped with a polarizing microscope, and while heating at the rate of 1° C. per minute. A temperature where a part of the sample was changed from a nematic phase to an isotropic liquid was designated as a maximum temperature of a nematic phase. The maximum temperature of a nematic phase may be abbreviated to "a maximum temperature" in some cases.

Minimum Temperature of Nematic Phase ($T_C$; ° C.)

A sample having a nematic phase was kept in a freezer at temperatures of 0° C., −10° C., −20° C., −30° C., and −40° C. for ten days, respectively, and a liquid crystal phase was observed. For example, when the sample remained in a nematic phase at −20° C. and changed to crystals (or a smectic phase) at −30° C., $T_C$ was expressed as ≦−20° C. The lower limit of a temperature range of a nematic phase may be abbreviated to "a minimum temperature" in some cases.

Viscosity (η; Measured at 20° C.; mPa·s)

The viscosity was measured by means of an E-type viscometer.

Rotation Viscosity (γ1; measured at 25° C.; mPa·s)

(1) Sample having Positive Dielectric Anisotropy

The rotation viscosity was measured according to the method disclosed in M. Imai, et al., Molecular Crystals and Liquid Crystals, vol. 259, p. 37 (1995). A sample was placed in a device having a twist angle of 0° and a cell gap between two glass plates of 5 μm. The TN device was applied with a voltage in a range of from 16 V to 19.5 V stepwise by 0.5 V. After a period of 0.2 second with no application of voltage, voltage application was repeated with only one rectangular wave (rectangular pulse of 0.2 second) and application of no voltage (2 seconds). A peak current and a peak time of a transient current generated by the voltage application were measured. The rotation viscosity was obtained from the measured values and the calculating equation (8) in the literature by M. Imai, et al., p. 40. As the dielectric anisotropy necessary for the calculation, the value was obtained by the measuring method of dielectric anisotropy described below with the device used in the measurement of the rotation viscosity.

(2) Sample Having Negative Dielectric Anisotropy

The rotation viscosity was measured according to the method disclosed in M. Imai, et al., Molecular Crystals and Liquid Crystals, vol. 259, p. 37 (1995). A sample was placed in a VA device having a cell gap between two glass plates of 20 μm. The VA device was applied with a voltage in a range of from 30 V to 50 V stepwise by 1 V. After a period of 0.2 second with no application of voltage, voltage application was repeated with only one rectangular wave (rectangular pulse of 0.2 second) and application of no voltage (2 seconds). A peak current and a peak time of a transient current generated by the voltage application were measured. The rotation viscosity was obtained from the measured values and the calculating equation (8) in the literature by M. Imai, et al., p. 40. As the dielectric anisotropy necessary for the calculation, the value measured by the measuring method of dielectric anisotropy described below was used.

Refractive Index Anisotropy (Δn; measured at 25° C.)

Measurement was carried out with an Abbe refractometer mounting a polarizing plate on an ocular using light having a wavelength of 589 nm. The surface of a main prism was rubbed in one direction, and then a sample was dropped on the main prism. A refractive index (n∥) was measured when the direction of polarized light was parallel to that of the rubbing. A refractive index (n⊥) was measured when the direction of polarized light was perpendicular to that of the rubbing. A value of refractive index anisotropy (Δn) was calculated from the equation; (Δn)=(n∥)−(n⊥). In the case where the sample was a composition, the refractive index anisotropy was measured by this method. In the case where the sample was a compound, the refractive index anisotropy was measured after mixing the compound with a suitable liquid crystal composition. The refractive index anisotropy of the compound was an extrapolated value.

Dielectric Anisotropy (Δ∈; Measured at 25° C.)

In the case where the sample was a compound, the dielectric anisotropy was measured after mixing the compound with a suitable liquid crystal composition. The dielectric anisotropy of the compound was an extrapolated value.

(1) Liquid Crystal Composition Having Positive Dielectric Anisotropy

A sample was put in a liquid crystal cell having a distance between two glass substrates of about 9 μm and a twist angle of 80°. The cell was applied with a voltage of 20 V to measure a dielectric constant (∈∥) in the major axis direction of the liquid crystal molecule. The cell was applied with a voltage of 0.5 to measure a dielectric constant (∈⊥) in the minor axis direction of the liquid crystal molecule. The dielectric anisotropy was calculated from the equation; (Δ∈)=(∈∥)−(∈⊥).

(2) Liquid Crystal Composition Having Negative Dielectric Anisotropy

A sample was put in a liquid crystal cell having been treated to have homeotropic orientation, which was then applied with a voltage of 0.5 V to measure a dielectric constant (∈∥). A sample was put in a liquid crystal cell having been treated to have homogeneous orientation, which was then applied with a voltage of 0.5 V to measure a dielectric constant (∈⊥). The dielectric anisotropy was calculated from the equation; (Δ∈)= (∈∥)−(∈⊥).

Threshold Voltage (Vth; measured at 25° C.; V)

In the case where the sample was a compound, the threshold voltage was measured after mixing the compound with a suitable liquid crystal composition. The threshold voltage of the compound was an extrapolated value.

(1) Liquid Crystal Composition Having Positive Dielectric Anisotropy

A sample was put in a liquid crystal display device of a normally white mode having a distance between two glass substrates of (0.5/Δn) μm and a twist angle of 80°. The value of Δn was the refractive index anisotropy measured above. Rectangular waves having a frequency of 32 Hz were applied to the device. The voltage of the rectangular waves was increased, and the voltage was measured when the transmittance of light passing through the device was 90%.

(2) Liquid Crystal Composition Having Negative Dielectric Anisotropy

A sample was put in a liquid crystal display device of a normally black mode having a distance between two glass substrates of about 9 μm and having been treated to have homeotropic orientation. Rectangular waves having a frequency of 32 Hz were applied to the device. The voltage of the rectangular waves was increased, and the voltage was measured when the transmittance of light passing through the device was 10%.

Voltage Holding Ratio (VHR; Measured at 25° C.; %)

A TN device used for measurement had a polyimide orientation film and the cell gap between two glass substrates was 6 μm. A sample was put into the device, and then the device was sealed with an adhesive, which was polymerized by the irradiation of an ultraviolet ray. The TN device was applied and charged with a pulse voltage (60 microseconds at 5 V). Decreasing voltage was measured for 16.7 milliseconds with High Speed Voltmeter and an area A between the voltage curve and the horizontal axis in a unit cycle was obtained. An area B was an area without decreasing. The voltage holding ratio was a percentage of the area A to the area B.

Helical Pitch (Measured at 20° C.; μm)

A Cano wedge cell method was used for measuring a helical pitch. A sample was put in a Cano wedge cell, and the distance (a; unit: μm) of disclination lines observed from the cell was measured. The helical pitch (P) was calculated from the equation; P=2·a·tan θ. The value θ was an angle between two glass plates in the wedge cell.

The ratios (percentages) of the components or the liquid crystal compounds are percentages by mass based on the total mass of the liquid crystal compounds. The liquid crystal composition is prepared by measuring the mass of the components, such as the liquid crystal compounds, and then mixing them. Accordingly, the percentages by mass of the components can be easily calculated.

Example 9

| | |
|---|---|
| 3-BNp(Cl)B(F,F)—F | 5% |
| 5-BNp(Cl)B(F,F)—F | 5% |
| 2-BEB(F)—C | 5% |
| 3-BEB(F)—C | 4% |
| 4-BEB(F)—C | 8% |
| 1V2-BEB(F,F)—C | 12% |
| 3-HB—O2 | 10% |
| 3-HH-4 | 3% |
| 3-HHB—F | 3% |
| 3-HHB-1 | 7% |
| 3-HHB—O1 | 4% |
| 3-HBEB—F | 3% |
| 3-HHEB—F | 7% |
| 5-HHEB—F | 7% |
| 3-H2BTB-2 | 4% |
| 3-H2BTB-3 | 4% |
| 3-H2BTB-4 | 4% |
| 3-HB(F)TB-2 | 5% |

NI = 96.0° C.; Δn = 0.152; η (20° C.) = 46.0 mPa · s; Δε = 26.1; Vth = 1.14 V

Example 10

| | |
|---|---|
| 5T-Np(Cl)B(F,F)B(F,F)—F | 6% |
| 3-BNp(Cl)B(F,F)XB(F,F)—F | 3% |
| 2-HB—C | 5% |
| 3-HB—C | 9% |
| 3-HB—O2 | 15% |
| 2-BTB-1 | 3% |
| 3-HHB—F | 4% |
| 3-HHB-1 | 8% |
| 3-HHB—O1 | 5% |

-continued

| | |
|---|---|
| 3-HHB-3 | 8% |
| 3-HHEB—F | 4% |
| 5-HHEB—F | 4% |
| 2-HHB(F)—F | 7% |
| 3-HHB(F)—F | 7% |
| 5-HHB(F)—F | 7% |
| 3-HHB(F,F)—F | 5% |

NI = 97.3° C.; Δn = 0.109; η (20° C.) = 26.5 mPa · s; Δε = 7.4; Vth = 2.08 V

Example 11

| | |
|---|---|
| 3-Np(Cl)B(F,F)B(F,F)—F | 5% |
| 3-Np(Cl)B(F,F)XB(F,F)—CL | 3% |
| 3-BEB(F)—C | 8% |
| 3-HB—C | 8% |
| V—HB—C | 8% |
| 1V—HB—C | 8% |
| 3-HB—O2 | 3% |
| 3-HH—2V | 13% |
| 3-HH—2V1 | 7% |
| V2-HHB-1 | 8% |
| 3-HHB-1 | 5% |
| 3-HHEB—F | 7% |
| 3-H2BTB-2 | 6% |
| 3-H2BTB-3 | 6% |
| 3-H2BTB-4 | 5% |

Example 12

| | |
|---|---|
| 3-Np(Cl)B(F,F)EB(F,F)—F | 6% |
| 5-PyNp(Cl)B(F,F)—F | 5% |
| 5-BEB(F)—C | 5% |
| V—HB—C | 11% |
| 5-PyB—C | 6% |
| 4-BB-3 | 11% |
| 3-HH—2V | 10% |
| 5-HH—V | 11% |
| V—HHB-1 | 7% |
| V2-HHB-1 | 9% |
| 3-HHB-1 | 9% |
| 1V2-HBB-2 | 5% |
| 3-HHEBH-3 | 5% |

Example 13

| | |
|---|---|
| 3T-Np(Cl)B(F,F)XB(F)B(F,F)—F | 4% |
| 3T-Np(Cl)B(F,F)—CF3 | 4% |
| V2-Np(Cl)B(F,F)XB(F,F)—CF3 | 4% |
| 1V2-BEB(F,F)—C | 6% |
| 3-HB—C | 18% |
| 2-BTB-1 | 10% |
| 5-HH—VFF | 18% |
| 3-HHB-1 | 4% |
| VFF—HHB-1 | 8% |
| VFF2-HHB-1 | 11% |
| 3-H2BTB-2 | 5% |
| 3-H2BTB-3 | 4% |
| 3-H2BTB-4 | 4% |

Example 14

| | |
|---|---|
| 3-BNp(Cl)B(F,F)—F | 6% |
| 5-BNp(Cl)B(F,F)—F | 6% |
| 5-HB—CL | 16% |
| 3-HH-4 | 12% |
| 3-HH-5 | 4% |
| 3-HHB—F | 4% |
| 3-HHB—CL | 3% |
| 4-HHB—CL | 4% |
| 3-HHB(F)—F | 6% |
| 4-HHB(F)—F | 6% |
| 5-HHB(F)—F | 6% |
| 7-HHB(F)—F | 6% |
| 5-HBB(F)—F | 4% |
| 1O1-HBBH-5 | 3% |
| 3-HHBB(F,F)—F | 2% |
| 4-HHBB(F,F)—F | 3% |
| 5-HHBB(F,F)—F | 3% |
| 3-HH2BB(F,F)—F | 3% |
| 4-HH2BB(F,F)—F | 3% |

NI = 114.6° C.; Δn = 0.109; η (20° C.) = 30.4 mPa · s; Δε = 5.9; Vth = 1.98 V

Upon mixing 100 parts of the composition and 0.25 part of the chiral agent (Op-5), the pitch was 60.5 μm.

Example 15

| | |
|---|---|
| 5T-Np(Cl)B(F,F)B(F,F)—F | 4% |
| 3T-Np(Cl)B(F,F)XB(F)B(F,F)—F | 3% |
| 3T-Np(Cl)B(F,F)—CF3 | 3% |
| 3-HHB(F,F)—F | 9% |
| 3-H2HB(F,F)—F | 8% |
| 4-H2HB(F,F)—F | 8% |
| 5-H2HB(F,F)—F | 8% |
| 3-HBB(F,F)—F | 21% |
| 5-HBB(F,F)—F | 10% |
| 3-H2BB(F,F)—F | 10% |
| 5-HHBB(F,F)—F | 3% |
| 5-HHEBB—F | 3% |
| 3-HH2BB(F,F)—F | 2% |
| 1O1-HBBH-4 | 4% |
| 1O1-HBBH-5 | 4% |

Example 16

| | |
|---|---|
| 3-BNp(Cl)B(F,F)XB(F,F)—F | 4% |
| 3-Np(Cl)B(F,F)XB(F,F)—CL | 3% |
| 5-HB—F | 12% |
| 6-HB—F | 9% |
| 7-HB—F | 7% |
| 2-HHB—OCF3 | 7% |
| 3-HHB—OCF3 | 7% |
| 4-HHB—OCF3 | 7% |
| 5-HHB—OCF3 | 5% |
| 3-HH2B—OCF3 | 4% |
| 5-HH2B—OCF3 | 4% |
| 3-HHB(F,F)—OCF2H | 4% |
| 3-HHB(F,F)—OCF3 | 5% |
| 3-HH2B(F)—F | 3% |
| 3-HBB(F)—F | 7% |
| 5-HBB(F)—F | 6% |
| 5-HBBH-3 | 3% |
| 3-HB(F)BH-3 | 3% |

Example 17

| | |
|---|---|
| 3-BNp(Cl)B(F,F)—F | 7% |
| 3-NP(Cl)B(F,F)B(F,F)—F | 3% |
| 5-HB—CL | 11% |
| 3-HH-4 | 8% |
| 3-HHB-1 | 5% |
| 3-HHB(F,F)—F | 8% |
| 3-HBB(F,F)—F | 15% |
| 5-HBB(F,F)—F | 10% |
| 3-HHEB(F,F)—F | 10% |
| 4-HHEB(F,F)—F | 3% |
| 5-HHEB(F,F)—F | 3% |
| 2-HBEB(F,F)—F | 3% |
| 3-HBEB(F,F)—F | 5% |
| 5-HBEB(F,F)—F | 3% |
| 3-HHBB(F,F)—F | 6% |

Example 18

| | |
|---|---|
| 3-Np(Cl)B(F,F)EB(F,F)—F | 4% |
| V2-Np(Cl)B(F,F)XB(F,F)—CF3 | 4% |
| 3-HB—CL | 6% |
| 5-HB—CL | 4% |
| 3-HHB—OCF3 | 5% |
| 3-H2HB—OCF3 | 5% |
| 5-H4HB—OCF3 | 7% |
| V—HHB(F)—F | 5% |
| 3-HHB(F)—F | 5% |
| 5-HHB(F)—F | 5% |
| 3-H4HB(F,F)—CF3 | 8% |
| 5-H4HB(F,F)—CF3 | 10% |
| 5-H2HB(F,F)—F | 5% |
| 5-H4HB(F,F)—F | 7% |
| 2-H2BB(F)—F | 5% |
| 3-H2BB(F)—F | 10% |
| 3-HBEB(F,F)—F | 5% |

Example 19

| | |
|---|---|
| 5-PyNp(Cl)B(F,F)—F | 4% |
| 3T-Np(Cl)B(F,F)—CF3 | 3% |
| 5-HB—CL | 10% |
| 7-HB(F,F)—F | 3% |
| 3-HH-4 | 10% |
| 3-HH-5 | 5% |
| 3-HB—O2 | 15% |
| 3-HHB-1 | 8% |
| 3-HHB—O1 | 5% |
| 2-HHB(F)—F | 7% |
| 3-HHB(F)—F | 7% |
| 5-HHB(F)—F | 7% |
| 3-HHB(F,F)—F | 6% |
| 3-H2HB(F,F)—F | 5% |
| 4-H2HB(F,F)—F | 5% |

Example 20

| | |
|---|---|
| 3-Np(Cl)B(F,F)B(F,F)—F | 3% |
| 3-Np(Cl)B(F,F)EB(F,F)—F | 3% |
| 5-HB—CL | 3% |
| 7-HB(F)—F | 7% |
| 3-HH-4 | 9% |
| 3-HH-EMe | 17% |
| 3-HHEB—F | 8% |
| 5-HHEB—F | 8% |
| 3-HHEB(F,F)—F | 10% |
| 4-HHEB(F,F)—F | 5% |
| 4-HGB(F,F)—F | 5% |
| 5-HGB(F,F)—F | 6% |
| 2-H2GB(F,F)—F | 4% |
| 3-H2GB(F,F)—F | 5% |
| 5-GHB(F,F)—F | 7% |

Example 21

| | |
|---|---|
| 3-BNp(Cl)B(F,F)XB(F,F)—F | 3% |
| 3T-Np(Cl)B(F,F)XB(F)B(F,F)—F | 3% |
| 3-HH-4 | 8% |
| 3-HHB-1 | 6% |
| 3-HHB(F,F)—F | 10% |
| 3-H2HB(F,F)—F | 9% |
| 3-HBB(F,F)—F | 15% |
| 3-BB(F,F)XB(F,F)—F | 29% |
| 1O1-HBBH-5 | 7% |
| 2-HHBB(F,F)—F | 3% |
| 3-HHBB(F,F)—F | 3% |
| 3-HH2BB(F,F)—F | 4% |

Example 22

| | |
|---|---|
| 5-BNp(Cl)B(F,F)—F | 4% |
| 5-PyNp(Cl)B(F,F)—F | 4% |
| 5-HB—CL | 13% |
| 3-HB—O2 | 10% |
| 3-PyB(F)—F | 10% |
| 5-PyB(F)—F | 10% |
| 3-HBB(F,F)—F | 7% |
| 3-PyBB—F | 8% |
| 4-PyBB—F | 7% |
| 5-PyBB—F | 7% |
| 5-HBB(F)B-2 | 10% |
| 5-HBB(F)B-3 | 10% |

Example 23

| | |
|---|---|
| 3-BNp(Cl)B(F,F)—F | 6% |
| 5-BNp(Cl)B(F,F)—F | 5% |
| 3-HH—V | 36% |
| 3-HH—V1 | 11% |
| V—HHB-1 | 11% |
| V2-HHB-1 | 3% |
| 2-BB(F)B-3 | 8% |
| 2-BB(F)B-3 | 4% |
| 3-BB(F,F)XB(F,F)—F | 16% |

NI = 76.1° C.; Δn = 0.114; η (20° C.) = 16.0 mPa · s; Δε = 4.5; Vth = 1.97 V

Example 24

| | |
|---|---|
| 5T-Np(Cl)B(F,F)B(F,F)—F | 5% |
| 3-Np(Cl)B(F,F)XB(F,F)—CL | 3% |
| 3-HH—V | 49% |
| V2-BB-1 | 6% |
| 3-HHB-1 | 5% |
| 1-BB(F)B—2V | 5% |
| 2-BB(F)B—2V | 5% |
| 3-HHXB(F)—OCF3 | 6% |
| 3-HGB(F,F)—F | 4% |
| 5-GHB(F,F)—F | 4% |
| 4-BB(F)B(F,F)XB(F,F)—F | 5% |
| 1O1-HBBH-5 | 3% |

Example 25

| | |
|---|---|
| 3-BNp(Cl)B(F,F)—F | 8% |
| 3T-Np(Cl)B(F,F)XB(F)B(F,F)—F | 7% |
| 3-HH—V | 35% |
| 3-HH—V1 | 11% |
| V—HHB-1 | 12% |
| 1-BB(F)B—2V | 6% |
| 2-BB(F)B—2V | 4% |
| 3-HBB(F,F)—F | 5% |
| 3-BB(F)B(F,F)—F | 7% |
| 3-BB(F,F)XB(F)—OCF3 | 5% |

Example 26

| | |
|---|---|
| 3T-Np(Cl)B(F,F)—CF3 | 4% |
| V2-Np(Cl)B(F,F)XB(F,F)—CF3 | 3% |
| 3-HH—V | 40% |
| 3-HH—V1 | 11% |
| V—HHB-1 | 13% |
| V2-HHB-1 | 5% |
| 3-BB(F,F)XB(F,F)—F | 10% |
| 3-HHEB(F,F)—F | 7% |
| 3-HBEB(F,F)—F | 3% |
| 4-BB(F)B(F,F)XB(F,F)—F | 4% |

Example 27

| | |
|---|---|
| 3-Np(Cl)B(F,F)EB(F,F)—F | 3% |
| 5-Np(Cl)B(F,F)XB(F,F)—F | 9% |
| 2-HH-3 | 5% |
| 3-HH-4 | 10% |
| 3-HH—V | 25% |
| V2-BB-1 | 7% |
| V—HHB-1 | 7% |
| 1V—HBB-2 | 3% |
| 3-BB(F)B-5 | 7% |
| 3-HB—CL | 6% |
| 3-HHB—CL | 4% |
| 3-HHXB(F,F)—F | 4% |
| 3-BB(F,F)XB(F,F)—F | 10% |

Example 28

| | |
|---|---|
| 5T-Np(Cl)B(F,F)B(F,F)—F | 5% |
| 3-Np(Cl)B(F,F)B(F,F)—F | 5% |
| 3-HH—VFF | 15% |
| 3-HH—V | 30% |
| 5-HH—V | 10% |
| V2-BB-1 | 5% |
| 3-HBB-2 | 3% |
| 1-BB(F)B—2V | 7% |
| 3-HHB(F,F)—F | 4% |
| 3-HHB(F)B(F,F)—F | 3% |
| 3-HBB(F,F)XB(F,F)—F | 7% |
| 3-HB(F)B(F,F)XB(F,F)—F | 6% |

Example 29

| | |
|---|---|
| 3-BNp(Cl)B(F,F)XB(F,F)—F | 3% |
| 3-Np(Cl)B(F,F)XB(F,F)—CL | 3% |
| 3-HH—V | 35% |
| 3-HH—V1 | 8% |
| 2-BB(F)B-3 | 6% |
| V2-BB(F)B-1 | 5% |
| V2-BB(F)B-2 | 5% |
| V2-BB(F)B-3 | 6% |
| 1V2-BB—F | 3% |
| 1V2-BB—CL | 3% |
| 3-HBB—F | 5% |
| 3-BB(F,F)XB(F,F)—F | 10% |
| 5-HHBB(F,F)—F | 3% |
| 3-BB(F,F)XB(F)—F | 5% |

Example 30

| | |
|---|---|
| 3-Np(Cl)B(F,F)XB(F,F)—F | 8% |
| 5-Np(Cl)B(F,F)XB(F,F)—F | 7% |
| 3-HH—V | 45% |
| 3-HH—V1 | 8% |
| 7-HB-1 | 3% |
| 3-HB—O2 | 4% |
| 1V2-BB-1 | 6% |
| 3-BB(F)B—2V | 4% |
| 3-PyBB—F | 5% |
| 4-PyBB—F | 5% |
| 5-PyBB—F | 5% |

What is claimed is:

1. A compound represented by formula (1):

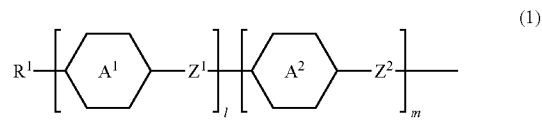

-continued

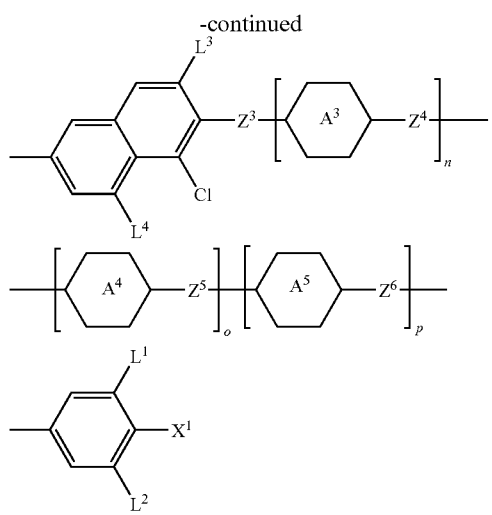

wherein R¹ is hydrogen or alkyl having 1 to 20 carbons, in which in the alkyl, arbitrary —CH₂— may be replaced by —O—, —S—, —COO—, —CH=CH— or —C≡C—, and arbitrary hydrogen may be replaced by halogen or alkyl having 1 to 3 carbons; ring A¹, ring A², ring A³, ring A⁴ and ring A⁵ are each independently a benzene ring, a piperidine ring, a tetrahydropyrane ring or a dioxane ring, in which in the rings, arbitrary hydrogen may be replaced by halogen, alkyl having 1 to 3 carbons, alkoxy having 1 to 3 carbons or halogenated alkyl having 1 to 3 carbons, and —CH= may be replaced by —N=; Z¹, Z², Z⁴, Z⁵ and Z⁶ are each independently a single bond, —COO— or —CF₂O— and at least one of Z¹, Z², Z³, Z⁴, Z⁵ and Z⁶ is —CF₂O—; Z³ is a single bond or —CF₂O—, and in the case where Z³ is a single bond, ring A³ is a ring represented by formula (RG-5), or L¹ and L² are both fluorine, or at least one of Z¹, Z², Z⁴, Z⁵ and Z⁶ is —CF₂O—; L¹, L², L³ and L⁴ are each independently hydrogen or halogen; X¹ is hydrogen, halogen, —C≡N, —N=C=S, —C≡C—C≡N, —SF₅ or alkyl having 1 to 10 carbons, in which in the alkyl, arbitrary —CH₂— may be replaced by —O—, —S—, —CH=CH— or —C≡C—, and arbitrary hydrogen may be replaced by halogen; and l, m, n, o and p are each independently 0 or 1, provided that l+m+n+o+p≦4:

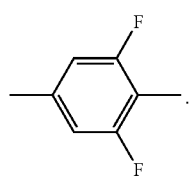

(RG-5)

2. The compound according to claim 1, wherein in formula (1), R¹ is alkyl having 1 to 20 carbons, alkenyl having 2 to 21 carbons, difluoroalkenyl having 2 to 21 carbons, alkynyl having 2 to 21 carbons, alkoxy having 1 to 19 carbons, alkenyloxy having 2 to 20 carbons, alkylthio having 1 to 19 carbons or alkenylthio having 2 to 19 carbons; X¹ is hydrogen, halogen, —C≡N, —N=C=S, —SF₅, —CH₂F, —CHF₂, —CF₃, —(CH₂)₂—F, —CF₂CH₂F, —CF₂CHF₂, —CH₂CF₃, —CF₂CF₃, —(CH₂)₃—F, —(CF₂)₃—F, —CF₂CHFCF₃, —CHFCF₂CF₃, —(CH₂)₄—F, —(CF₂)₄—F, —(CH₂)₅—F, —(CF₂)₅—F, —OCH₂F, —OCHF₂, —OCF₃, —O—(CH₂)₂—F, —OCF₂CH₂F, —OCF₂CHF₂, —OCH₂CF₂, —O—(CH₂)₃—F, —O—(CF₂)₃—F, —OCF₂CHFCF₃, —OCHFCF₂CF₃, —O(CH₂)₄—F, —O—(CF₂)₄—F, —O—(CH₂)₅—F, —O—(CF₂)₅—F, —CH=CHF, —CH=CF₂, —CF=CHF, —CH=CHCH₂F, —CH=CHCF₃, —(CH₂)₂—CH=CF₂, —CH₂CH=CHCF₃ or —CH=CHCF₂CF₃ one of Z¹, Z², Z³, Z⁴, Z⁵ and Z⁶ is —CF₂O—.

3. The compound according to claim 1, wherein R¹ is one of groups represented by formulas (AC-1), (AC-4), (AC-7), (AC-8), (AC-11) and (AC-14); and R¹ is alkyl having 1 to 20 carbons:

 (AC-1)

 (AC-4)

 (AC-7)

 (AC-8)

 (AC-11)

 (AC-14)

4. The compound according to claim 1, wherein R¹ is one of groups represented by formula (AC-8); and R¹ is hydrogen or alkyl having 1 to 20 carbons:

 (AC-8)

5. The compound according to claim 1, wherein ring A¹, ring A², ring A³, ring A⁴ and ring A⁵ are each independently a ring represented by one of formulas (RG-1) to (RG-10):

 (RG-1)

 (RG-2)

 (RG-3)

 (RG-4)

-continued
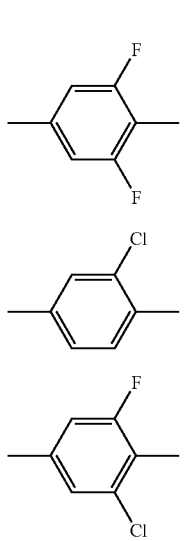
(RG-5)
(RG-6)
(RG-7)
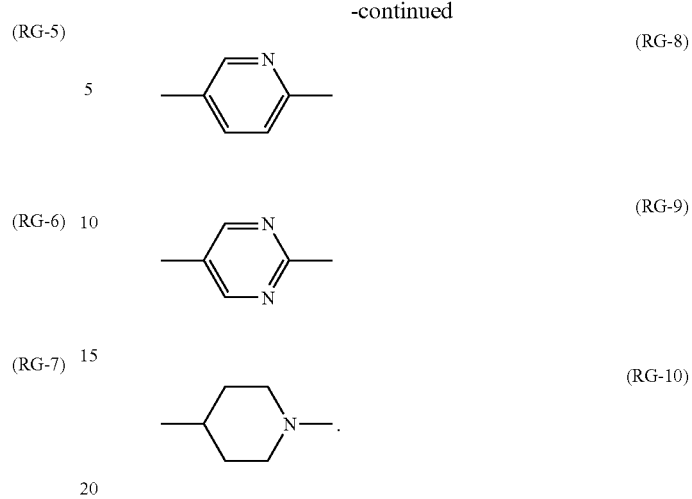
(RG-8)
(RG-9)
(RG-10)
6. The compound according to claim 1, wherein the compound is represented by one of formulas (1-1) to (1-9):
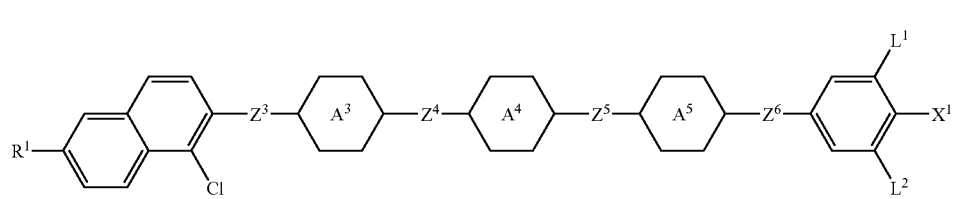
(1-1)
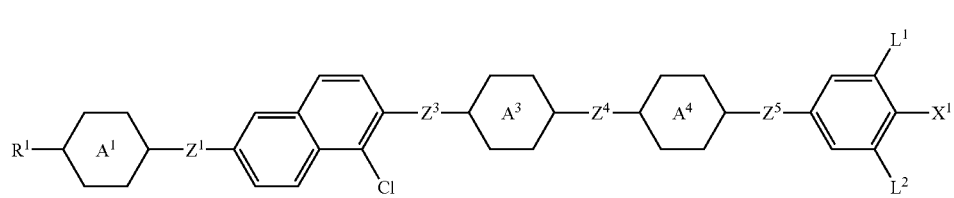
(1-2)
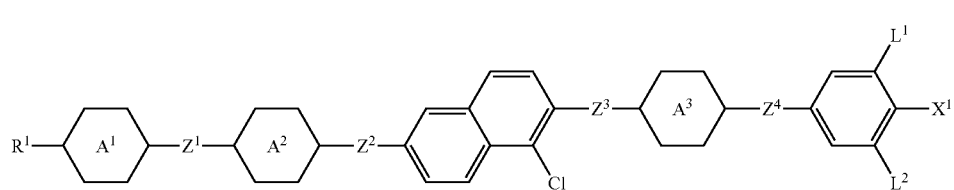
(1-3)
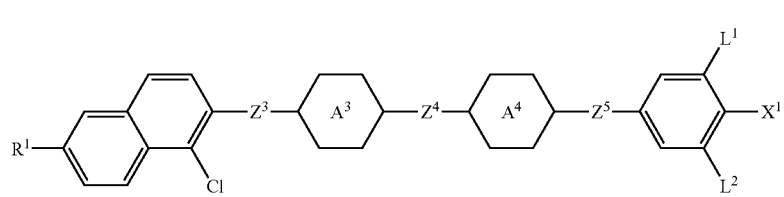
(1-4)
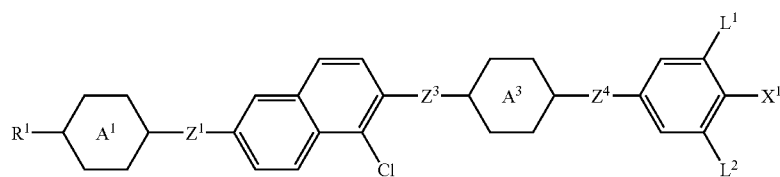
(1-5)

-continued

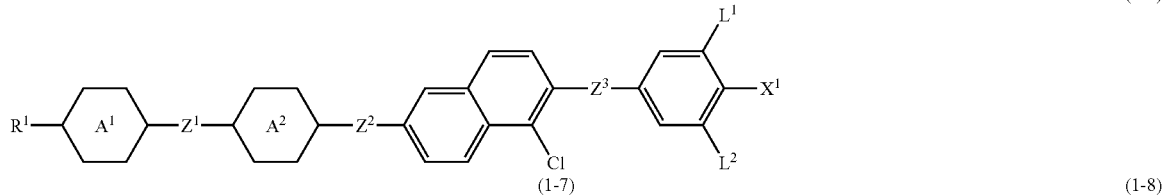
(1-6)

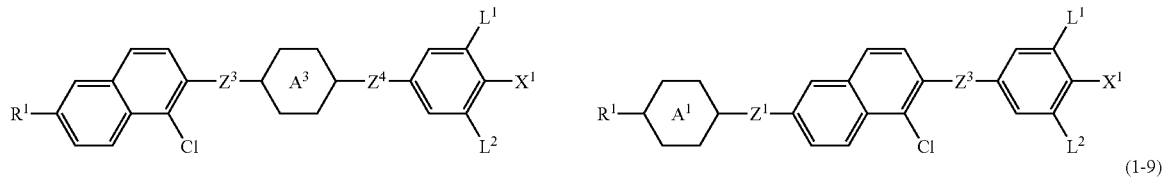
(1-7) (1-8)

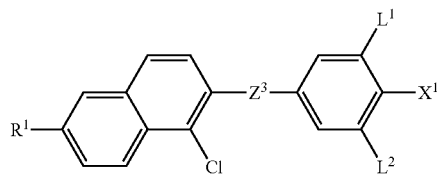
(1-9)

wherein $R^1$ is a group represented by one of formulas (AC-1) to (AC-19); $R^{1a}$ is hydrogen or alkyl having 1 to 20 carbons; ring $A^1$, ring $A^2$, ring $A^3$, ring $A^4$ and ring $A^5$ are each independently a ring represented by one of formulas (RG-1) to (RG-10); $L^1$ and $L^2$ are each independently hydrogen, fluorine or chlorine; $X^1$ is fluorine, chlorine, —C≡N, —$CF_3$, —$CHF_2$, —$CH_2F$, —$OCF_3$, —$OCHF_2$, —$OCH_2F$ or —C=C—$CF_3$; $Z^1$, $Z^2$, $Z^4$, $Z^5$ and $Z^6$ are each independently a single bond, —COO— or —$CF_2O$— and at least one of $Z^1$, $Z^2$, $Z^3$, $Z^4$, $Z^5$ and $Z^6$ is —$CF_2O$—; and $Z^3$ is a single bond or —$CF_2O$—, and in the case where $Z^3$ is a single bond, ring $A^3$ is a ring represented by formula (RG-5), or $L^1$ and $L^2$ are both fluorine, or at least one of $Z^1$, $Z^2$, $Z^4$, $Z^5$ and $Z^6$ is —$CF_2O$—

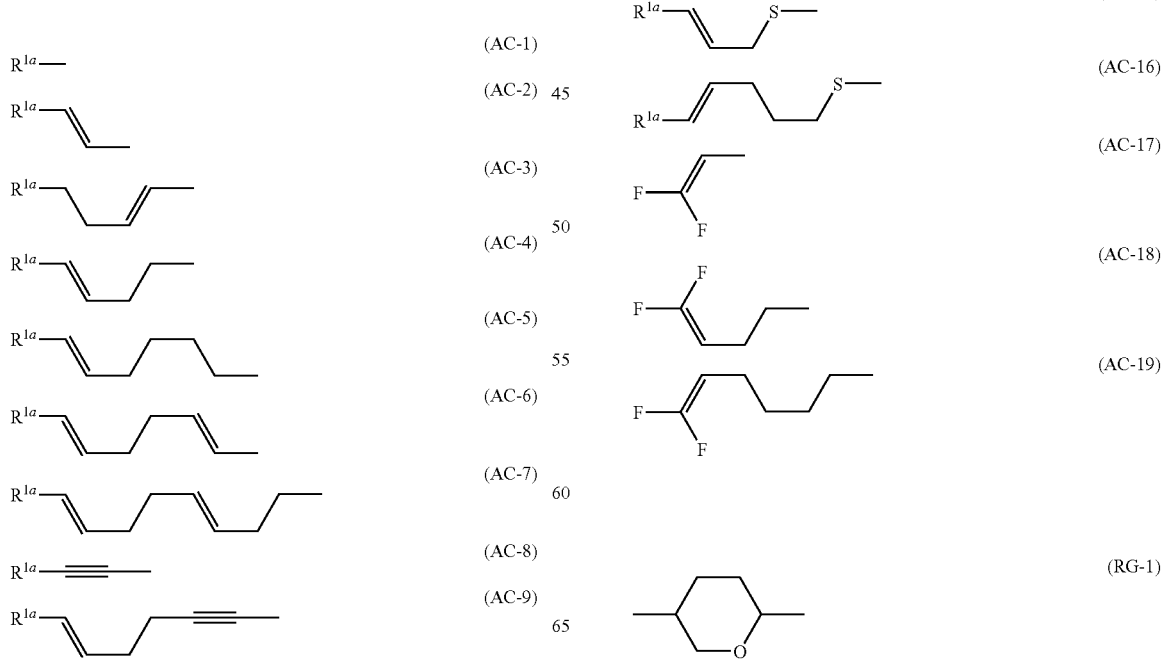

-continued

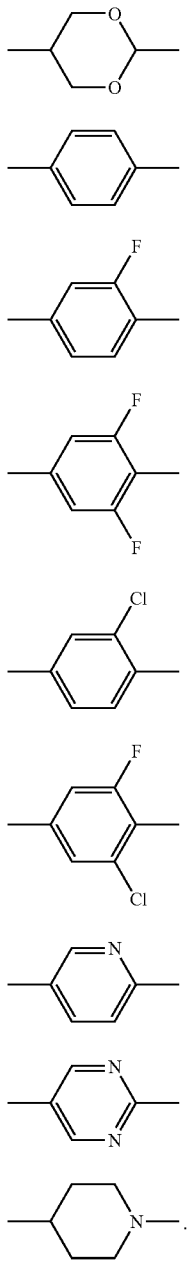

(RG-2)
(RG-3)
(RG-4)
(RG-5)
(RG-6)
(RG-7)
(RG-8)
(RG-9)
(RG-10)

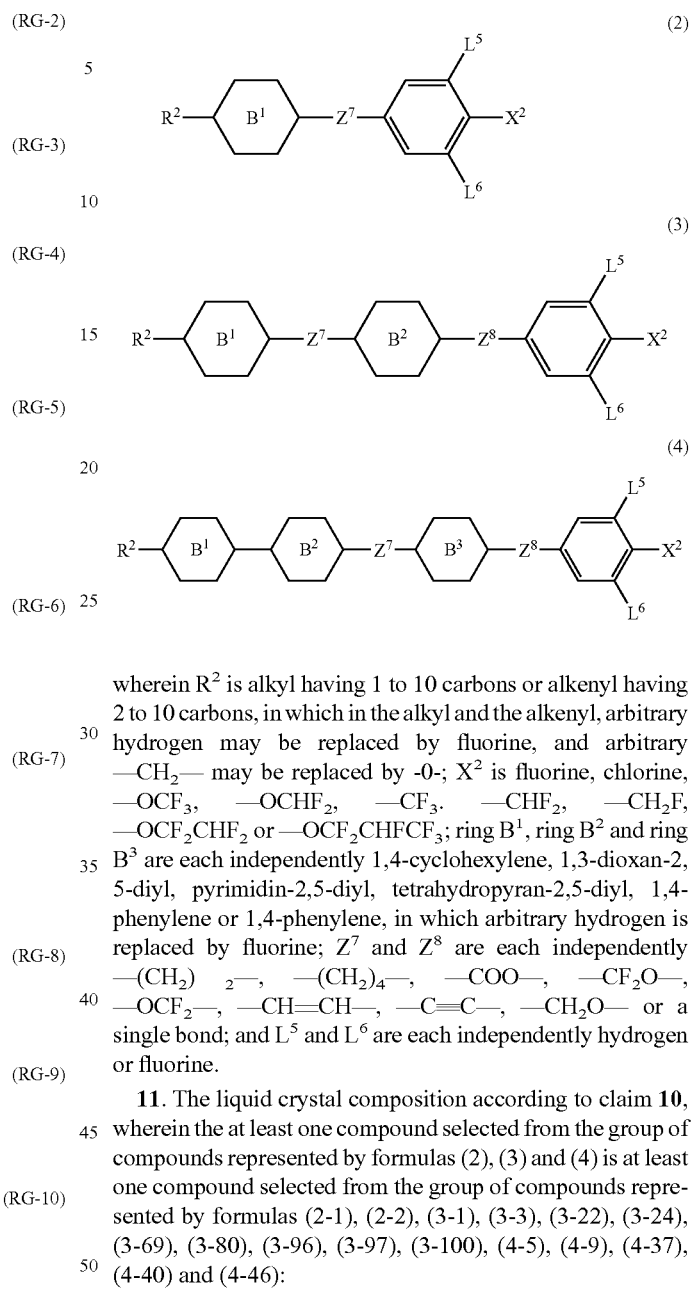

wherein $R^2$ is alkyl having 1 to 10 carbons or alkenyl having 2 to 10 carbons, in which in the alkyl and the alkenyl, arbitrary hydrogen may be replaced by fluorine, and arbitrary —$CH_2$— may be replaced by -0-; $X^2$ is fluorine, chlorine, —$OCF_3$, —$OCHF_2$, —$CF_3$, —$CHF_2$, —$CH_2F$, —$OCF_2CHF_2$ or —$OCF_2CHFCF_3$; ring $B^1$, ring $B^2$ and ring $B^3$ are each independently 1,4-cyclohexylene, 1,3-dioxan-2,5-diyl, pyrimidin-2,5-diyl, tetrahydropyran-2,5-diyl, 1,4-phenylene or 1,4-phenylene, in which arbitrary hydrogen is replaced by fluorine; $Z^7$ and $Z^8$ are each independently —$(CH_2)_2$—, —$(CH_2)_4$—, —COO—, —$CF_2O$—, —$OCF_2$—, —CH=CH—, —C≡C—, —$CH_2O$— or a single bond; and $L^5$ and $L^6$ are each independently hydrogen or fluorine.

11. The liquid crystal composition according to claim 10, wherein the at least one compound selected from the group of compounds represented by formulas (2), (3) and (4) is at least one compound selected from the group of compounds represented by formulas (2-1), (2-2), (3-1), (3-3), (3-22), (3-24), (3-69), (3-80), (3-96), (3-97), (3-100), (4-5), (4-9), (4-37), (4-40) and (4-46):

7. The compound according to claim 6, wherein in formulas (1-1) to (1-8), at least one of ring $A^1$, ring $A^2$, ring $A^3$, ring $A^4$ and ring $A^5$ is a ring represented by formula (RG-5).

8. The compound according to claim 6, wherein in formula (1-7), $R^1$ is a group represented by formula (AC-I); $Z^3$ and $Z^4$ are each a single bond; and ring $A^3$ is a ring represented by formula (RG-5).

9. A liquid crystal composition comprising at least one compound selected from the compound according to claim 1.

10. The liquid crystal composition according to claim 9, wherein the liquid crystal composition further comprises at least one compound selected from the group of compounds represented by formulas (2), (3) and (4):

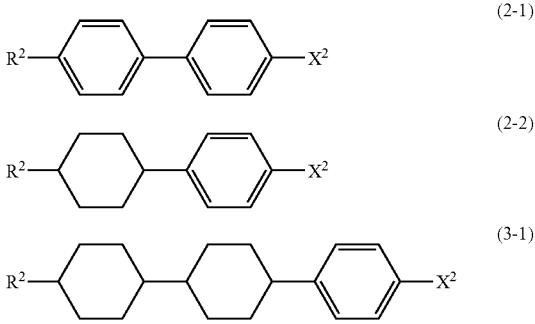

(2-1)
(2-2)
(3-1)

wherein $R^2$ is alkyl having 1 to 10 carbons or alkenyl having 2 to 10 carbons, in which in the alkyl and the alkenyl, arbitrary hydrogen may be replaced by fluorine, and arbitrary —$CH_2$— may be replaced by —O—; and $X^2$ is fluorine, chlorine, —$OCF_3$, —$OCHF_2$, —$CF_3$, —$CHF_2$, —$CH_2F$, —$OCF_2CHF_2$ or —$OCF_2CHFCF_3$.

12. The liquid crystal composition according to claim 9, wherein the liquid crystal composition further comprises at least one compound selected from the group of compounds represented by formula (5):

wherein $R^3$ is alkyl having 1 to 10 carbons or alkenyl having 2 to 10 carbons, in which in the alkyl and the alkenyl, arbitrary hydrogen may be replaced by fluorine, and arbitrary —$CH_2$— may be replaced by —O—; $X^3$ is —C≡N or —C≡C—C≡N; ring $C^1$, ring $C^2$ and ring $C^3$ are each independently 1,4-cyclohexylene, 1,4-phenylene, 1,4-phenylene, in which arbitrary hydrogen is replaced by fluorine, 1,3-dioxan-2,5-diyl, tetrahydropyran-2,5-diyl or pyrimidin-2,5-diyl; $Z^9$ is —$(CH_2)_2$—, —COO—, —$CF_2O$—, —$OCF_2$—, —C≡C—, —$CH_2O$— or a single bond; $L^7$ and $L^8$ are each independently hydrogen or fluorine; r is 0, 1 or 2; s is 0 or 1; and r+s is 0, 1 or 2.

13. The liquid crystal composition according to claim 9, wherein the liquid crystal composition further comprises at least one compound selected from the group of compounds represented by formulas (6), (7), (8), (9) and (10):

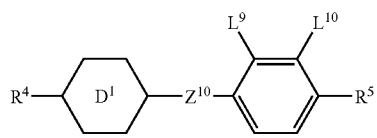   (6)

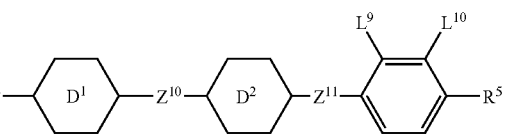   (7)

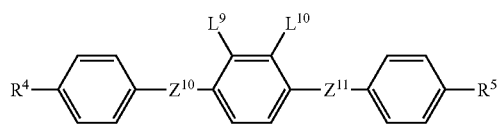   (8)

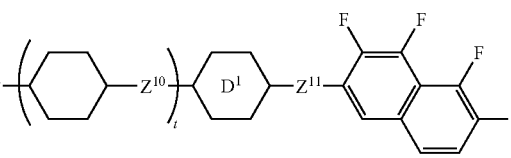   (9)

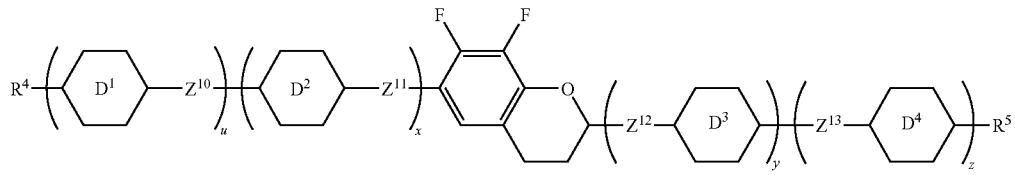   (10)

wherein $R^4$ and $R^5$ are each independently alkyl having 1 to 10 carbons or alkenyl having 2 to 10 carbons, in which in the alkyl and the alkenyl, arbitrary hydrogen may be replaced by fluorine: and arbitrary —CH$_2$— may be replaced by -0-; ring $D^1$, ring $D^2$, ring $D^3$ and ring $D^4$ are each independently 1,4-cyclohexylene, 1,4-cyclohexenylene, 1,4-phenylene, 1,4-phenylene, in which arbitrary hydrogen is replaced by fluorine, tetrahydropyran-2,5-diyl or decahydronaphthalen-2,6-diyl; $Z^{10}$, $Z^{11}$, $Z^{12}$ and $Z^{13}$ are each independently —(CH$_2$)$_2$—, —COO—, —CH$_2$O—, —OCF$_2$—, OCF$_2$(CH$_2$)$_2$ or a single bond; $L^9$ and $L^{10}$ are each independently fluorine or chlorine; t, u, x, y and z are each independently 0 or 1; and u+x+y+z is I or 2.

14. The liquid crystal composition according to claim 9, wherein the liquid crystal composition further comprises at least one compound selected from the group of compounds represented by formulas (11), (12) and (13):

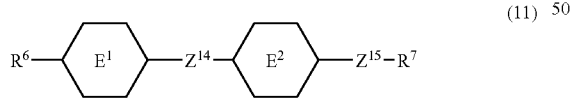   (11)

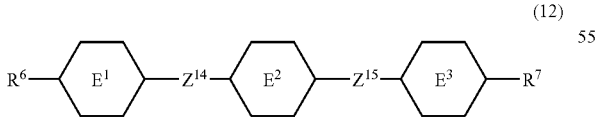   (12)

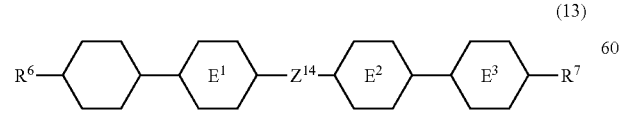   (13)

wherein $R^6$ and $R^7$ are each independently alkyl having 1 to 10 carbons or alkenyl having 2 to 10 carbons, in which in the alkyl and the alkenyl, arbitrary hydrogen may be replaced by fluorine, and arbitrary —CH$_2$— may be replaced by —O—; ring $E^1$, ring $E^2$ and ring $E^3$ are each independently 1,4-cyclohexylene, pyrimidin-2,5-diyl, 1,4-phenylene, 2-fluoro-1,4-phenylene, 3-fluoro-1,4-phenylene or 2,5-difluoro-1,4-phenylene; and $Z^{14}$ and $Z^{15}$ are each independently —C≡C—, —COO—, —(CH$_2$)$_2$—, —CH=CH— or a single bond.

15. The liquid crystal composition according to claim 14, wherein the at least one compound selected from the group of compounds represented by formulas (11), (12) and (13) is at least one compound selected from the group of compounds represented by formulas (11-1), (11-5), (11-8), (12-1), (12-4), (12-6), (13-1), (13-2) and (13-5);

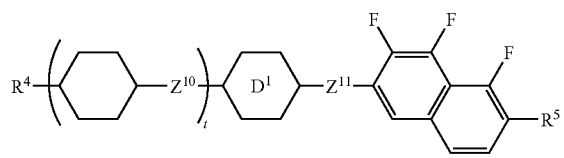   (11-1)

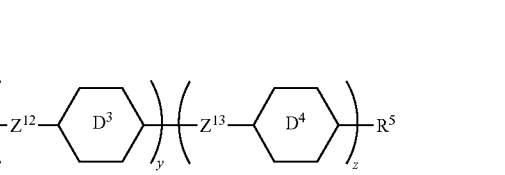   (11-5)

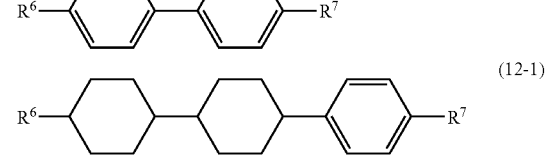   (11-8)

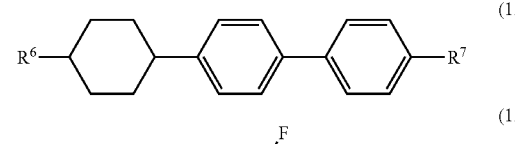   (12-1)

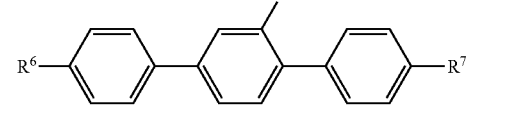   (12-4)

(12-6)

-continued (13-1)
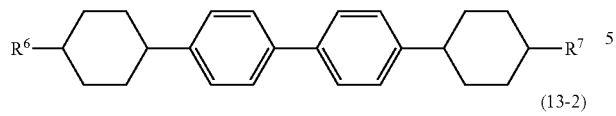

(13-2)
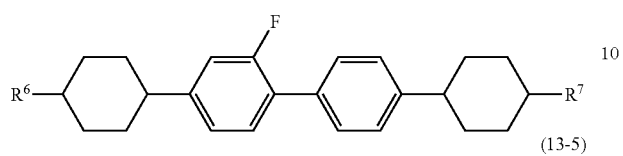

(13-5)
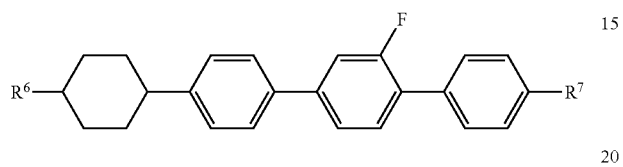

wherein $R^6$ and $R^7$ are each independently alkyl having 1 to 10 carbons or alkenyl having 2 to 10 carbons, in which in the alkyl and the alkenyl, arbitrary hydrogen may be replaced by fluorine, and arbitrary —CH$_2$— may be replaced by —O—.

16. The liquid crystal composition according to claim 9, wherein the liquid crystal composition further comprises at least one chiral agent, and does not exhibit an optically isotropic liquid crystal phase.

17. The liquid crystal composition according to claim 16, wherein the chiral agent is at least one compound selected from the group of compounds represented by formulas (K1) to (K5) and (Op-1) to (Op-13):

(K1)
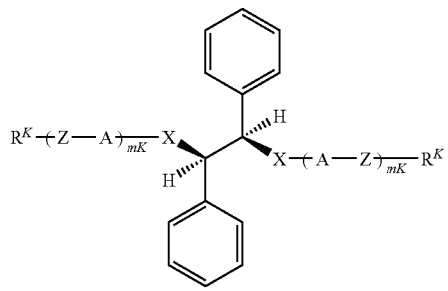

-continued (K2)
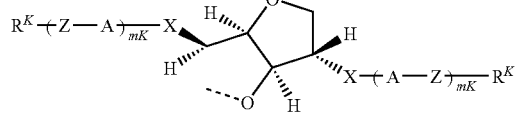

(K3)
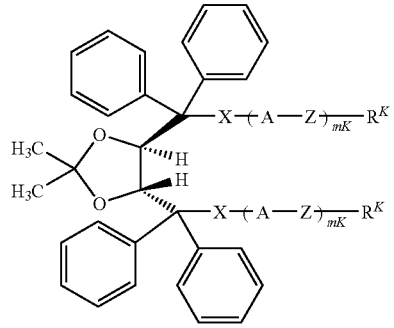

(K4)
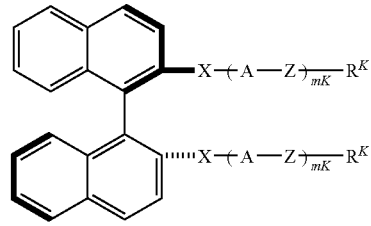

(K5)
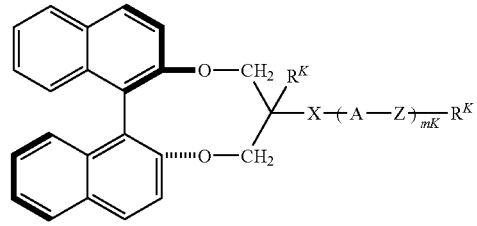

(K1)
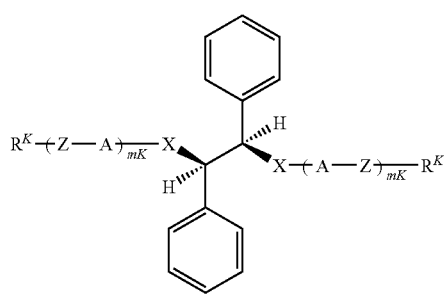

(K2)
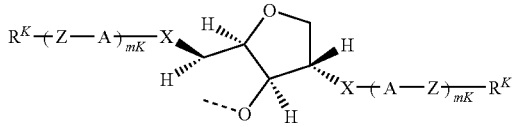

(K3)
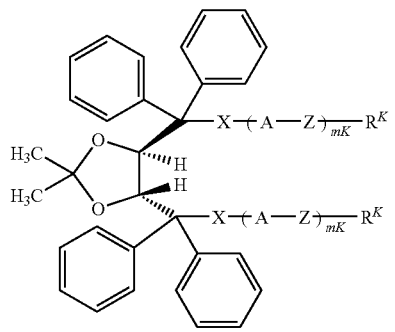
(K4)
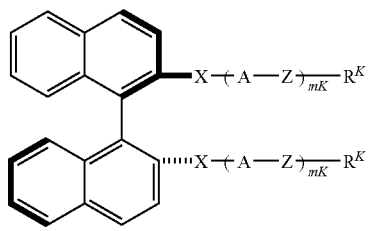
(K5)
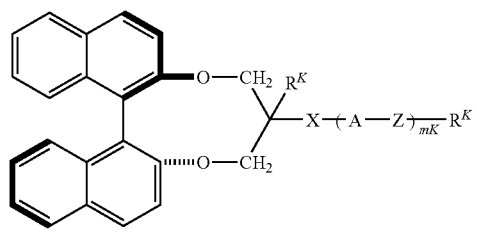
(Op-1)
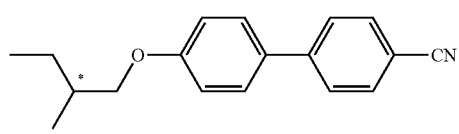
(Op-2)
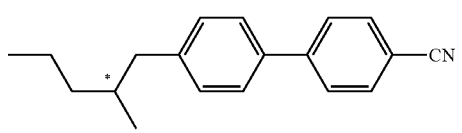
(Op-3)
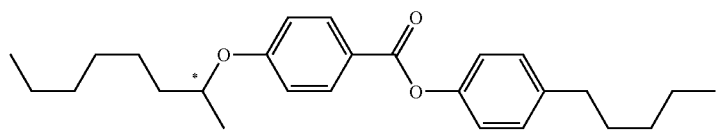
(Op-4)
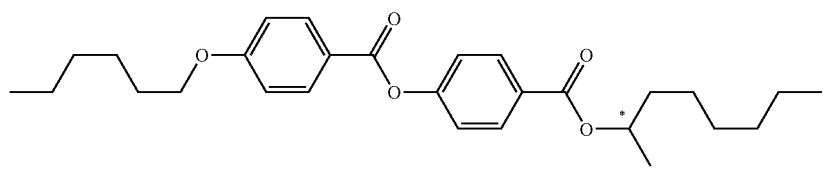
(Op-5)
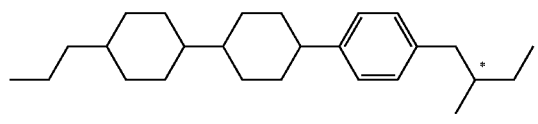
(Op-6)
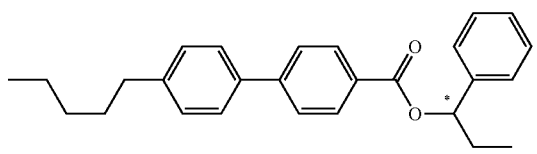
(Op-7)
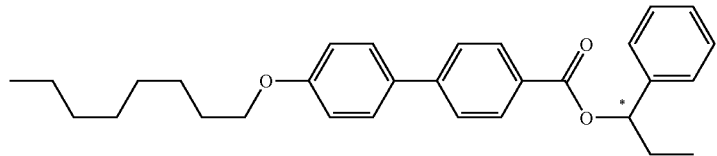
(Op-8)
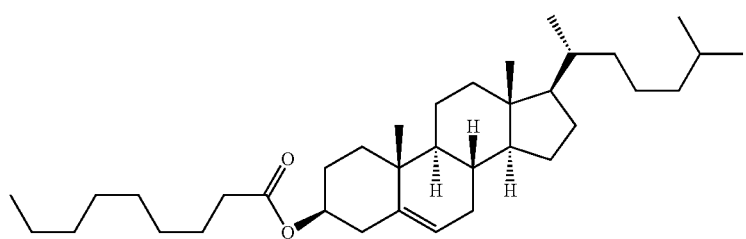

-continued

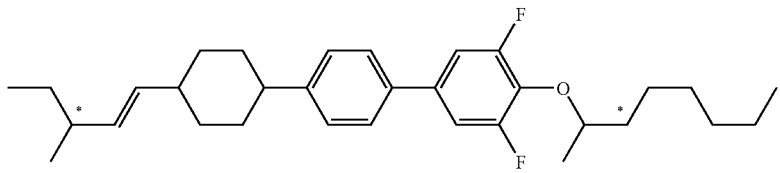
(Op-9)

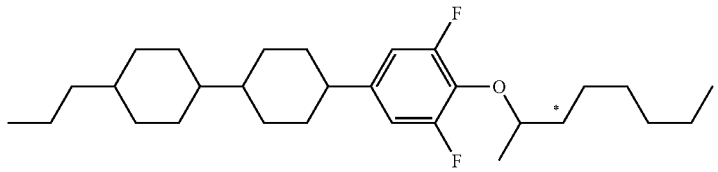
(Op-10)

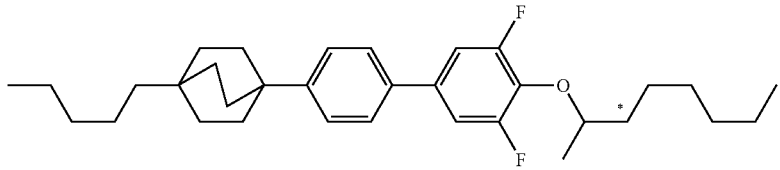
(Op-11)

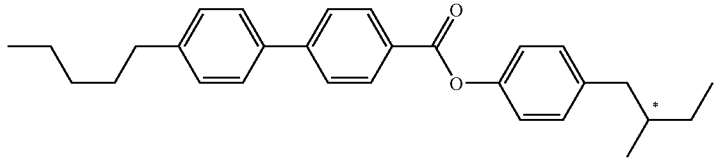
(Op-12)

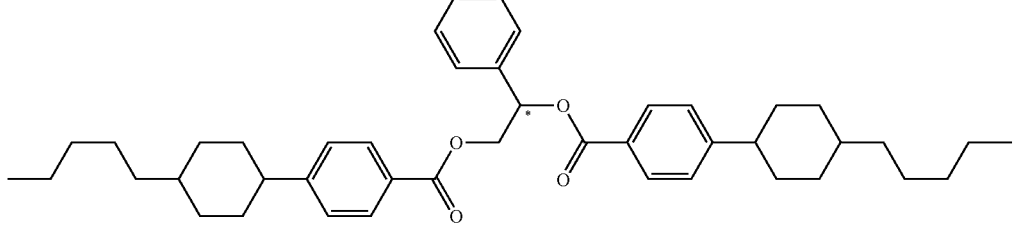
(Op-13)

wherein $R^k$ is independently hydrogen, halogen, —C≡N, —N═C═O, —N═C═S or alkyl having 1 to 20 carbons, in which in the alkyl, arbitrary —CH$_2$— may be replaced by —O—, —S—, —COO—, —OCO—, —CH═CH—, —CF═CF— or —C≡C—, and arbitrary hydrogen may be replaced by halogen:

A is independently an aromatic or nonaromatic 3-membered to 8-membered ring or a condensed ring having 9 or more carbons, in which in the rings, arbitrary hydrogen may be replaced by halogen, alkyl having 1 to 3 carbon or halogenated alky, in which in the rings, arbitrary —CH$_2$— may be replaced by —O—, —S— or —NH—, and arbitrary —CH═ may be replaced by —N═;

Z is independently a single bond or alkylene having 1 to 8 carbons, in which in the alkylene, arbitrary —CH$_2$— may be replaced by —O—, —S—, —COO—, —OCO—, —CSO—, —OCS—, —N═N—, —CH═N—, —N═CH—, —CH═CH—, —CF═CF— or —C≡C—, and arbitrary hydrogen may be replaced by halogen;

X is a single bond, —COO—, —OCO—, —CH$_2$O—, —OCH$_2$—, —CF$_2$O—, —OCF$_2$— or —CH$_2$CH$_2$—; and mK is an integer of from 1 to 4.

18. A mixture comprising the liquid crystal composition according to claim 9 and a polymerizable monomer.

19. A polymer-liquid crystal composite material that does not exhibit an optically isotropic liquid crystal phase, the composite material being obtained by polymerizing the mixture according to claim 18.

20. An optical device comprising the polymer-liquid crystal composite material according to claim 19.

21. A liquid crystal display device comprising the liquid crystal composition according to claim 9.

* * * * *